United States Patent [19]

Oberlander et al.

[11] Patent Number: 4,713,806
[45] Date of Patent: Dec. 15, 1987

[54] COMMUNICATION SYSTEM CONTROL ARRANGEMENT

[75] Inventors: Lewis B. Oberlander, Buffalo Grove; David A. Spicer, Batavia; Ralph V. Straubs, Naperville, all of Ill.

[73] Assignee: American Telephone and Telegraph Company, AT&T Bell Laboratories, Murray Hill, N.J.

[21] Appl. No.: 840,458

[22] Filed: Mar. 14, 1986

[51] Int. Cl.$^4$ .......................................... H04Q 11/04
[52] U.S. Cl. .................................................. 370/58
[58] Field of Search .................. 370/58, 60; 379/88, 379/89, 94, 269, 284

[56] References Cited

U.S. PATENT DOCUMENTS

| | | | |
|---|---|---|---|
| 4,228,536 | 10/1980 | Gueldenpfennig et al. | 370/66 |
| 4,256,926 | 3/1981 | Pitroda et al. | 179/18 ES |
| 4,322,843 | 3/1982 | Beuscher et al. | 370/58 |
| 4,442,321 | 4/1984 | Stehman | 179/18 EB |
| 4,475,156 | 10/1984 | Federico et al. | 364/300 |
| 4,567,589 | 1/1986 | Lecomte et al. | 370/58 |

OTHER PUBLICATIONS

E. H. Hafer et al., "A Virtual Switching Machine for the 5ESS TM Switching System", IEEE Global Telecommunications Conference (Globecom 1984), Record, vol. 1, pp. 6.1[6].1-5 (11-1984).
T. Madej et al., "Controlling the Network of the 5ESS Switching System", IEEE Global Telecommunications Conference (Globecom 1984), Record, vol. 1, pp. 6.2.1-5 (11-1984).
J. M. Griffiths, "ISDN Network Terminating Equipment", IEEE Transactions on Communications, vol. COM-30, No. 9 (9-1982), pp. 2137-2142.

Primary Examiner—Michael A. Masinick
Assistant Examiner—Wellington Chin
Attorney, Agent, or Firm—David Volejnicek

[57] ABSTRACT

In a multiservices digital network (FIG. 1), comprising separate narrowband switch (607) and wideband switches (505, 606), the network control complex (612) includes a program-controlled call processing arrangement (800) that is program-independent of a resource management arrangement (803) and of the physical network. The call processing arrangement views the network as comprising logical channels and logical call paths interconnecting logical channels. It does not distinguish between narrowband and wideband communications; it responds to subscriber (102) messages requesting subscriber functions for both narrowband and wideband communications by directing the resource management arrangement to establish and dismantle logical call paths and to create and destroy logical and physical connections between the logical channels and the logical call paths. The resource management arrangement distinguishes between narrowband and wideband communications; it responds to the directions by allocating and deallocating either narrowband or wideband network physical resources, as appropriate, for physical channels and physical call paths corresponding to the logical channels and the logical call paths, and directs either wideband switch controllers (507, 610) or narrowband switch controller (611), as appropriate, in creating and destroying the requested logical and physical connections between the channel and call path resources. The call processing arrangement is thus made independent of network physical resources, while the resource management arrangement is made independent of subscriber functions.

17 Claims, 30 Drawing Figures

SWITCHED INTEGRATED WIDEBAND AND NARROWBAND MULTISERVICES DIGITAL NETWORK

CALL PROCESSING MODEL OF NETWORK

CONTROL COMPLEX SOFTWARE STRUCTURE

CALL PROCESSING
AND RESOURCE MANAGEMENT
ARCHITECTURE

INTERACTIONS OF A CALL TERMINAL PROCESS

INTERACTIONS OF A CONFERENCE TERMINAL PROCESS

CALL ASCLASS

CALL CONNECT STATUS

CONFERENCE CONNECT STATUS

POINT-TO-POINT FAR END CALL STATUS

CALL FAR END CONFERENCE STATUS

FIG. 15

POINT-TO-POINT CALL REGISTER

| CALL PROCESS STATE | ASCLASS | NEAR END STATUS |
| --- | --- | --- |
| | CS_STATUS | |
| | FS_STATUS | FAR END STATUS |
| | FC_STATUS | |

```
CHID            TPID
     CHAN/CONF  CONFID
CHID            PORTID
                PORTID
```

- FARDN
- PATHID
- TPID
- CUSTID
- CALLID
- MED
- DIR
- OWNER
- DN

FIG. 16

CONFERENCE REGISTER

| CONFERENCE PROCESS STATE | ASCLASS |
| --- | --- |
| | CS_STATUS |
| | FS_STATUS |

```
       CHID
CHAN   ----
       CHID
```

- PATHID
- CALLS
- COUNT
- TPID
- CUSTID
- CONFID
- MED
- CONFTYPE
- DIR
- DN
- CALLTPID

INTERACTIONS OF A PROXY-VENDOR PROCESS

PROXY VENDOR CALL STATUS

PROXY VENDOR STABILITY STATUS

PROXY VENDOR CALL REGISTER

RESOURCE MANAGEMENT STRUCTURES
IN A POINT-TO-POINT CALL

RESOURCE MANAGEMENT STRUCTURES
IN A CONFERENCE CALL

RESOURCE MANAGEMENT-LOCAL STATUS

RESOURCE MANAGEMENT-REMOTE STATUS

RESOURCE MANAGEMENT STRUCTURES
IN A PROXY VENDOR CALL

PROXY VENDOR
STRUCTURE ATTRIBUTES

COMMUNICATION SYSTEM CONTROL ARRANGEMENT

CROSS-REFERENCE TO RELATED APPLICATIONS

The subject matter disclosed in this patent application relates to subject matter disclosed in application of H. R. Lehman et al. entitled "Digital Communication Network Architecture for Providing Universal Information Services", Ser. No. 809,196, filed on Dec. 13, 1985, and in application of L. B. Oberlander et al. entitled "Communication System Control Arrangement", Ser. No.480,959, filed on even date herewith, both of which related applications are assigned to the same assignee as this application.

TECHNICAL FIELD

The invention relates to the call processing and resource management portions of a communication system control arrangement, and particularly relates to the structure and cooperation of these two portions to provide to system subscribers an expandable variety of communication services through a variety of system structures.

BACKGROUND OF THE INVENTION

The control arrangement of a communication system is the intelligence that acts, generally in response to stimuli such as subscriber requests, to determine the configuration of system resources that is necessary to provide subscribers with desired communication services.

Control arrangements are typically designed to provide a predefined set of communication services within a predefined hardware system. This has the unfortunate consequence that addition of new features to the service capabilities of the control arrangements, or porting of the arrangement from one type of system hardware architecture to another, typically necessitate significant changes to, and often a radical redesign of, the whole control arrangement. For example, the traditional design of control software of a telephone electronic switching system typically requires that major modifications be made to the code of both high level functions (e.g., the call processing subsystem, which determines what to do) and low level functions (e.g., the resource management subsystem, which determines how to do it) either when the control software is being ported from one kind of telephone switching system architecture to another, or when new system fabrics and associated features are being added to the software. This, of course, limits the usefulness, cost effectiveness, and portability of the control software.

The above-described characteristics are disadvantageous to control apparatuses of conventional communication systems; they become even more so to control apparatuses of integrated services digital networks (ISDNs). Such networks seek to provide subscribers with many types of voice, data and, in some instances, video, communication services in integrated form, i.e., via a common network and a common interface to the subscribers. These networks tend to be very complex, and their control apparatuses reflect this complexity. Hence, introduction of modifications to the control apparatuses is itself a complex, difficult, time-consuming, and expensive task. Yet the evolution of ISDN technology is young and their architectures are often changing. Also, the services and service features sought to be provided by the ISDNs are progressively expanding. These changes almost invariably require that modifications be made to the network control arrangements to accommodate these changes. But the traditional design of control arrangements typically fails to localize the necessary modifications, and rather makes their extent pervasive. For example, system hardware architecture changes typically require modifications not only to the resource management portion of the control arrangement which manipulates system hardware in order to provide needed communication connections, but also the call processing portion which determines what connections need to be made. Similarly, subscriber feature additions typically require modifications not only of the callprocessing portion, but of the resource management portion as well. But to have to redesign both of these functional portions of network control with each change in network hardware architecture or subscriber features is overly burdensome.

These considerations have led the art to seek to partition control software arrangements into call processing and resource management subsystems in a manner wherein the call processing subsystem operates on a logical abstraction of the physical communication system (also referred to as a virtual machine), and wherein the resource management subsystem translates and maps control functions requested by call processing for the virtual machine into control functions for the actual physical system. The call processing subsystem has thus been made largely independent of various physical implementations of the communication system, the difference being hidden therefrom by the resource management subsystem. As a result, changes in the system physical implementation have come to require changes in the resource management software, but generally not in the call processing software.

A consequence of this approach is that each different physical system implementation generally has a resource management subsystem associated therewith that is different from the resource management subsystems of other physical implementations. This may pose no difficulty in conventional communication systems that provide all communication services via a common communication fabric, such as telephony electronic switching systems that provide both voice and data communications through the same communication switching fabric over the same communication channels. However, certain communication systems that seek to provide integrated voice, data, and video services provide voice and low-speed data services via one communication fabric and provide video and highspeed data services via a completely separate communication fabric.

Such systems essentially comprise two different parallel physical fabrics, and the art's above-described approach to control arrangement design suggests a separate resource management subsystem for each of these fabrics. This approach has the unfortunate consequence, however, that the call processing systems must be made aware of the existence of the two fabrics, and must determine for each call the fabric that will provide or is providing that call so that call processing control function requests for that call may be sent to the appropriate fabric's resource management subsystem. As a result, the call processing subsystem is no longer independent of the system physical configuration, but must be made aware thereof at least to the extent of knowing how many fabrics there are, what the differences between them are, and what the service requirements of each call type are, so that call processing may determine which fabric is appropriate for each call. The desirable quality of call processing's portability across many different system structures and across an expandable variety of services—which quality depends upon the independence of the call processing subsystem from the physical communication system—is, to a degree, destroyed.

SUMMARY OF THE INVENTION

This invention is directed to solving these and other disadvantages of the prior art. The invention concerns a control arrangement for a communication switching system that has first and second—illustratively narrowband and wideband, respectively—physical resources configurable independently from each other each separately to provide first and second communications, respectively, for terminal logical channels of the system. The system further includes first and second resource control arrangements for configuring the first and the second resources, respectively, in response to receipt of requirements signals.

For purposes of this application, "narrowband" and "wideband" are defined in terms of unidirectional channel bandwidth. A narrowband channel is one having a bandwidth of up to and including 64 Kbps, and a wideband channel is one having a bandwidth exceeding 64 Kbps. Typically, a narrowband channel has a bandwidth of 64 Kbps or integral sub-multiples thereof, i.e., 32 Kbps, 16 Kbps, 8 Kbps, or 4 Kbps. Also typically, a wideband channel has a bandwidth of in excess of about 1.5 Mbps, as services requiring lesser bandwidth than 1.5 Mbps can generally be provided by a plurality of narrowband channels used together. Furthermore, a wideband channel typically has a bandwidth extending into the tens, and preferably hundreds, of Mbps, in order to provide video services such as high-quality interaction video transmissions, over a single wideband channel.

According to the invention, the system's control arrangement comprises two program controlled entities, a first one of which responds to commands from the second one to generate requirements signals for both of the resource control arrangements to configure system physical resources, and the second one of which is program independent from the first one and deals only with logical resources so as to be independent of the system first and second physical resources and resource control arrangements. This system control arrangement allows different communication services, such as narrowband and wideband services, to be provided by the network via separate and different communication handling fabrics without the second program controlled entity having to take this fact into consideration.

According to an illustrative embodiment of the invention, in a multiservices digital network comprising separate narrowband and wideband switches, a network control complex includes a program-controlled call processing arrangement that is program-independent of a resource management arrangement and of the physical network. The call processing arrangement views the network as comprising logical channels, and logical call paths interconnecting logical channels. It does not distinguish between narrowband and wideband communications; it responds to subscriber messages requesting subscriber functions for both narrowband and wideband communications by directing the resource management arrangement to establish and dismantle logical call paths, and to create and destroy logical and physical connections between the logical channels and the logical call paths. The resource management arrangement distinguishes between narrowband and wideband communications; it responds to the directions from the call processing arrangement by allocating and deallocating either narrowband or wideband network physical resources, as appropriate, for physical channels corresponding to the logical channels and for physical call paths corresponding to the logical call paths, and directs either wideband switch controllers or a narrowband switch controller, as appropriate, in creating and destroying the requested logical and physical connections between the channel and call path resources. The division of the network resources into narrowband and wideband resources and the presence of separate controllers for each is thus hidden from the call processing arrangement by the resource management arrangement. Logical channels and call paths are abstract units independent of physical resources which implement them, while physical channels and call paths are collections of one or more physical resources that implement the logical channels and call paths. Correspondingly, logical connections are associations between logical or physical entities whose only existence may be in a database, while physical connections are actual physical couplings between physical entities.

Returning to a consideration of the basic invention, the second program controlled entity is operable in response to receipt of call signals for either wideband or narrowband communications for any one of the logical channels. It processes call information to generate requirements signals for establishing logical communication paths between the one logical channel and at least one other logical channel. The received call signals have associated signals that indicate either one of the wideband and the narrowband communications. But the second program controlled entity effectively ignores the band-indicating signals, and generates the requirements signals independently of the band-indicating signals. It merely associates the band-indicating signals with the requirements signals and sends both of them to the first program controlled means. The second program controlled entity deals only with logical channels and paths in order to accomplish its functions independently of both the narrowband and wideband resources and of the resource control arrangements.

The first program controlled entity cooperates with both the first and the second resource control arrangement. It is operable in response to receipt from the second program controlled entity of the requirements signals and the associated band-indicating signals. It responds to an indication of narrowband communications by generating requirements signals for controlling the operation of the first resource control arrangement to configure first physical resources into either one or both of (a) physical communication channels corresponding to the logical channels and (b) physical communication paths between the physical channels corresponding to the logical communication paths. And it is further operable in response to indication of the wideband communications by generating requirements signals for controlling the operation of the second resource control arrangement to configure second physical resources into either one or both of (a) physical communication channels corresponding to the logical channels and (b) physical communication paths between the physical channels corresponding to the logical communication paths.

The first program controlled entity is the only one of the two entities to deal with the system resources and the separation thereof into wideband and narrowband, so it absorbs modifications that must be made to the control arrangement as a consequence of system hardware changes. Significantly, it hides from the second program controlled entity division of the system into the wideband and narrowband resources, the presence or absence of more than one band of resources, and additions to or deletions from the system of additional kinds of resources. Since the second program controlled entity deals only with the logical channels and paths, which are not affected by system hardware changes, or by the presence in or absence from the system of various communication handling fabrics, the second program controlled entity is likewise not affected by these changes. And the modifications to the one entity that result from these changes do not affect the second entity, because the two entities are program-independent. Hence, changes to the control arrangement that result from system hardware changes and from additions or deletions of fabrics are advantageously localized to only the first of the two entities of the control arrangement. This simplifies adaptation of the control arrangement to new system hardware structures, and allows at least the second program controlled entity to be ported from system to system without modifications being made thereto.

Furthermore, the resource control arrangements hide the structure of system hardware resources from the first program controlled entity. This makes the first program controlled entity independent of the resource structure, and therefore usable with resources of different structures without modification. By way of an illustrative example, the communication system's narrowband physical resources include a narrowband switch that has a plurality of ports connected to physical channels corresponding to terminal logical channels, and the resource control arrangement comprises a narrowband switch controller. The first program controlled entity is a resource management arrangement that is operable in response to receipt from the second program controlled entity of requirements signals and associated signals indicating narrowband communications by selecting narrowband switch ports for the logical paths and generating requirements signals for establishing switch paths between the selected ports independently of the narrowband switch. The narrowband switch controller then responds to receipt of the requirements signals from the first program controlled entity by configuring the narrowband switch into switch paths between the selected ports. The first program controlled entity is thus made independent of the internal structure and configuration of the narrowband switch.

Further by way of an illustrative embodiment of the invention, the communication system's wideband physical resources include a first wideband switch that has a plurality of ports, and a second wideband switch that also has a plurality of ports, some of which are connected to ports of the first wideband switch and others of which are connected to portions of physical channels corresponding to terminal logical channels. In such a system, the resource control arrangement comprises two wideband switch controllers. The first program controlled entity responds to receipt from the second program controlled entity of requirements signals and associated signals indicating wideband communications by selecting ports of the first wideband switch for the logical paths and selecting ports of the second wideband switch for the logical channels, and also by generating first and second requirements signals for controlling the operation of different ones of the two wideband switch controllers to establish first and second switch paths, respectively, between the selected ports of the first and of the second wideband switch, respectively, independently of the switches. One of the two wideband switch controllers responds to receipt of the first requirements signals by configuring the first wideband switch into switch paths between the selected first wideband switch ports. And the other of the two controllers responds to receipt of the second wideband requirements signals by configuring the second wideband switch into switch paths between the selected second wideband switch ports.

Returning to a consideration of the basic invention, preferably the second program controlled entity is operable in response to receipt of call signals and associated band-indicating signals, and processes call information to generate requirements signals for controlling the operation of the first program controlled entity not only to establish logical paths but also to control the logical paths independently of system physical resources and the resource control arrangements. The first program controlled entity in turn responds to receipt of the requirements signals and associated bandindicating signals by allocating the indicated physical resources to the physical channels and paths in order to establish them, and by generating requirement signals for controlling the operation of the indicated resource control arrangement to establish logical and physical connections between the allocated physical resources in order to control the logical paths. The control of call paths implements subscriber call functions. The expression of various subscriber functions all in terms of logical and physical connections makes the first call processing entity easily adapted to providing new and different subscriber functions, because the "building blocks" of the new functions—the logical and physical connections—are the same as for the old functions. Furthermore, the second entity preferably also generates requirements signals for establishing logical and physical connections between the logical channels and call paths for the purpose of controlling the calls. The second program controlled entity thus translates subscriber functions into requests for logical and physical connections, to make the first program controlled entity independent of subscriber functions. Implementation of new features for subscribers and provision of new subscriber message therefor thus requires that changes be made only to the second program controlled entity, but not to the first program controlled entity. This greatly simplifies provision of new functions in communication systems.

In the illustrative examples, described above, where the system resources include switches, where the resource control arrangements comprise switch controllers for configuring the switches into switchpaths, and where the first program controlled entity selects switchports for logical paths and generates requirements signals for establishing switchpaths between the selected ports, the first program controlled entity further generates requirements signals for establishing connections between the selected ports independently of the switches, and the switch controllers further respond to these signals by configuring the switches to interconnect and disconnect the selected ports. The independence of the first program controlled entity from switch structure is thus maintained even for call control.

In an illustrative embodiment of a communication switching system that has narrowband and wideband physical resources configurable independently from each other each separately to provide narrowband and wideband communications, respectively, for terminal logical channels thereof—for example, an integrated services digital network—and that further includes narrowband and wideband resource control means for configuring the narrowband and the wideband resources, respectively, in response to receipt of requirements signals, the system's control arrangement comprises a program controlled resource management arrangement, and a separate program controlled call processing arrangement independent in program from the resource management arrangement and independent of the narrowband and the wideband physical resources and the resource control means. The call processing arrangement is operable in response to receipt of call signals and associated signals indicating either one of the narrowband and the wideband communications for any one of the logical channels and processes call information to generate, both independently of and for association with the narrowband and the wideband indicating signals, requirements signals for both establishing and controlling logical call paths between the one logical channel and another at least one logical channel independently of both the physical resources and their control means. The resource management arrangement is cooperative with both the narrowband and the wideband resource control means. It is operable in response to receipt of the requirements signals and associated signals indicating narrowband or wideband communications by processing narrowband or wideband resource information, respectively, both (a) to allocate narrowband or wideband physical resources, respectively, for either one or both of physical communication channels corresponding to the logical channels, and for physical communication paths between the channels corresponding to the logical call paths, for establishment of the logical channels and paths, and (b) to generate requirements signals for controlling the operation of the narrowband or the wideband, respectively, resource control means to establish connections between the allocated physical resources, for control of the logical call paths. Preferably, the call processing arrangement defines the requirements signals for controlling the operation of the resource management arrangement to both establish the logical call paths, and establish logical and physical connections between the logical call paths and the logical channels for controlling the logical call paths. The resource management arrangement is then operable in response to receipt of the requirements signals and the associated band-indicating signals by processing the corresponding resource information (a) to establish resource management logical structures for the logical channels and the logical call paths for establishment of the logical channels and paths, (b) to allocate physical resources to the logical channel structures for physical channels and to the logical call path structures for physical call paths between the physical channels, for establishment of the logical connections, and (c) to generate requirements signals for controlling the operation of the allocated resource's corresponding control arrangement to establish connections between the resources allocated to the structures, for establishment of the physical connections.

If the just-described system has pre-established physical paths corresponding to logical paths to certain ones of the logical channels, such as to broadcast service sources, the resource management arrangement is operable in response to receipt of requirements signals and the associated band-indicating signals for logical call paths between one of the certain logical channels and another at least one logical channel by processing the corresponding resource information (a) to establish logical channel structures for establishment of the logical channels, (b) to allocate physical resources for physical channels connecting to the pre-established physical call paths, for establishment of logical connections, and (c) to generate requirements signals for controlling the operation of the allocated resources' corresponding resource control arrangement to establish connections between the resources allocated to the channel structures and the preestablished paths, for establishment of physical connections. The resource management arrangement is further operable in response to receipt of requirements signals for logical call paths between channels other than the certain logical channels in the manner described previously. In this way, the system allows certain services, such as program broadcast services, to be provided to subscribers quickly and efficiently.

These and other advantages and features of the present invention will become apparent from the following description of an illustrative embodiment of the invention, taken together with the drawing. BRIEF DESCRIPTION OF THE DRAWING FIG. 1 is a block diagram of the architecture of a communication network that embodies an illustrative example of the invention;

FIG. 15 is a block diagram of a call register of a call terminal process of FIG. 7;

FIG. 16 is a block diagram of a conference register of a conference terminal process of FIG. 7;

DETAILED DESCRIPTION

TABEL OF CONTENT

Figure 4:
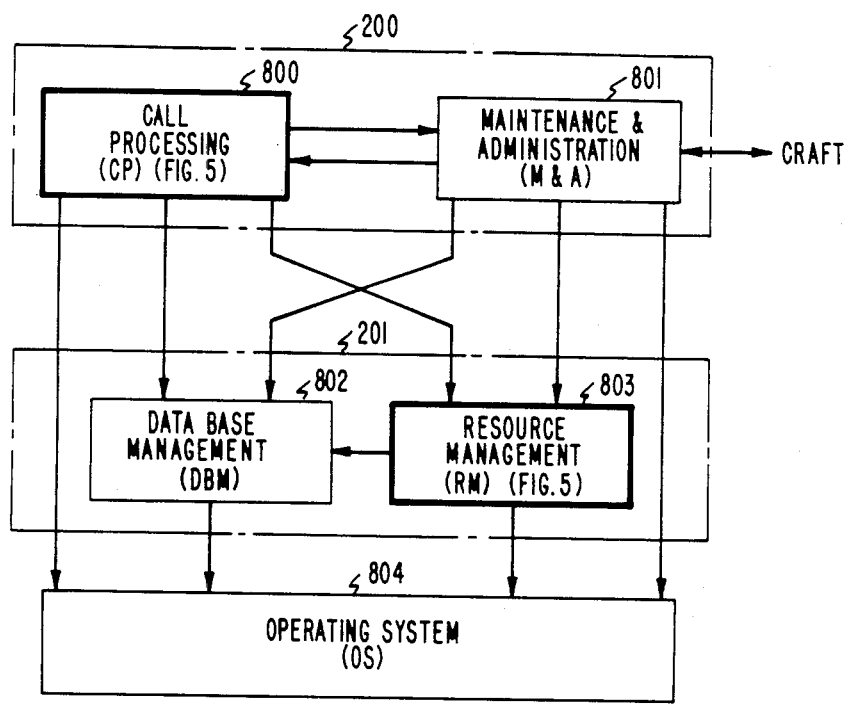
FIG. 4 is a block diagram of software structure of the control complex of the local central node of FIG. 2.
Figure 5:
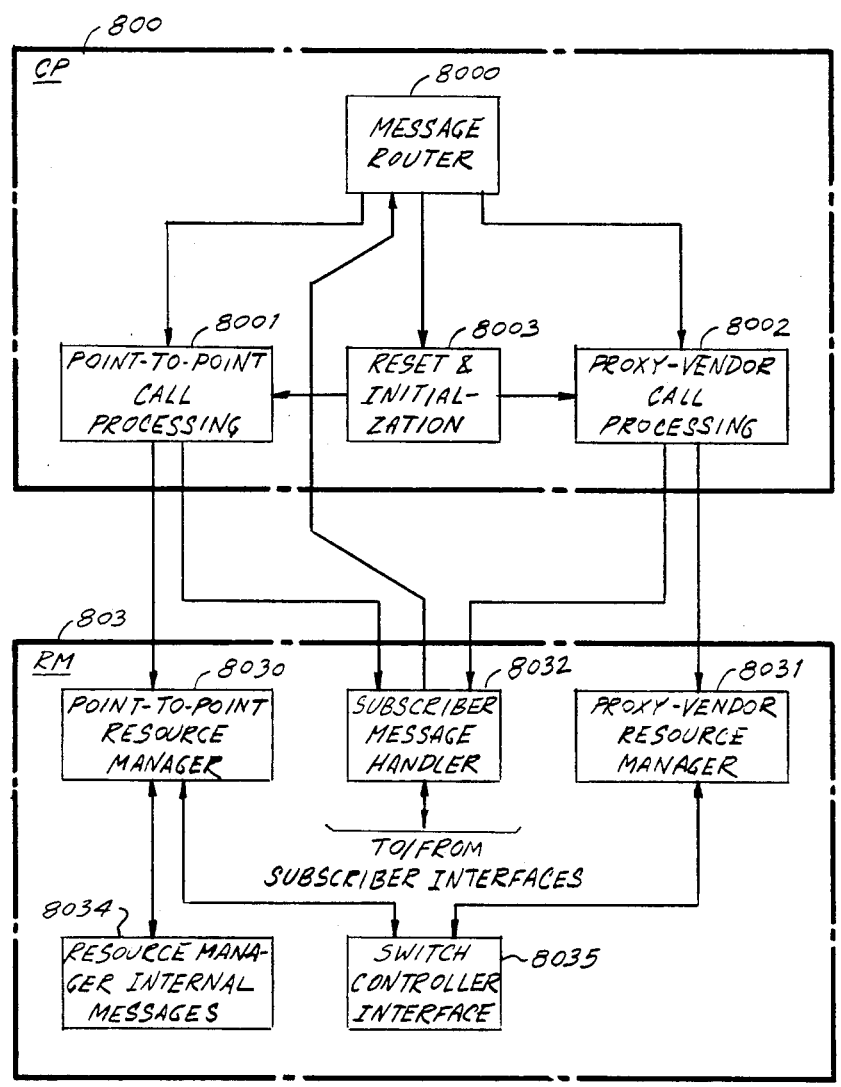
FIG. 5 is a block diagram of architecture of the call processing and resource management subsystems of the software of FIG. 4.

Hardware Architecture—Network Overview (FIG. 1)
Hardware Architecture—Remote and Central Nodes (FIG. 2)
Call Processing Model—Overview (FIG. 3)
Control Architecture—Subscriber to Central Node Signaling Interface (Appendix A)
Control Software—Subscriber Interface
Control Software—Node Control Complex (FIG. 4)
    Operating System
    Database Management
    Resource Management
    Call Processing
    Maintenance and Administration
Call Processing Architecture (FIG. 5)
    Message Router (FIG. 6)
    Point-to-Point Call Processing
        Terminal Process (FIGS. 7-9)
        Process States (FIGS. 10-16)
    Proxy Vendor Call Processing
        Proxy Vendor Process (FIGS. 17 and 18)
        Process States (FIGS. 19-21)
    Reset and Initialization
Resource Management Architecture
    Overview (FIG. 5; Appendix B)
    Point-to-Point Resource Management (FIGS. 22 and 23)
        Lower Path Structure (FIG. 24)
        Upper Path Structure (FIGS. 25-28)
        Interface to Call Processing (Appendix C)
    - Proxy Vendor Resource Management (FIG. 29)
        Lower Path Structure (FIG. 24)
        Proxy Vendor Structure (FIG. 30)
    Interface to Call Processing
    Switch Control Interface (Appendix D)

HARDWARE ARCHITECTURE—NETWORK OVERVIEW (FIG. 1)

The illustrative control arrangement described herein is for use in a switching center of a communication system. A suitable communication system is, for example, the switched integrated wideband and narrowband multiservices digital network described in the patent application of H. R. Lehman, W. P. Lidinsky, H. E. Mussman, D. A. Spicer, and D. Vlack, entitled "Digital Communication Network Architecture for Providing Universal Information Services", Ser. No. 809,196, filed Dec. 13, 1985, and assigned to the same assignee as this application.

Figure 1:
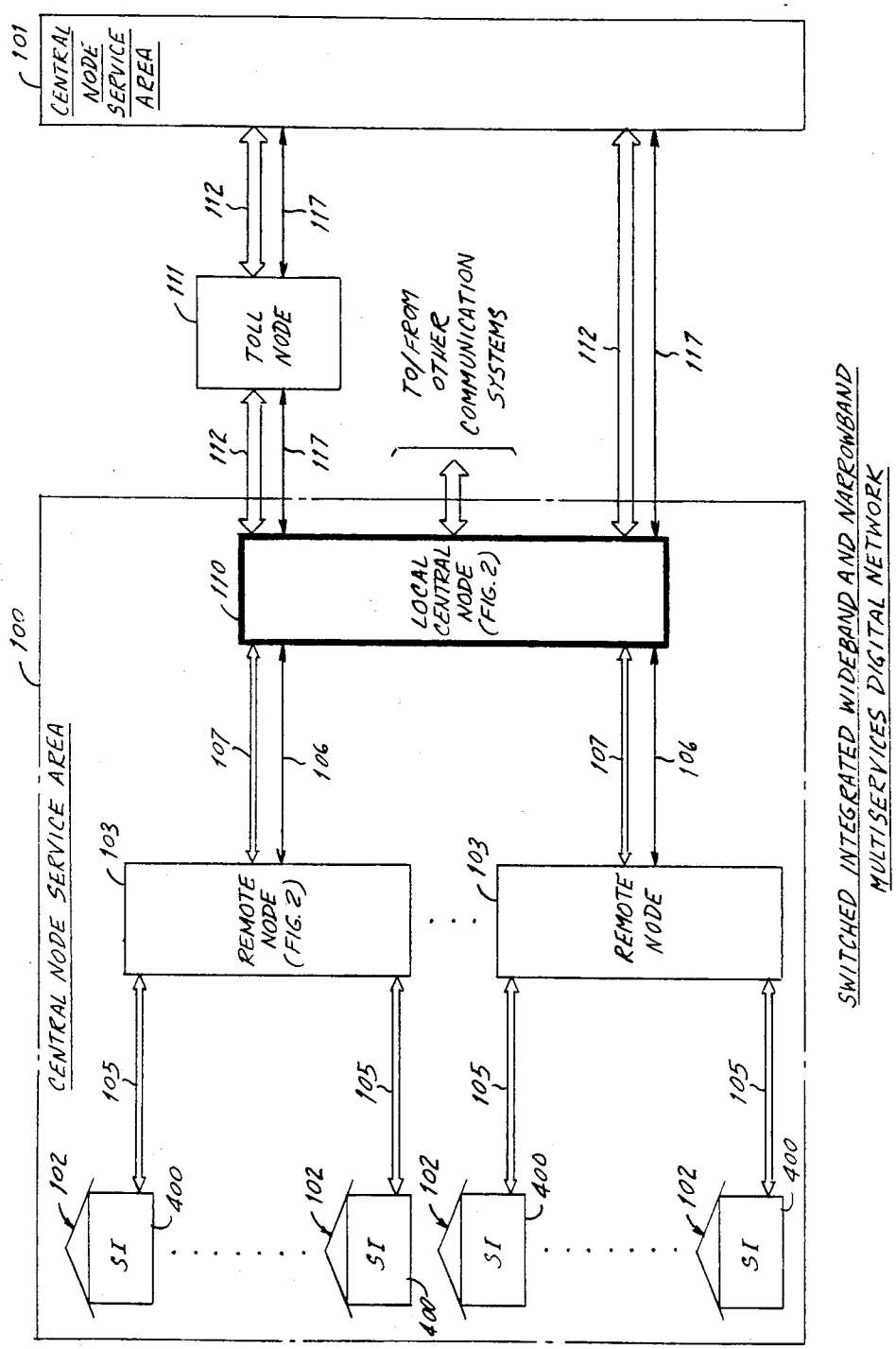

Shown in FIG. 1 and briefly described, that network provides all types of voice, data, and video services to subscribers. The network comprises a plurality of central node service areas 100, 101, each of which comprises a plurality of subscribers 102 served by a local central switching node 110. Subscriber interfaces 400 located at the subscribers' premises provide an interface between the network and the subscribers' terminal equipment (not shown). A central node 110 communicates with subscriber interfaces 400 through remote nodes 103, each of which interfaces a group of subscribers 102 to the central node 110. Local central nodes 110 are interconnected for communication by trunk facilities, either directly or via one or more toll nodes 111.

All communications in the network are transported on optical fibers: distribution fibers 105 interconnect a subscriber interface 400 with a remote node 103, feeder fibers 107 and a control bus extension 106 interconnect a remote node with a local central node, and trunk communication and interoffice signaling fibers 112 and 117, respectively, interconnect local central nodes with each other and with toll central nodes.

The fibers 105, 107, and 112 carry communication channels of two types: narrowband and wideband. For purposes of this application, "narrowband" and "wideband" are defined in terms of unidirectional (i.e., simplex) channel bandwidth. Hence, two channels of opposite direction are required to establish a bidirectional (for example, a duplex) communication path. A narrowband channel is one having a bandwidth of up to and including 64 Kbps, and a wideband channel is one having a bandwidth exceeding 64 Kbps. Typically, a narrowband channel has a bandwidth of 64 Kbps or integral submultiples thereof, i.e., 32 Kbps, 16 Kbps, 8 Kbps, or 4 Kbps. Also typically, a wideband channel has a bandwidth of in excess of about 1.5 Mbps, as services requiring lesser bandwidth than 1.5 Mbps can generally be provided by a plurality of narrowband channels used together. Furthermore, a wideband channel typically has a bandwidth extending into the tens, and preferably hundreds, of Mbps, in order to provide video services such as high-quality interaction video transmissions, over a single wideband channel.

Each subscriber is provided with a plurality (typically 32) of narrowband channels and one or more wideband channels in each direction. Narrowband channels typically carry voice and data communications. The narrowband channels are time-division multiplexed at subscriber premises into a single multiplexed channel. Wideband channels typically carry high-speed data and video communications.

In each direction of communication flow, one of the narrowband channels of each subscriber is dedicated to carrying signaling messages between the subscriber and the local central node. The signaling messages are used for establishing communication services on any and all of the subscriber's channels.

HARDWARE ARCHITECTURE—REMOTE AND CENTRAL NODES (FIG. 2)

Figure 2:
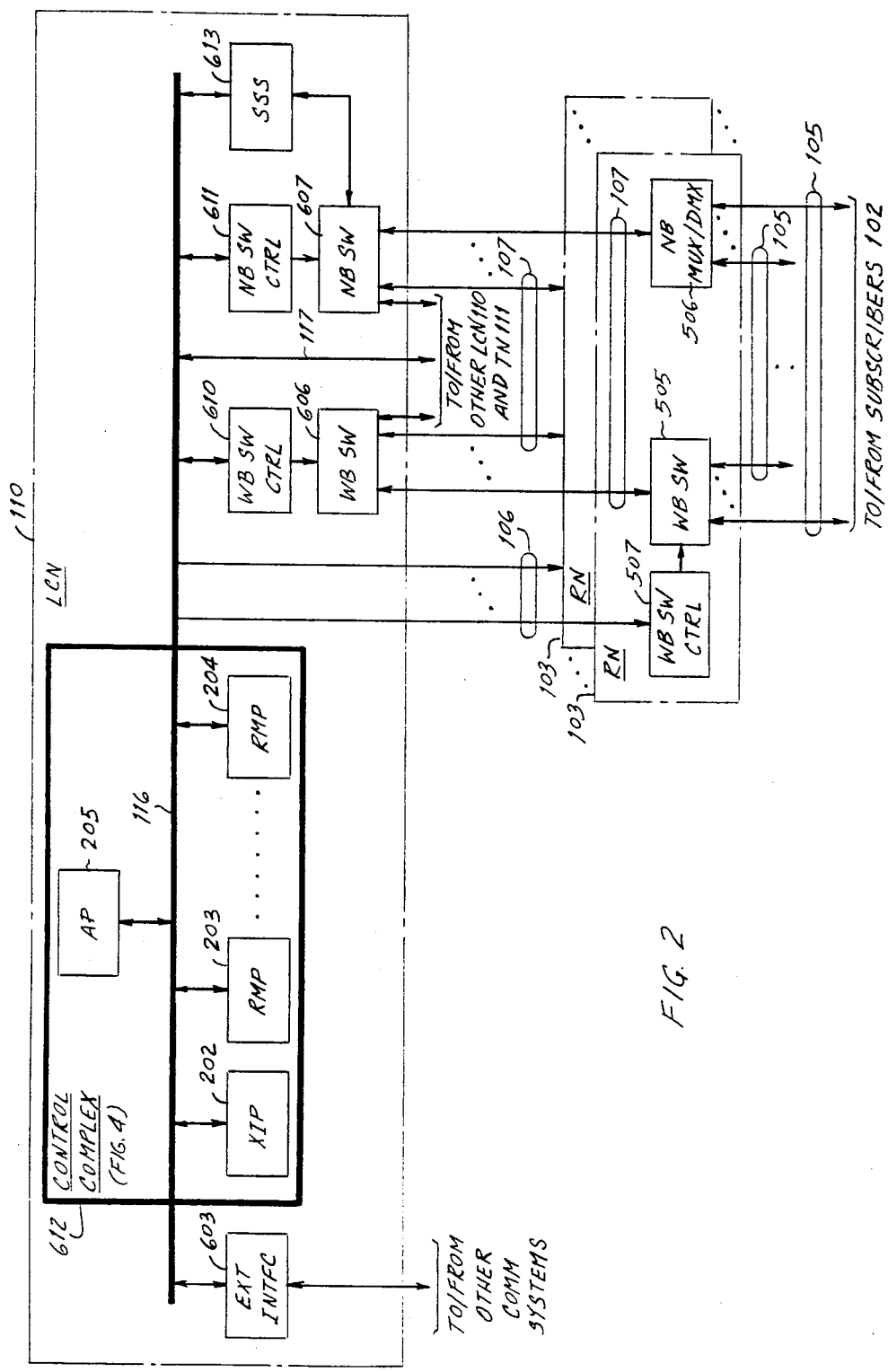
FIG. 2 is a block diagram of a remote node and a local central node of FIG. 1.

Wideband and narrowband channels are handled by separate fabrics in the network. As shown in FIG. 2, each remote node 103 has a wideband digital switch 505 for establishing point-to-point and point-to-multipoint connections between wideband channels of feeder fibers 107 and wideband channels of distribution fibers 105. Each remote node 103 also has a narrowband multiplexer and demultiplexer 506 for combining multiplexed channels of distribution fibers 105 into highly-multiplexed channels of feeder fibers 107, and for separating highly-multiplexed channels of feeder fibers 107 into multiplexed channels of distribution fibers 105. A central node 110 has a wideband digital switch 606 for establishing point-to-point and point-to-multipoint connections between wideband channels of feeder fibers 107, and also between wideband channels of feeder fibers 107 and trunk fibers 112, and a narrowband digital switch 607 for establishing point-to-point and point-to-multipoint connections between narrowband channels of the highly-multiplexed channels of the feeder fibers 107, and also between narrowband channels of highly-multiplexed channels of feeder fibers 107 and trunk fibers 112.

Communications in the network are established in the network under central node control. The central node 110 includes for this purpose a control complex 612 which embodies the illustrative control arrangement of this application. The control complex 612 controls all switches, both within the central node 110 and within the remote nodes 103. Each switch 505, 606, and 607 has its own controller 507, 610, and 611, respectively, which receives control directives from the control complex and carries them out. For this purpose, the switch controllers 507, 610, and 611 are interconnected with the control complex 612 by a high-speed control communication bus 116 and extensions 106 thereof.

The network also provides communication connections between subscribers and other communication systems or communication sources, such as data transport networks, telephone networks, and video service vendors. These connections are established at the local central node, via an "external" interface 603. The connections are established through cooperation between the control complex 112 and the external interface 603. For this purpose, the external interface 603 is also coupled to the high-speed communication bus and communicates thereacross with the control complex 612.

The control complex 612 is illustratively implemented as a multiprocessor computer system. Processors 202–205 that make up the multiprocessor computer system are connected to, and communicate with each other via, the high speed bus 116. The bus 116 also enables the processors 202–205 to communicate with other parts of the described network, particularly with controllers 507, 610, and 611 of the switches of the central and remote nodes, and with the control complexes of other central nodes.

The principal functions of the control complex 612 are divided among the processors 202–205. The processors 205, 202, and 203–204 have principal responsibility for different functions, and each processor acts to support the other processors in their assigned functions while concentrating its efforts on performing its own principal functions. The processors 203–204 have responsibility for like functions, but for different subscribers 102.

The processors 202–205 include a plurality of remote module processors (RMPs) 203–204. The principal functions of the remote module processors 203–204 are call processing and, in support thereof, resource management. Each remote module processor 203–204 is dedicated to serving all of the call processing needs of subscribers 102 subtending one or more remote nodes 103. In order to perform the required call processing functions, a remote module processor 203–204 "owns" and controls the remote node or nodes subtended by its subscribers 102, the distribution channels connecting the subscribers 102 to the remote node or nodes 103, the feeder channels connecting the remote node or nodes 103 to the central node 110, and the central node wideband and narrowband switch 606 and 607 ports that serve those feeder channels.

Processors 202–205 also include an external interface processor (XIP) 202. Processor 202 is dedicated to establishing communication connections between central node 110 and other central nodes of the network as well as with other communication systems, such as the telephone or data transport networks. Hence, its principal functions are likewise call processing and, in support thereof, resource management. Processor 202 "owns" and controls trunks connecting central node 110 with other central nodes of the network, the central node wideband and narrowband switch 606 and 607 ports that serve these trunks, and the external interface 603 interfaces to other communication systems.

Finally, processors 202–205 include an administrative processor (AP) 205. Its principal functions are administration and maintenance: billing, measurements, network management, service evaluation, control complex program updates, and hardware and software integrity. For the performance of these functions, administrative processor 205 relies on cooperation with the other processors 202–204, which supply it with information and respond to its commands.

Often, two or more small central nodes, i.e., each serving a relatively small number of subscribers 102, share use of a single administrative processor 205. In such case, administrative processor 205 is located in one of the central nodes and is connected to buses 116 of the other nodes by bus extensions 106.

CALL PROCESSING MODEL—OVERVIEW (FIG. 3)

The central node control complex 612 is structured to view the network as a set of heterogeneous communication resources that provide connectivity among subscribers. The control of such a network involves: (1) routing and processing of calls, (2) management of shared network communication resources, and (3) billing, administrative, and maintenance functions.

So as not to impose a limited predefined set of services on subscribers, and to allow for future provision of as-yet unforeseen services, control complex 612 manipulates the network in such a way as to provide to subscriber interfaces 400 capability components out of which services can be built. In particular, control complex 612 provides a set of communication resources from which subscribers 102 can fashion services. Subscribers 102 develop whatever services, terminals, and human interfaces they feel are appropriate for their intended applications. They then acquire and control those network communication resources that they feel are necessary to interface their services to the network. A subscriber 102 acquires and controls these resources via signaling messages sent from its subscriber interface 400 over the narrowband signaling channel to control complex 612. Unlike stimulus-oriented signaling that requires several disjoint actions to invoke a feature, message-oriented signaling allows a complete service request to be contained in a single message.

The network provides subscribers 102 with a standard signaling interface—a set of signaling messages and associated parameters—through which they control their connectivity to other subscribers 102. From the point of view of subscriber interfaces 400, the network is one monolithic unit. The internal structure of the network is not visible to subscriber interfaces 400, and hence to subscribers' terminal equipment. In particular, subscriber interfaces 400 are not aware of the functional partitioning between a central node 110 and subtending remote nodes 103, and of the partitioning of nodes 103 and 110 into wideband and narrowband fabrics.

Figure 3:
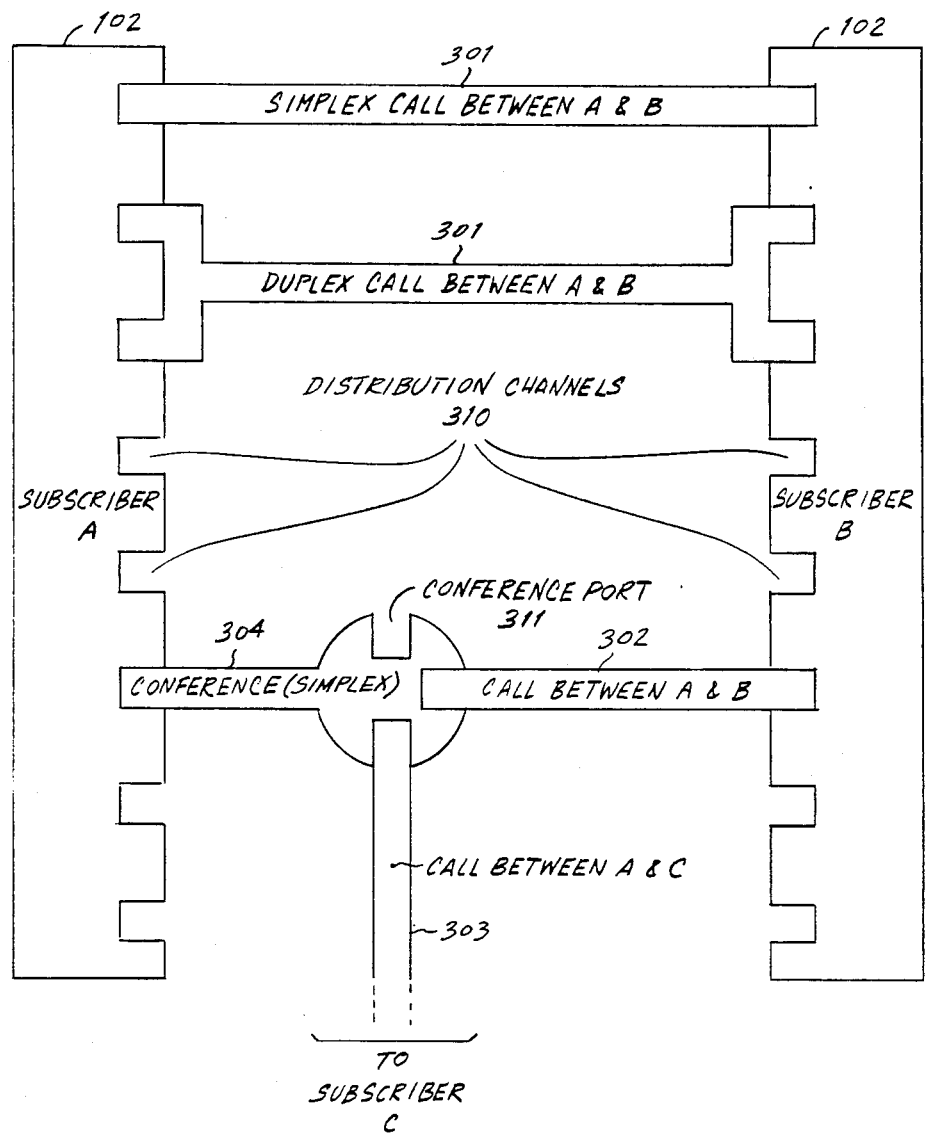
FIG. 3 shows logical structure of a model of the network of FIG. 1, that the network presents to the terminal equipment of network subscribers.

The view of the network that control complex 612 provides to subscribers 102 is graphically illustrated in FIG. 3. There are two kinds of network resources that a subscriber 102 can request and manipulate: calls (301–303) and conferences (304). Signaling messages passed between a subscriber interface 400 and control complex 612 constitute a dialogue about the creation, control, and destruction of calls and conferences. A call is a single-medium communication path between two points, such as a call (301) between two subscribers 102 (subscriber A and subscriber B). In this context, the word "medium" refers to the form of information (for example, narrowband voice, narrowband data, wideband data, or wideband video), and not to the transmission medium, which is always an optical fiber in this illustrative embodiment. Types of calls are either one-way (i.e., simplex incoming to the subscriber or simplex outgoing from the subscriber, requiring use of one channel) or two-way (i.e., duplex, requiring use of two channels). Call are established over, and carried by, subscribers' distribution channels (310). A conference (304) is a logical connector in the network that combines two or more calls (302, 303) into a larger, more complex structure. Each call participating in a conference connects to a port (311) of the conference. The connected calls have a common participant (subscriber A) who is the "owner" of the conference. A conference is connected by the calls to subscribers and/or to other conferences. Types of conferences are also one-way (simplex, requiring a single channel connection to each participating subscriber) or two-way (duplex, requiring both an upstream and a downstream channel connection to each subscriber, not shown). A simplex conference is a multicast, such as a broadcast or a narrowcast. A conference is also described by a count, which is the number of calls that the network guarantees may be combined by the conference. As the need arises, new conference types may be defined and added to the network.

Calls and conferences are assigned identifiers (CALLID or CONFID, respectively) from a common name space. More precisely, identifiers are assigned to the ends of a call rather than to the call itself—the two subscribers at opposite ends of a call refer to the call by independently chosen and usually different identifiers. A call or conference identifier is unique only with respect to the calls and conferences in which a single subscriber participates—two different subscribers may simultaneously use the same identifier to name different, unrelated calls.

The identifiers are used in all messages that refer to the calls or conferences, whether the message is sent by a subscriber interface or the control complex. When a call or conference is logically "created" by request of a subscriber interface 400, the subscriber interface allocates the identifier. When logically "created" by action of control complex 612, the control complex allocates the identifier. The most significant bit in each identifier is reserved to indicate the direction from which the identifier was allocated. Thus, identifiers of calls and conferences originated by a particular subscriber and identifiers of calls and conferences for which that subscriber is a destination are allocated from disjoint sets.

Each subscriber 112 has a fixed set of channels connecting it to the network—distribution channels 310 carried by the distribution fibers 105. A call may be connected to a channel, associated with a channel, or disassociated. If a call is connected to a channel, a physical connection exists and information can flow over the channel between the subscriber and the called party. One or more calls may be associated with a particular channel but not connected to it, in which case only a "logical" connection (association) exists and no information can flow over the channel. However, the subscriber is guaranteed the resources to maintain the connection up to central node 110. A call is disassociated if it is neither connected nor associated with a channel. Hence, to communicate via a call, a subscriber's interface 400 must arrange for the call to become associated with, and then connected to, one or more of the subscriber's channels (perhaps indirectly, via a conference). A channel may be restricted with respect to medium and/or direction. Often, a call might be associated with more than one of a subscriber's channels-for example, a duplex video call requires two wideband channels, one for input and one for output.

To use a conference (304), subscriber interface 400 of the owner (subscriber A) of the conference must request that control complex 612 associate and connect the conference with one or more of the subscriber's channels (310), in the same way as for a call. Calls (302, 303) to the other participants (subscribers B and C) of the conference are then associated with and connected to ports (311) on the conference, in much the same way in which calls are associated with and connected to channels.

For each combination of medium and direction, there is a default channel. Incoming calls are initially associated with the default channel or channels appropriate for the medium and direction of the call. Channel defaults are also applied in contexts in which the subscriber has requested association of a call or conference, but has neglected to say or imply with what. Illustratively, the default channels are the same for all subscribers. An alternative is to allow each subscriber to have different default channels; the default channels in that case are part of the subscriber's profile, stored in a database.

Calls and conferences are owned by one of their participating subscribers. The owner of a call or conference pays for it. Only the owner of a conference may address control requests to it. Conference participants other than the owner are made aware, via signaling messages, of its existence and the identity of its owner, but do not have detailed information about its structure (such as the identities of other non-owner participants, or even the number of participants). Nonowner participants of a conference do not have identifiers for the conference. However, each has an identifier for the call that connects it with the conference.

CONTROL ARCHITECTURE—SUBSCRIBER TO CENTRAL NODE SIGNALING INTERFACE (APPENDIX A)

As was mentioned previously, the central control complex and the subscriber interfaces interact by sending signaling messages to each other. Message signaling simplifies call processing of this network in comparison with standard telephony call processing. Since a message request from a subscriber contains complete information about that request, less interaction is needed between call processing and the subscriber interface to determine exactly what the subscriber wants. Also, since the message is complete, there is a decrease in the amount of state information that is needed to provide a context for interpreting and processing a request. Call processing software of the control complex does not have to determine the meaning of a subscriber's request based on internal state information retained as a result of previous interactions. However, it is still a function of call processing to determine if subscribers should be allowed to have access to the requested services.

The signaling messages provide functions to set up, hold, transfer, and clear calls and conferences. Subscriber interfaces send messages to the network in order to request that some action be taken on behalf of the associated subscriber. The control complex sends messages to subscriber interfaces to notify them of some event. Each message has a message type and a list of message parameter values. The message type specifies the general meaning of the message. This general meaning is made specific by the parameter values. The list of required parameter values depends on the message type. A suitable list of message types and parameters is defined by Recommendation I.451 formulated by the CCITT as part of the the Integrated Services Digital Network (ISDN) standard.

An alternative message set is presented in Appendix A and summarized below. The messages of the set are grouped according to the following categories:
1. Basic Call Operations
    a. SETUP—Initiates (originates) a call from a subscriber's channel or channels.
    b. INCOMING—Notifies the destination subscriber interface of an incoming call.
    c. REORIG—Reoriginates a current call to a new destination.
    d. ALERTED—Notifies the destination's central node that the destination (for example, the destination human subscriber) is being alerted.
    e. ACCEPT—Requests the central node to associate a call with a channel or channels and connect the call thereto.
    f. CLEAR—Requests the central node to tear down (end-to-end) a call.
    g. STATUS—Report from the central node on the current state of a call.
2. Hold and Disassociate
    a. HOLD—Places a call on hold, while retaining the channel or conference bridge association.
    b. DISASSOCIATE—Disassociates a call from its channel or conference bridge.
3. Transfer
    a. TRANSFER—Transfers a call to a new destination.
4. Conferences
    a. CREATE CONF—Requests resources for a conference. (Requests that a conference bridge be inserted into a call path.)
    b. MODIFY CONF—Requests a change in the amount of resources allocated for a conference.
    c. ADD CALL—Adds (originates) a new party to a conference.
5. Initialization Messages
    a. RESET NET—Notification from the central node that all calls for this subscriber have been cleared.
    b. RESET CUST—Request to the central node that all calls for this subscriber be cleared.
6. Errors
    a. ERROR—Notification of an illegal or undecipherable request.

For each message type, there is a list of parameters determined by that message type. Possible parameters are:
BILLING—Special billing specification (e.g., collect, credit card).
CALLID—Call identifier.
CARRIER—Specific carrier selection.
CHAN—Subscriber's logical channel number identifying a channel between a subscriber interface and a remote node. For DUPLEX calls, this is a pair of numbers giving the incoming and outgoing channel numbers.
CID—A call or conference identifier in a context where either is appropriate.
CONFID—Conference identifier.
COUNT—Indication of the number of participants (other than the conference owner) that may be connected in a conference. (This parameter does not impose a hard limit. If specified, the SETUP, CREATE CONF, and MODIFY CONF messages will preallocate resources for the specified number of participants, failing if these resources are not available. In SETUP and CREATE CONF, COUNT is used in cases where there is some knowledge of the eventual size of the conference, and where the conference should not be set up at all unless it can grow to this size.)
DIR—Direction of call (DUPLEX, SIMPLEX-IN, or SIMPLEX-OUT).
DN—Directory number.
ERROR—Code indicating why a subscriber request is considered to be an error.
FAILURE—Code indicating why a legal subscriber request could not be honored.
MED—Medium; a characteristic describing the user information being transmitted and received. Standardized values for this characteristic identify such media as "voice", "video", "interactive data", and "circuit-switched data." This characteristic indicates such attributes as the quality of the connection desired (e.g., to discriminate between possible voice encoding schemes), whether loss insertion should be done, and whether satellite delays are acceptable.

OPI—Optional parameters indicator. This parameter indicates which of the allowable optional parameters actually appear in the message.

REASON—Code indicating reason for termination.

RESET—Code indicating whether a reset message is a request or an acknowledgement.

STATUS—A field indicating the new status of a call or conference, and/or a status transition in a call or conference.

SUB—Subaddress (applied to a DN). The subaddress identifies a particular station, such as a telephone behind a PBX or a terminal or computer on a local area network.

TYPE—Indicates the type of incoming call (SIMPLE CALL, CONFERENCE, or TRANSFER).

USERINFO—User-supplied information of end-to-end significance only (such as the caller's name or a password).

XFERS—An abbreviated transfer history of an end of a call, specifying (at least) the DN of the original destination and of the last party to transfer. If the communication has never been transferred, XFERS is null.

CONTROL SOFTWARE—SUBSCRIBER INTERFACE

Subscriber interface 400 software is functionally divided into a call processing subsystem and a peripheral control subsystem. The functions provided by the call processing subsystem include responding to signaling messages received from the network, interfacing to subscriber terminal equipment, and responding to subscriber service requests.

The function of the peripheral control subsystem is to insulate the call processing subsystem from the details of the hardware of the subscriber interface. The peripheral control subsystem comprises device handlers, each of which provides a software interface to peripherals that are included in the subscriber terminal equipment, and a message handler that provides an interface to the narrowband signaling channel. The primary functions of the message handler include placing messages sent to it from the call processing subsystem into proper form for transmission to the central node control complex 612, and routing of messages received from the central node control complex 612 to appropriate subscriber interface software.

CONTROL SOFTWARE—NODE CONTROL COMPLEX (FIG. 4)

The central node control complex 612 software, which performs the functions necessary to provide multimedia connectivity among subscribers 102, is functionally divided into five subsystems. These are graphically shown in FIG. 4. The main subsystems are call processing (CP) 800 and maintenance and administration (M&A) 801, which together make up an application software layer 200. Subsystems provided in support of application software layer 200 are database management (DBM) 802 and resource management (RM) 803, which together make up a resources software layer 201. Resources layer 201 manages resources that are unique to the application. Further provided in support of application software layer 200, and also in support of resources layer 201, is a distributed operating system (OS) 804. The purpose of operating system 804 is to manage low-level resources that are independent of the application. Functionally, these subsystems parallel similar subsystems of telephony distributed electronic switching systems.

Because control complex 612 is implemented in a multiprocessor (202-205), the central node control complex software shown in FIG. 4 is distributed among processors 202-205. Each processor 202-204 typically includes a portion of each of the subsystems 800-804; consequently, FIG. 4 may also be considered to represent the control software present in each of the processors 202-204. The processor 205 is different in that it does not include call processing and resource management subsystems 800 and 803. Communications between the distributed pieces of software are provided across bus 116 by an inter-process communications facility of operating system 804.

As may be expected, distribution of application layer 200 subsystems 800-801 over processors 202-205 is not equal but follows the function of each processor. Thus, for example, each of the processors 202-204 typically includes little of the maintenance and administration software 801, while administrative processor 205 includes most of the software 801 but none of the call processing software 800.

OPERATING SYSTEM

Operating system 804 is a distributed switching operating system, for example a version of the operating system of the telephony 5ESS ™ switching system of AT&T Technologies, Inc. Operating system 804 provides a process environment for the other switching software subsystems. Operating system 804 provides three fundamental services to the other subsystems: process control, whereby a process can create and destroy other processes, wait on certain conditions to be satisfied, etc.; process communications, whereby any process can send messages to any other process; and timing, whereby a process can request that it be notified after a certain amount of time has elapsed. For the purpose of providing these services, operating system 804 manages the following low-level resources: processor real-time, process stack allocation/deallocation, memory management, and interprocess communication.

Operating system 804 provides services to the other subsystems through an interface of subroutine primitives. For the most part, services are implemented internally in each processor, with the exception of process communications between communicating processes that do not reside in the same processor 202-205. In this case, operating system 804 uses facilities of high-speed bus 116 to send messages between the portions of the operating system which reside in the processors in which the processes reside. These portions route the messages from the originating process to the intended destination process.

Insulating applications software layer 200 from knowledge of where (i.e., on which processor) certain software entities are located is accomplished by defining process identifiers in such a manner that the range of identifiers spans all processors. A single field within a process identifier, the "processor i.d." field, allows the destination processor to be directly addressed (as opposed to having to broadcast to all processors). Each processor has a version of a "send message" routine which checks whether the process identified by the process i.d. resides on this processor. If not, the message is sent out over high-speed bus 116. It is picked up therefrom by the destination processor. All processors have a message handler which checks for incoming messages and forwards them to the appropriate processes.

In order to insulate application software layer 200 from knowledge of absolute process i.d.'s for long-lived "system" processes, a special set of process i.d.'s is defined such that each special i.d. uniquely identifies one of these processes. Upon receipt of an interprocess message (either internal or external) the operating system 804 checks if the destination process i.d. is one of these special i.d.'s. If so, the operating system 804 translates the special i.d. into an actual process i.d. and then delivers the message to that process.

DATABASE MANAGEMENT

Unlike operating system 804, resources software layer 201 manages resources that are unique to the application. These resources can be broadly described as data resources, which are owned and managed by database management subsystem 802, and communication resources, which are owned and managed by resource management subsystem 803.

Though operating system 804 is responsible for memory management, it neither knows nor cares what information is stored in memory. This responsibility falls to database management subsystem 802. Subsystem 802 is responsible for the access, update, and integrity of data within control complex 612.

Database management subsystem 802 manages data about subscribers, network resources, and network resource usage, for use by the other network software subsystems. In particular, database management subsystem 802 manages data needed to map between each subscriber's directory number and its corresponding physical address on the appropriate remote node. Database management subsystem 802 also manages data describing the service capabilities of each subscriber. It further manages a representation of the current network configuration. This includes the current operational status of the various hardware components; this data is needed to allow the network to route around defective or otherwise unavailable components. Database management subsystem 802 also manages data about network resource usage, in the form of a transaction log containing information on when network resources were allocated and deallocated and showing which subscriber is to be billed for the resource usage. And finally, as a service to vendors of broadcast services, database management subsystem 802 maintains access right and usage information concerning broadcast services that may be initiated, i.e., called up, by subscribers.

For most of its clients, database management subsystem 802 provides an interface of subroutine primitives to access or update information. Also included in subsystem 802 are human interfaces for use by craft personnel to access and update system information.

Integrity of data is ensured by audits that compare stored data against physical information, where possible, or against other redundant information. Audits are scheduled to run periodically. In addition, certain audits may be invoked from a maintenance terminal by craft personnel.

RESOURCE MANAGEMENT

Resource management subsystem 803 manages the various physical resources of the network. Its responsibility is to insulate application software layer 200 from knowledge of the physical switching resources. In providing this function, resource management subsystem 803 routes calls, allocates communication paths, keeps track of the states of these paths, instructs switch controllers to make desired connections, routes messages between processes, and allows application software in one central node to communicate with application software in another central node.

Resource management subsystem 803 provides call processing subsystem 800 with a common interface to all switching units, thereby allowing call processing subsystem 800 not to be burdened with the operational details thereof. The interface comprises a set of primitives implemented as subroutine calls. This set of primitives is described further below and in Appendix C.

CALL PROCESSING

Application software layer 200 adapts the network hardware and software to providing particular services. Layer 200 comprises call processing subsystem 800, which provides network capabilities for which subscribers pay, and maintenance and administration subsystem 801, which supports call processing.

Call processing subsystem 800 is responsible for the establishment, management, and termination of subscriber calls, which are the smallest unit of connectivity between subscribers that are controllable by the subscribers. Call processing subsystem 800 handles requests from subscribers for communication services and collects the raw data needed by maintenance and administration subsystem 801 to produce subscriber bills.

Communication service requests are received from subscribers via the standard signaling interface with the subscriber interfaces. This interface is defined by the message set described above and in Appendix A.

Call processing subsystem 800 provides services to subscribers by calling primitives of resources software layer 201 and, in cases where there would be no value added by going through layer 201, by directly using primitives provided by operating system 804.

MAINTENANCE AND ADMINISTRATION

Maintenance and administration subsystem 801 supports call processing. The maintenance portion of subsystem 801 controls maintenance capabilities provided for fault detection and recovery, so as to safeguard the integrity of the network. Specific responsibilities in this arena include: initialization, fault detection, reconfiguration, and diagnosis of suspected faulty equipment. With regard to fault detection, maintenance and administration subsystem 801 provides subroutines for use by call processing subsystem 800 in reporting faults detected during normal processing. From these reported events, maintenance and administration subsystem 801 determines when a suspected faulty hardware unit should be taken out of service. Out-of-service equipment is then scheduled for diagnosis. Maintenance and administration subsystem 801 also schedules routine maintenance functions, including test calls (via loopback logic located at subscriber interfaces) and software audits. Maintenance and administration subsystem 801 is also responsible for communicating with central node craft personnel for manual invocation of maintenance functions.

The administration portion of maintenance and administration subsystem 801 provides billing, measurements, network management, service evaluation, and program update functions. The administration portion is also responsible for interfacing to regional support systems, and for interfacing to communication service vendors for update and retrieval of subscriber authorization and usage data stored in database management subsystem 802.

CALL PROCESSING ARCHITECTURE (FIG. 5)

Having examined the general characteristics and structure of the central node control complex and the software subsystems thereof, consider now the internal characteristics of call processing and resource management subsystems 800 and 803, and their interface with each other.

An illustrative implementation of call processing and resource management subsystems 800 and 803 is shown in FIG. 5. Subsystem 800 comprises two call processing structures: one for point-to-point and conference communications, referred to as point-to-point call processing 8001, and the other for communication vendor (for example, video channel provider) broadcast communications, referred to as proxy vendor call processing 8002. The existence of, and differences between, the two call processing structures are invisible to subscriber interfaces, and hence to subscriber terminal equipment.

MESSAGE ROUTER (FIG. 6)

Figure 6:
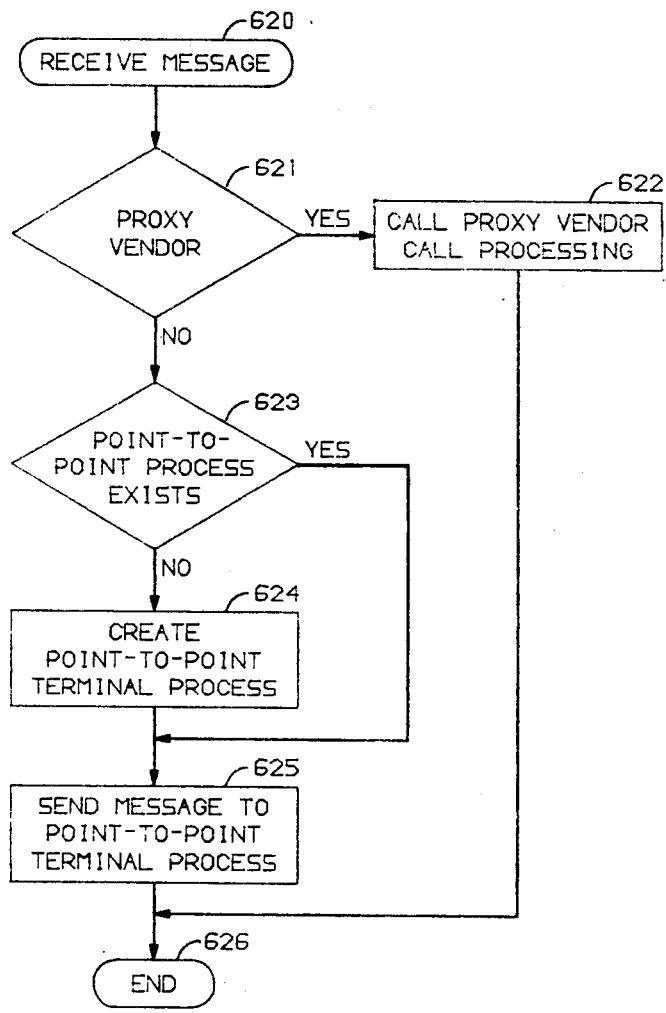
FIG. 6 is a high level flow diagram of operation of the message router of FIG. 5.

An element of call processing that interacts with both structures 8001 and 8002 is a message router 8000. Message router 8000 is the first call processing component to process any message that is addressed to any part of call processing from a subscriber interface. A high-level flow diagram of the operation of the message router 8000 is shown in FIG. 6. The primary task of message router 8000 is to relay messages from subscriber interfaces to appropriate call processing structures, translating call and conference identifiers used by subscriber interfaces into process identifiers used by call processing. As shown in blocks 620–622 and 625, message router 8000 relays a received message either to point-to-point call processing 8001 or to proxy vendor call processing 8002, depending upon the call medium and direction and the destination directory number. As shown in blocks 623–624, message router 8000 creates a process to handle a new call or conference when a subscriber interface requests origination of a new point-to-point call or conference.

SETUP, CREATE CONF, and ADD CALL messages (which request origination of a new point-to-point call or conference or of a proxy vendor call) are handled by message router 8000 as follows:

1. The destination directory number, call medium (e.g., VIDEO, VOICE, or DATA) and call direction (SIMPLEX-IN, SIMPLEX-OUT or DUPLEX) are checked against a table of available proxy vendor services.

2. If the requested call does not match any of the available proxy vendor services, the call is treated as a point-to-point call. Use is made of the process control service provided by the operating system 804 to create a new call and/or conference terminal process and initialize it with information extracted from the received message. The CID used by the subscriber interface to name this call or conference is associated in a database with an identifier of the terminal process (TPID). The message is in error if the CID is found to be already in use. 3. If the requested call does match a proxy vendor service, the call is treated as a proxy vendor call. The originating subscriber's access rights to the service are checked in the database. Assuming that the subscriber has access to the service, the call identifier is associated with a proxy vendor call register in the database, and proxy vendor call processing 8002 is notified to set up the call.

Other subscriber messages referencing a call are handled by message router 8000 as follows:

1. The call or conference identifier is looked up in the database. If it is not found, the message is in error.

2. If the call or conference identifier is associated with a terminal process identifier, then the call or conference identifier names a point-to-point call or conference. The message is forwarded to the terminal process.

3. If the call identifier is associated with a proxy vendor call register, then the call identifier names a proxy vendor call. Proxy vendor call processing 8002 is notified to process the message, which is passed as an argument.

POINT-TO-POINT CALL PROCESSING

Point-to-point call processing 8001 is organized as a collection of terminal processes (650, 660, 670; see FIG. 7) which handle subscriber service requests. It is implemented in a one-process-per-subscriber-per-call form. Each message is processed by a terminal process as a transaction. A transaction is any element of data, control, signal, event, or change of state that causes, triggers, or initiates some action or sequence of actions. Each terminal process serves just one subscriber, and handles just one call or conference for that subscriber. In other words, a call terminal process carries out the processing functions for a given end of a call: there are two terminal processes per call, one for each subscriber's end of the call, whether or not the call is part of a conference. In addition, each conference is managed by a single conference terminal process. A conference logically connects the owner of the conference to the other conference participants. All the terminal processes that serve a given subscriber reside in the remote module processor 202–204 (see FIG. 2) that serves that subscriber. A conference terminal process resides in the processor 203–204 that serves the owner of the conference, along with the call terminal processes that manage the conference owner's ends of the calls that are a part of the conference. Terminal processes are created and destroyed as needed—that is, as calls and conferences are set up, transferred, or cleared. Thus, a subscriber who currently has no calls or conferences has no terminal processes.

A conference terminal process is spawned by a call terminal process when the call terminal process receives a message from a subscriber interface directing that the call be associated with a port on a new conference. There are two such message types:

CREATE CONF Requests that an existing call be associated with a port on the new conference.

SETUP (with the optional CONFID parameter) Requests that the new call being set up be initially associated with a port on the new conference.

TERMINAL PROCESS (FIGS. 7-9)

Figure 7:
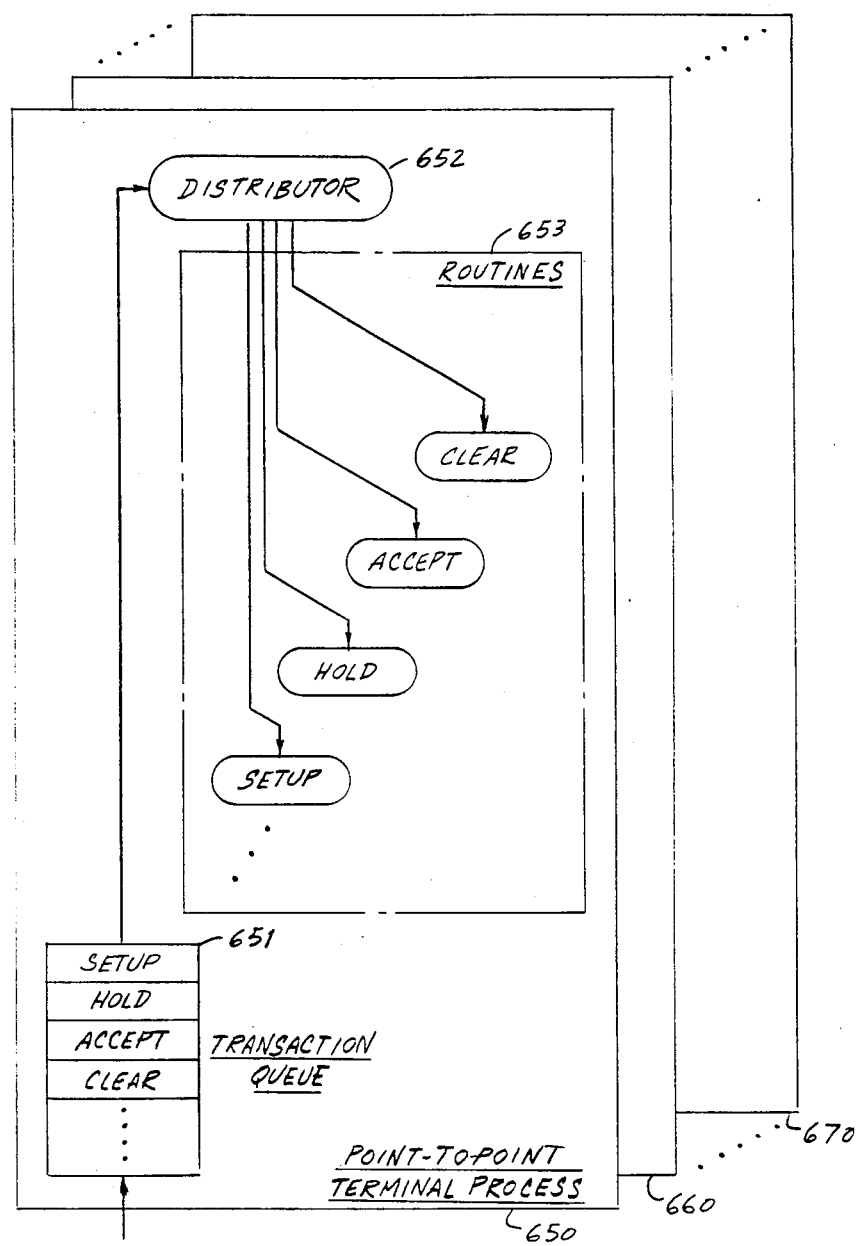
FIG. 7 is a block diagram of a terminal process point-to-point call processing of FIG. 5.

An illustrative terminal process 650 is shown in FIG. 7. Terminal process 650 has associated with it a transaction queue 651 in which transactions, such as messages received from subscribers, are placed. During its operation, terminal process 650 cycles through a loop. In each loop cycle, one transaction is read from the terminal process' queue 651. If queue 651 is empty, terminal process 651 gives up its stack and takes a real time break until a transaction arrives for it. When a transaction is successfully read from the queue 651, it is interpreted by a distributor 652, which then invokes out of a collection of routines 653 the appropriate transaction processing routine for the transaction.

In general, each input message type is handled by a different routine; the routines 653 correspond one-for-one to the messages listed in Appendix A. Alternatively, some groups of similar message types may be handled by a common function. Preferably, there is also a library of shared "service" subfunctions for performing common operations. The actions of the invoked routine generally include producing output—sending status messages to the subscriber interface and to the terminal process at the other end of the call to keep them informed of activities affecting the call, and making subroutine calls to other processes or subsystems, principally those of the resource management subsystem, to allocate/deallocate, associate/disassociate, and connect/disconnect resources required for the call—and updating the state (described below) of the terminal process, which reflects the state of the call. Some routines may wait for replies from specific other processes. Each transaction is processed to completion before the next transaction is retrieved from the queue, unless an error occurs.

The transactions are the same for all media types, and the actions that terminal process 650 takes in response to them are identical. The differences are hidden by the resources software layer 201.

Figure 8:
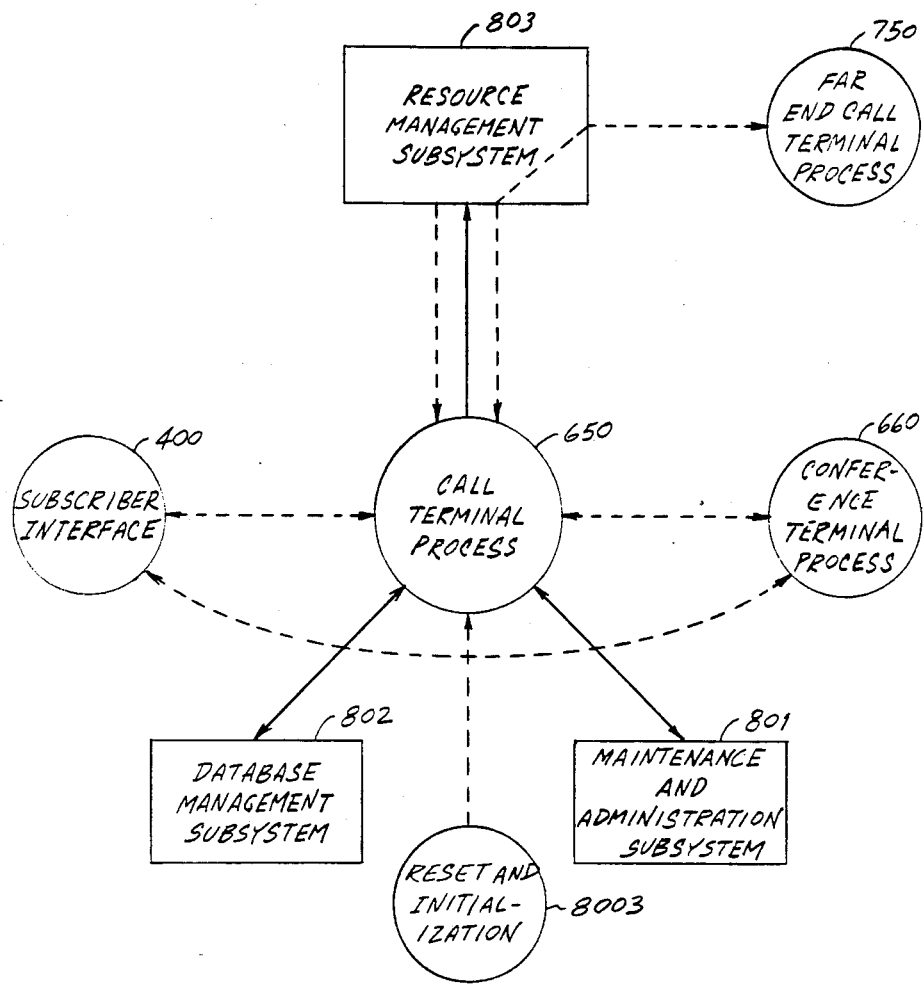
FIG. 8 is a logical diagram of interactions of a call terminal process of FIG. 7 with other network entities.
Figure 9:
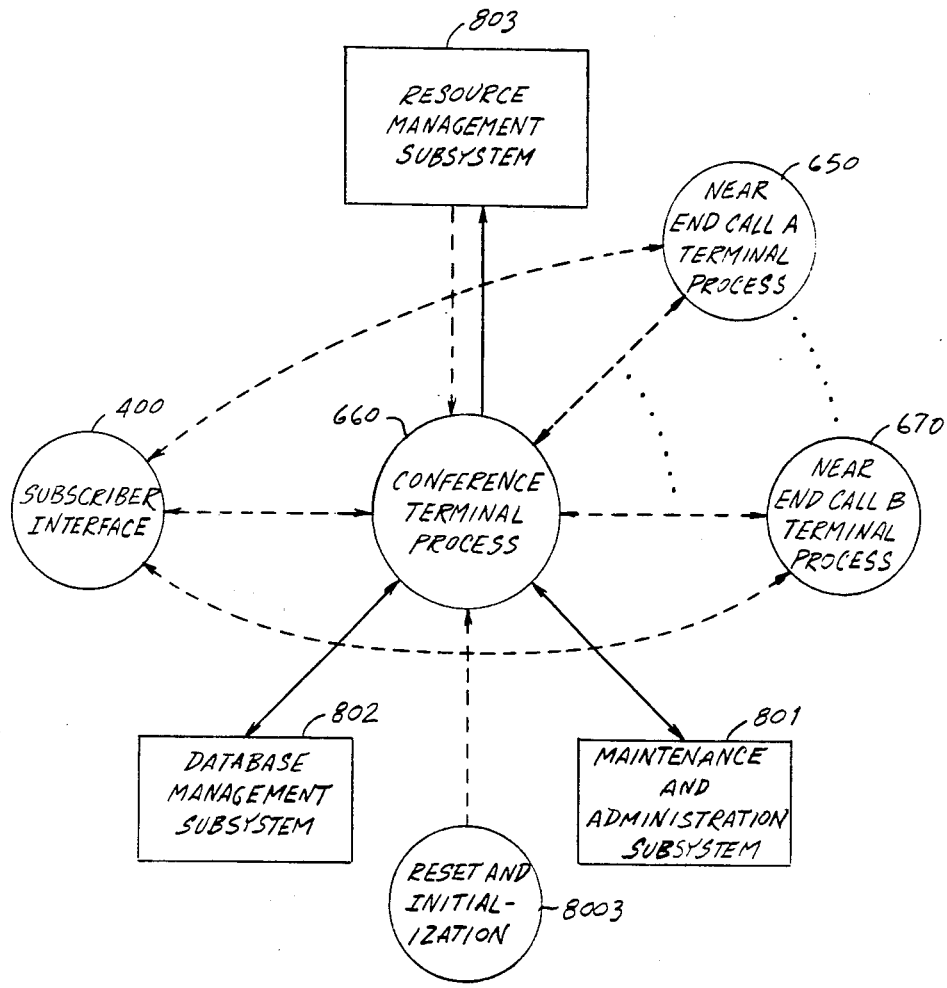
FIG. 9 is a logical diagram of interactions of a conference terminal proocess of FIG. 7 with other network entities.
Figure 10:
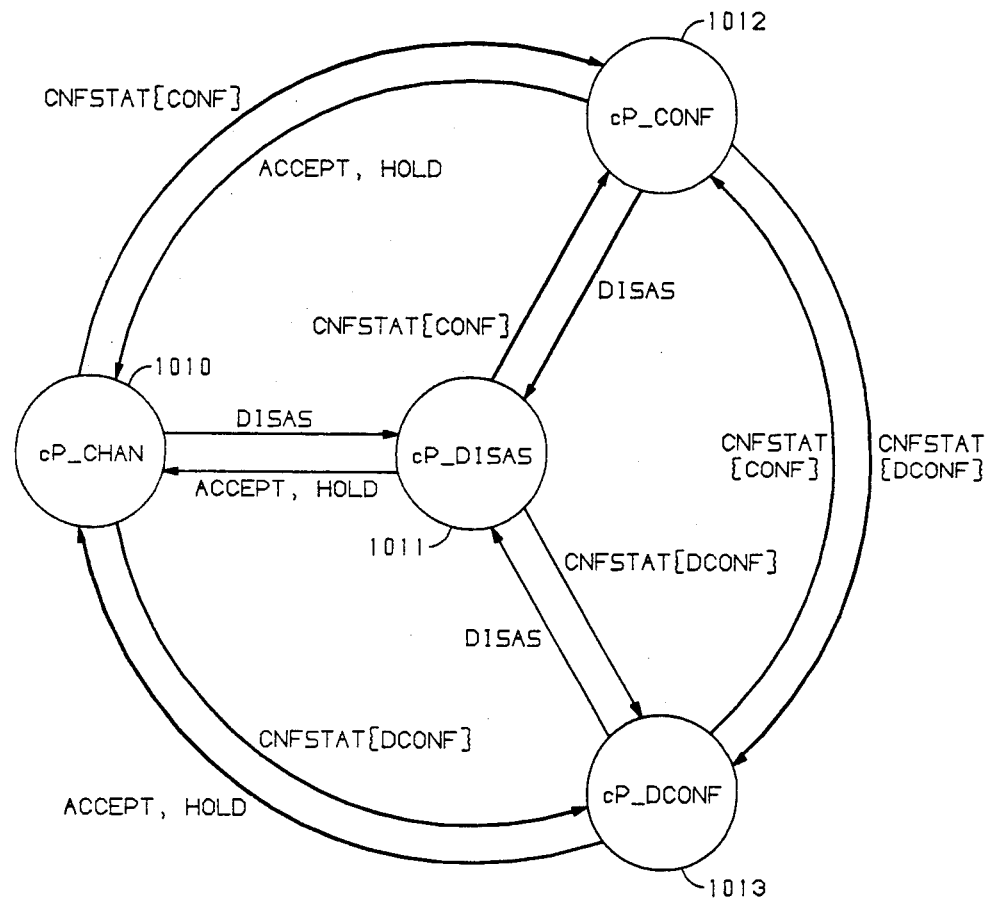
FIG. 10 is a state diagram of association class of a call terminal process of FIG. 7.
Figure 11:
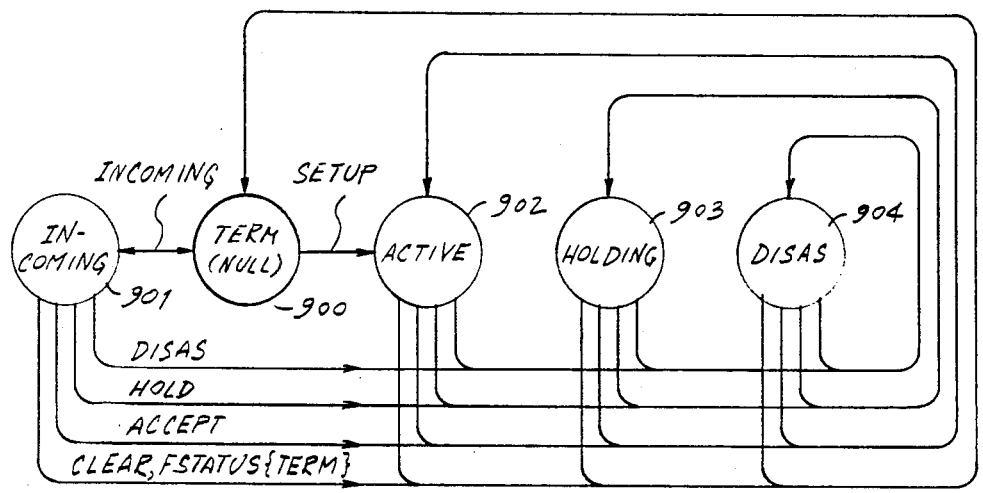
FIG. 11 is a state diagram of call connect status of a call terminal process of FIG. 7.
Figure 12:
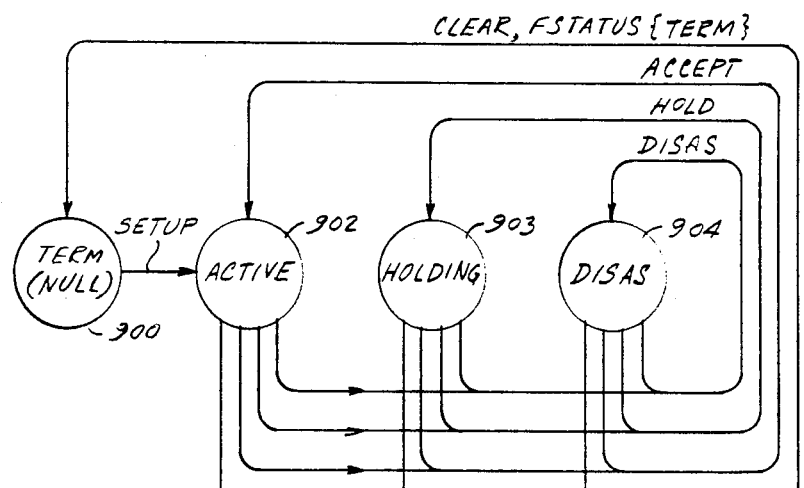
FIG. 12 is a state diagram of call connect status of a conference terminal process of FIG. 7.

Interactions of call and conference terminal processes 650 and 660, respectively, with other network entities are graphically illustrated in FIGS. 8 and 9, respectively.

As shown in FIG. 8, in the course of performing its functions, a call terminal process 650 communicates with: other entities of call processing subsystem 800, such as the call terminal process 750 at the other end of the call, a conference terminal process 660, and reset and initialization 8003; maintenance and administration subsystem 801; database management subsystem 802; resources management subsystem 803; and subscriber interface 400. Communications with subscriber interface 400, conference terminal process 660, call terminal process 750, and reset and initialization 8003 are conducted via messages, as are returns from resource management subsystem 803. Communications to subsystems 801-803 are conducted via subroutine calls.

As shown in FIG. 9, in the course of performing its functions, a conference terminal process 660 communicates with other entities of call processing subsystem 800, such as the call terminal processes 650 and 670 at the conference end of calls (A and B, respectively) participating in the conference, and reset and initialization 8003; maintenance and administration subsystem 801; database management subsystem 802; resources management subsystem 803; and subscriber interface 400. Communications with subscriber interface 400, call terminal processes 650 and 670, and reset and initialization 8003 are conducted via messages, as are returns from subsystem 803. Communications to subsystems 801-803 are conducted via subroutine calls.

Transactions serving as inputs to a terminal process include the following. From subscriber interface 400, a terminal process receives messages requesting that it perform control operations on the call or conference. The messages from subscriber interface 400 are relayed to the terminal process by message router 8000. From the terminal process at the other end of the call a call terminal process receives messages passing setup information for new calls, status information, reorigination requests to effect a call transfer, and notices of call clearing. From call terminal processes, a conference terminal process receives requests to become associated with the conference. And from a conference terminal process, associated call terminal processes receive status information. From resource management subsystem 803, the terminal process receives return codes from subroutine calls, and messages announcing changes in the call that were initiated by the network (for example, that a call is being cleared by maintenance due to a detected problem). From database management subsystem 802, a terminal process receives returns from subroutine calls. Reset commands come from a reset process set up for the subscriber (described below).

Events serving as outputs of a terminal process include the following. To the subscriber interface, a terminal process sends STATUS messages notifying the subscriber interface of changes in the call or conference. These include changes requested by notices of new calls received either from the subscriber or from the other side of a call for which the subscriber is a destination. To the call terminal process at the other end of the call, the call terminal process sends messages containing status information; such messages are delivered by the resource manager internal messages 8034. And to a conference terminal process, a call terminal process sends messages requesting association, messages giving notice of status changes (including disassociation, hold-/unhold, and termination), and messages to initialize a new conference spawned from this call; such messages are delivered by the operating system 804. To resource management subsystem 803, the terminal process makes subroutine calls to request allocation or deallocation of communication resources, and to control allocated resources. The terminal process also issues requests to subsystem 803 to deliver messages to the terminal process at the other end of the call. To database management subsystem 802, the terminal process makes subroutine calls to request subscriber data, to update or access associations between call identifiers and terminal process identifiers, and to access a subscriber's reset state which encodes information about whether a subscriber is currently being reset. And the maintenance and administration subsystem 801, the terminal process makes subroutine calls to log billing and internal trace data.

A conference terminal process communicates with call terminal processes that are managing the conference owner's ends of calls that are associated with the conference. It passes requests and status information in both directions. Call terminal processes send association requests to the conference terminal process in order to become associated with a conference port. The conference terminal process then calls the appropriate resource management subsystem 803 primitive to establish the association. A clear (hangup) request from the subscriber interface to a conference terminal process is forwarded to the call terminal processes of all calls associated with the conference.

Consider now an example of the operation of a terminal process. The message router 8000 creates an originating terminal process in response to a message from subscriber interface 400 requesting that a new call or conference be set up (originated), but does not obtain a call register therefor. The message router 8000 then calls a point-to-point call processing function CPsetup, which obtains the call register and initializes the terminal process by filling the call register with appropriate data and sending a message to the new terminal process (via operating system message primitives) to tell the new terminal process the address of its call register. The originating terminal process then accesses the originating subscriber's service capability information in database management subsystem 802 and analyzes that information based on the request made. If the subscriber's request is valid, then the sequence of actions needed to set up the call is initiated.

First, the terminal process makes a subroutine call on resource management subsystem 803 to allocate the resources necessary for a path to connect the originating and destination subscribers (including a conference bridge in the case of a conference terminal process), and to pass an INCOMING message to the as-yet uncreated destination terminal process. This action causes resource management subsystem 803 to return to the originating terminal process a path identifier (PATHID), which is thereafter used by the originating terminal process to refer to the call in requests made to resource management subsystem 803. Resource management subsystem 803 also accesses routing and translation information on the destination subscriber in database management system 802. If resource management subsystem 803 detects that the call is destined for a customer who is not a subscriber to the network, the call is routed to the appropriate "external" interface to a communication system of which the customer is a subscriber. If the call is destined for a network subscriber, the destination subscriber is located and resource management in the destination subscriber's remote module processor is notified via a LOCATE message.

When the LOCATE message reaches the destination subscriber's remote module processor, the resource management subsystem 803 calls point-to-point call processing function CPincoming, which obtains a call register for the (not yet created) destination terminal process, puts appropriate data in the call register to initialize the terminal process, creates the destination terminal process, and sends a message to the new terminal process to tell it the address of the call register. The destination terminal process is thereby given an initial description of the call, including the INCOMING message from the originating terminal process and a PATHID to use in referring to the call.

The destination subscriber's terminal process notifies the destination subscriber of the intended call. As soon as the destination subscriber accepts the call, the call path is fully connected and the call becomes "active". The terminal process monitoring the owner's (i.e., the subscriber's who is responsible for paying for this call) end of this call causes maintenance and administration subsystem 801 to record information concerning when this call starts and when it terminates. Until there are additional valid requests to change the call, made by one of the participating subscribers, the call data remains unchanged. This data remains active in maintenance and administration subsystem 801 until one of the subscribers issues a termination request.

When one of the subscribers does issue a termination request, its call end's terminal process makes a subroutine call on its processor's resource management subsystem 803 to deallocate the resources that are allocated to its end of the call in order to clear the call, sends a status message to the subscriber interface to notify it that call clearing has been initiated, and sends a "far status" message to the terminal process on the other side of the call to inform it that the call is being terminated. The terminal process then changes its internal state to reflect these activities, and waits for an acknowledgment message from the terminal process on the other side of the call. Upon receipt of this message, the terminal process terminates.

When the terminal process on the other side of the call receives the "far status" message indicating call termination, it makes a subroutine call on its processor's resource management subsystem 803 to deallocate the resources that are allocated to its end of the call. It then sends a status message to the subscriber interface at its end of the call to notify it that call clearing has been initiated, and sends a "far status" message indicating call termination to the terminal process on the other side of the call. This far status message is the acknowledgement message awaited by that terminal process. The terminal process then changes its internal state to reflect these activities, and waits for a "call clear" message from the subscriber interface. Upon receipt of this message, the terminal process terminates.

PROCESS STATES (FIGS. 10–16)

The state of a call or conference terminal process represents the state of the call or conference. It is encoded as a combination of several state variables, which are stored in the terminal process' call register (see FIG. 15) or conference register (see FIG. 16) in processor memory. The register is allocated to the call or conference terminal process as part of its initialization.

Four state variables encode the state of a call terminal process: two variables encode the status of the terminal process' end (near end) of the call or conference, and two state variables encode the status of the other end (far end) of the call. Three state variables encode the state of a conference terminal process: two the status of the conference itself, and the other the status of the far end of calls involved in the conference. The state variable that encodes the far end status represents a compendium of the far end statuses of the calls that are involved in the conference.

The near end state variables of a call or conference are association class (ASCLASS) and connect status (CS_STATUS).

The association class of the call relative to the near end subscriber indicates with what kind of object, if any, the call is associated. ASCLASS of a call is diagramed in FIG. 10. It can have the following four values:

cP_CHAN state 1010—The call is associated with one or more channels at the near end. The channel or channels are given by state parameter CHAN.

cP_DISAS state 1011—The call is not associated with any channel or conference port at the near end. The process is sent into this state from any other state by receipt from the subscriber interface of a DISASsociate message. The process makes the transition from the $cP_{13}$ DISAS state 1011 to the $cP_{13}$ CHAN state 1010 in response to receipt from the subscriber interface of either an ACCEPT or a HOLD message without the optional CONFID parameter.

cP—CONF state 1012—The call is associated with a conference port at the near end. The conference must have at least one other call associated with one of its ports. The conference is identified by state parameter CONF. The process is sent into this state from any other state by receipt of a CNFSTAT message sent by the associated conference terminal process and accompanied by a parameter indicating that the call is associated with a non-degenerate conference. In the case of transition to the state 1012 from the state 1010 or 1011, the CNFSTAT message is the last message in a sequence of messages that began with one of the following messages from the subscriber: ACCEPT message containing a CONFID parameter, HOLD message containing a CONFID parameter, or a CREATE CONF message. The process undergoes a transition from state 1012 to state 1010 upon receipt from the subscriber of an ACCEPT or a HOLD message with an explicit CHAN parameter value.

cP—DCONF state 1013—The call is associated with a conference port at the near end. The conference is identified by state parameter CONF. The conference is a degenerate conference, i.e., this call is the only call associated with a port on the conference. The process is sent into this state from any other state by receipt of a CNFSTAT message sent by the associated conference terminal process and accompanied by a parameter indicating that the call is associated with a degenerate conference. In the case of transition to the state 1013 from the state 1010 or 1011, the CNFSTAT message is the last message in a sequence of messages that began with one of the following message from the subscriber: ACCEPT message containing a CONFID parameter, HOLD message containing a CONFID parameter, or a CREAT CONF message. The process undergoes a transition from state 1013 to state 1010 upon receipt from the subscriber of an ACCEPT or a HOLD message with an explicit CHAN parameter value.

A conference ASCLASS variable can have one of only two values: ASSOCIATED with or DISASSOCIATED from a channel. However, its value can be deduced from the current value of conference CS—STATUS, and hence there is no need to store it: if CS—STATUS is INCOMING, HOLD, or CONNECTED, then ASCLASS is ASSOCIATED, and if CS—STATUS is DISASSOCIATED, so is ASCLASS.

CS—STATUS variable indicates connection status of the call or conference relative to the near end subscriber. It is the CONNECT status reported to the subscriber interface by call processing via the STATUS message. The connect statuses of a call and of a conference are diagramed in FIGS. 11 and 12, respectively. CS—STATUS of a call or conference can have the following four values:

mGCS—TERMINATED state 900—The subscriber at one of the two call ends has requested that the call, or conference, be terminated. Call, and conference, clearing is in progress. Logically, this state is also the NULL state of the call, or conference; the state when the call or conference terminal process, and hence the call or conference, does not exist. The process is sent into this state from any other state by receipt of a CLEAR message from the subscriber interface at this end of the call, or an FSTATUS message from the other side of the call indicating that the far end status is TERMINATED.

mGCS—ACTIVE state 902—The call, or conference, is actually connected to the one or more channels or to the conference port with which it is associated. The process is sent into this state from TERMINATED state 900 by receipt of a SETUP message from the subscriber interface at this end of the call, and from any other state by receipt of an ACCEPT message from the subscriber interface.

mGCS—HOLDING state 903—The call, or conference, is associated with, but is not connected to, a channel or conference port. The process is sent into this state from any other state but the TERMINATED state 900 by receipt of a HOLD message from the subscriber interface at this end of the call.

mGCS—DISASSOCIATED state 904—The call, or conference, is not associated with or connected to any channel or conference port. The process is sent into this state from any other state but the TERMINATED state 900 by receipt of a DISASSOCIATE message from the subscriber interface at this end of the call.

In addition, the CS—STATUS of a call can have the value:

mGCS—INCOMING state 901—The call is an incoming call that has not yet been answered. It is associated with one or more default channels for its medium and direction. This state does not exist for a conference terminal process. The call terminal process is sent into this state from the TERMINATED state 900 by receipt of an INCOMING message from the other side of the call.

There is obvious redundancy between ASCLASS and CS—STATUS. (For example, ASCLASS=cP—DISAS implies CS—STATUS=mGCS—DISASSOCIATED, and vice versa.) Consequently, not all combinations of ASCLASS and CS—STATUS values are legal.

The far end status state variables of a call terminal process are FS—STATUS and FC—STATUS. A conference has only the FS—STATUS variable. For a call, FS—STATUS encodes the status of the far end of the call, as reported to the near end's terminal process by the far end's terminal process and by the resource management subsystem 803. FS—STATUS is just the FAR END status reported to the near end subscriber interface by call processing in the STATUS message. The far end status of a call is diagramed in FIG. 13. $FS_3$ STATUS can have the following five values:

$mGFS_3$ TERMINATED state 1100—The call has been cleared at the request of either end, or due to a failure in the network. Logically, this state is also the NULL state of the call; the state when the far end call terminal process, and hence the far end of the call, does not exist. The terminal process is sent into this state from any other state by receipt of a CLEAR message from the subscriber interface at its end of the call, or by receipt of an FSTATUS message from the other side of the call indicating that the far end status is TERMINATED.

mGFS—PENDING state 1101—Call setup is in progress. The existence of the terminal process at the far end is not yet assured. This is the value of FS—STATUS until a message is received from the far end terminal process, or until the resource management subsystem 803 notifies the near end terminal process that the call could not be set up. The terminal process is sent into this state from TERMINATED state 1100 by receipt of a SETUP message from the subscriber interface at its end of the call. Receipt of an FSTATUS message from the other side of the call indicating that the other end is PENDING maintains the terminal process in the state 1101.

mGFS_ALERTED state 1102—The subscriber interface at the far end has begun alerting the human subscriber. The terminal process is sent into this state from the PENDING state 1101 by receipt of an FSTATUS (ALERTED) message from the other side of the call. While the terminal process is in this state 1102, receipt of an FSTATUS (ALERTED) message from the other side of the call maintains it in the state 1102, and receipt of an FSTATUS (PENDING) message from the other side of the call sends it into the PENDING state 1101.

mGFS_CONNECTED state 1103—The far end of the call is connected to a conference port or to a subscriber channel. The terminal process is sent into this state from the TERMINATED state 1100 by receipt of an INCOMING message from the other side of the call indicating that the state of the other side of the call is CONNECTED. The terminal process is also sent into this state from any other state by receipt from the other side of the call of an FSTATUS (CONNECTED) message.

mGFS_HELD—The far end of the call is not connected to a channel or conference port at the far end. If the subscriber at the far end of the call is the destination, that subscriber has already accepted the call. The terminal process is sent into this state from the TERMINATED state 1100 by receipt of an INCOMING message from the other side of the call indicating that the state of the other side of the call is HELD. The terminal process is also sent into this state from any other state by receipt from the other side of the call of an FSTATUS (HELD) message.

Figure 13:
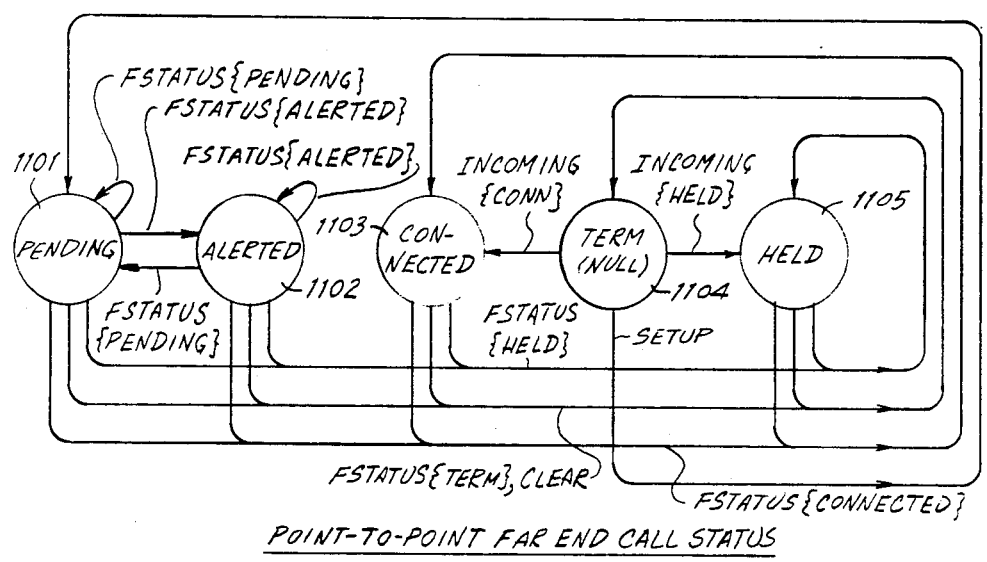
FIG. 13 is a state diagram of far end call status of a terminal process of FIG. 7.

The conference FS_STATUS is likewise represented by FIG. 13. However, for a conference, FS_STATUS encodes a compendium of the statuses of the far end of all calls involved in the conference. The conference FS_STATUS represents the highest-order far status state of any of the associated calls. The descending order of the far status states is: CONNECTED, HELD, ALERTED, PENDING, TERMINATED. Thus, if any one of the calls associated with the conference is in the CONNECTED state, the conference FS_STATUS is CONNECTED. And only when all calls associated with the conference are in the TERMINATED state is the conference FS_STATUS TERMINATED.

Figure 14:
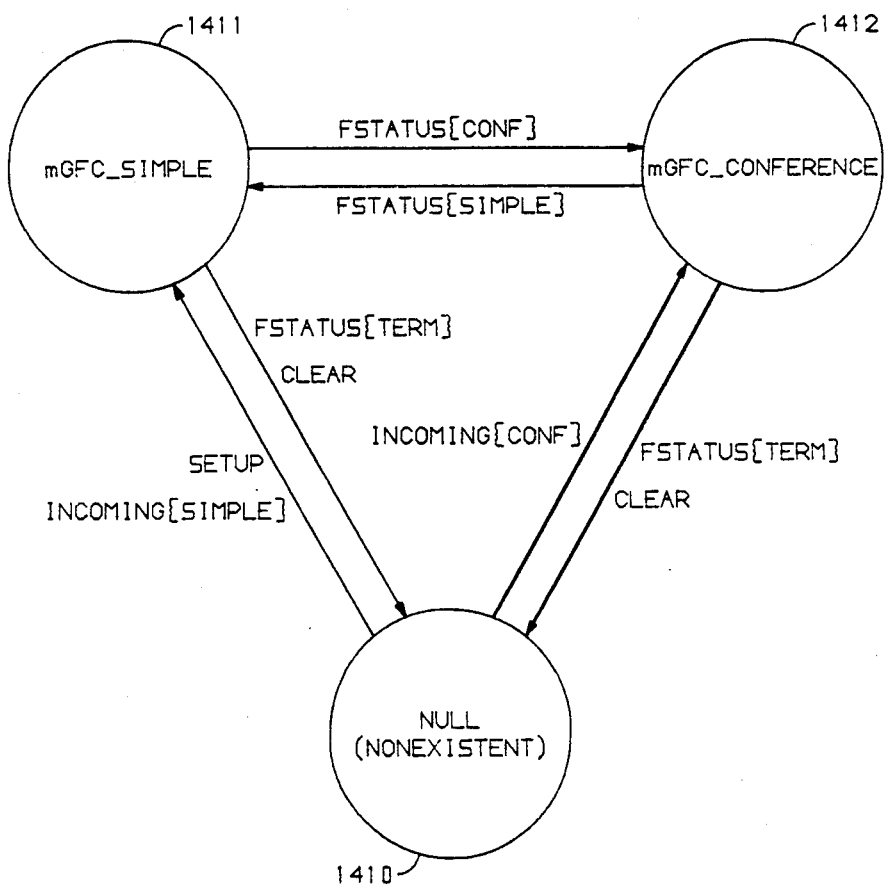
FIG. 14 is a state diagram of far end conference status of a terminal process of FIG. 7.

The state variable FC_STATUS indicates whether the far end of the call is associated with a conference that is not degenerate, as reported by the far end's terminal process. It is just the far conference status reported to the near end subscriber interface by call processing in the STATUS message. The far end conference status of a call is represented in FIG. 14. FC_STATUS can have the following three values:

NULL state 1410—the far conference status of a nonexistent call. This value is not recorded. Transition to this state is made by the process in response to receipt of either a CLEAR message from the subscriber or an FSTATUS message from the other end of the call indicating that the far end status is TERMINATED.

mGFC_SIMPLE state 1411—The far end's ASCLASS is not CONF. The process assumes this state from the NULL state 1410 upon receipt of a SETUP message from the subscriber, or upon receipt of an INCOMING message from the other end of the call indicating that the ASCLASS value of the far end is any value but CONF. Receipt in the state 1411 of an FSTATUS message from the other end of the call indicating that the far end status is CONF sends the process into state 1412.

mGFC_CONFERENCE state 1412—The far end's ASCLASS is CONF. The process assumes this state from the NULL state 1410 upon receipt of an INCOMING message from the other end of the call indicating that the ASCLASS value of the far end is CONF. Receipt in the state 1412 of an FSTATUS message from the other end of the call indicating that the far end status is any value but CONF sends the process into state 1411.

Other status information about the call or conference (for example, the directory numbers of the participating subscribers, the medium, the direction, etc.) is also stored in the call or conference register in the processor memory, as illustrated in FIGS. 15 and 16, respectively. This information includes call or conference status parameters and call or conference descriptors, and, in the case of a conference, a port parameter. The call or conference status parameters are:

CHAN—If the call or conference is associated with one or more channels at the near end (state variable ASCLASS is cP_CHAN), CHAN names the one or more channels with which the call or conference is associated.

CONF—If the call is associated with a conference port at the near end (state variable ASCLASS is cP_CONF or cP_DCONF), CONF contains the identifier of the conference's terminal process (TPID), the CONFID of the conference port's identifier(s). Because the CHAN and CONF status parameters are mutually exclusive, they are overlaid in the call register.

FARDN—The directory number of the subscriber at the far end of the call.

PATHID—The upper path (see below) identifier, obtained from the resource management subsystem 803, that names the call or conference. PATHID is used to communicate with the subsystem 803 about the call's or conference's resources, and to address the terminal process at the far end of the call via primitives provided by the subsystem 803.

CALLS—The number of calls associated with ports on the conference, i.e., the number of conference ports in use.

COUNT—The number of ports on the conference. CALLS may not exceed COUNT. CALLTPID must have at least as many elements as COUNT.

The call or conference descriptors are:

TPID—The call or conference process' TPID.

CUSTID—The internal subscriber identifier of the subscriber at the near end of the call or conference.

CALLID—The call identifier used to communicate with the subscriber interface about the call.

CONFID—The conference identifier used to communicate with the subscriber interface about the conference.

MED—The medium of the call or conference, chosen from the menu of media supported by the network. These include VOICE, DATA, and VIDEO, and optionally others.

CONFTYPE—The conference type. This is closely related to the medium of the conference. However, CONFTYPE distinguishes between such conference types as "silent video" and "video with audio".

DIR—The direction of the call or conference, relative to the subscriber at the near end. DIR distinguishes between duplex conferences, which are conferences in the usual sense, and simplex conferences, which are point-to-point (as opposed to service vendor) broadcasts. DIR takes the values:

mG_DUPLEX—In the case of a conference, every participant can transmit to every other participant, and every participant can receive from every other participant (excepting, of course, participants on hold).

mG_SIMPLEX—IN—This value does not exist for a conference.

mG_SIMPLEX—OUT—In the case of a conference, the conference is a point-to-point broadcast, with the conference owner as source.

OWNER—An indicator of whether the subscriber at the near end owns, and is to pay for, the call. This variable controls the logging of billing data. It also enters into situations such as transfer requests, where policy restricts subscriber requests based on ownership. OWNER can take on the values:

cP—OWNER—Originator of a standard billed call, or destination of a collect call.

cP—NOTOWNER—Destination of a standard billed call, or originator of a collect call. Other values can be added as necessary to handle such features as third party billing.

DN—The directory number associated with the near end of the call.

The conference port parameter is CALLTPID, an array of TPIDs identifying the terminal processes of the calls associated with the conference's ports. If a port is not in use, its CALLTPID entry has a null value.

PROXY VENDOR CALL PROCESSING

Proxy vendor call processing reduces the response time for accesses to service vendor services by eliminating the need for building a path through the network all the way from the vendor to the subscriber, and by integrating call processing functions with call destination (vendor) subscriber interface functions in a finite state machine call processing structure. Proxy vendor call processing also reduces the overall cost of giving subscribers access to a service, by sharing among the subscribers a single path from the vendor to a service access point within the network.

The proxy vendor structure provides access points within the network for certain vendor services, notably video broadcast services. Vendors contract for prearranged paths from their premises to these access points during specified time periods. These access points are near subscribers of the services, usually within remote nodes serving those subscribers.

In order to give subscribers fast response to broadcast services, the network responds to the subscribers' broadcast service requests on behalf of—as a proxy of—the broadcast service vendors. To provide this feature, the network performs the following functions:

1. Reserves network resources between vendors and their selected subscriber access points either permanently (similar to today's private or leased-line telephony facilities), or according to some prearranged set-up and tear-down schedules (in a similar fashion as channels are scheduled for the major broadcast networks today over the specialized video network), and makes the connection/disconnection from the vendors'-premises to the access points according to the schedules.

2. Provides for the distribution and modification of subscriber access permissions.

3. Collects subscriber usage data on behalf of vendors for billing or study purposes.

4. Optionally performs billing functions on behalf of vendors.

5. Optionally answers subscriber service-rate queries on behalf of vendors.

To establish a proxy vendor service, a program vendor transmits requests to the maintenance and administrative processor over a communication connection. This connection is generally a data link; however, some vendors may instead wish to telephone a service representative located at a central node to place requests and provide information. In either case, the information exchanged is the same.

The vendor delivers its channels to the nearest central node, which distributes these channels to the requested access points, such as to selected remote nodes subtending the local central node and to other central nodes of the network.

To guarantee the availability of network resources at the time of need, the required resources must be reserved by each vendor for each program channel. For program channels that are to have permanently reserved resources, this is like obtaining a leased telephony line in the telephone system. However, in the network under discussion, it is possible for vendors to lease channels based on the number and duration of "time-slots" for which they wish to pay. Thus, the information that needs to be conveyed to the maintenance and administration processor includes:

1. Directory Number—Each vendor program channel is associated with a unique directory number, which the subscribers specify when they wish to view that program channel.

2. Access Points—For each program channel, the vendor specifies the access points which it wishes to reach. An access point may be a central node (and none of the remote nodes), or a central node and one or more remote nodes. This flexibility allows vendors to test-market their programming before committing to a large distribution. This capability also allows for "narrowcasting" down to the remote node level by choosing a subset of remote nodes that serves a specific interest group.

3. Schedule—For each program channel, the vendor specifies the schedule on which that channel is to be available at the specified access points.

4. Authorizations—Also for each channel, the vendor specifies a list of directory numbers of those subscribers authorized to view the channel. For each directory number in the list, the vendor may also specify a schedule of "time-slots" during which that subscriber is authorized access to that channel, thus allowing a subscriber to be authorized to watch one program but not another, even though the programs are being distributed on the same program channel (but at different times). This information can be provided at the time the channel reservation is established. However, it may also be provided (and previous authorizations may be changed) anytime thereafter, as long as the contract for channel reservation exists.

Once given the above information, a resource reservation and scheduling function of the maintenance and administration processor 205 determines the best route or routes by which to deliver the program channel to the specified access points. Specific feeder channels within the network do not need to be reserved; the resource reservation and scheduling function only needs to reserve any one of the available feeder channels to the access point for the time period in question. When a specific program channel is to be activated, the resource reservation and scheduling function requests that the central node to which the vendor is connected establish a call from the vendor's channel to the specified access point(s) according to the pre-established route(s).

The primary storage of authorization data is the maintenance and administration processor. Therefore, after the program channel has been connected to the access points, the subscriber authorizations are sent to the remote module processors that own the access points. These authorizations remain in effect until: (1) the channel is deactivated, or (2) until they are explicitly changed by the vendor, or (3) until they are implicitly changed by the prearranged schedule of "time-slots" as described above. For real-time considerations, a proxy vendor services table (PVST) is kept in the database of each remote module processor. The PVST contains translation and access rights data for all proxy vendor services currently being provided at remote nodes controlled by the remote module processor. If a proxy vendor service is provided at several remote nodes among those controlled by the remote module processor, then that service will have several entries in the table. The PVST allows call processing to determine quickly whether a subscriber is authorized to receive a particular program channel. When a program channel is to be disconnected, the resource reservation and scheduling function requests that the feeder channel be freed and that authorizations for the program channel be discarded.

Optionally, as a service to vendors, the network can collect usage data on behalf of vendors to allow them to produce subscriber bills as well as gather statistics on their channel utilizations. An additional service that the network can perform is that of producing subscriber bills for the vendors, and possibly including these bills with the subscriber's other communication charges. This is an especially attractive service for small vendors who may not have automated billing systems.

The other aspect of usage data collection, that of statistical analysis, is important for vendors to measure the popularity of their programming material. This capability, combined with the ability to distribute channels to central nodes without necessarily distributing to remote nodes, allows vendors to test-market programs to various geographic areas at a lower initial cost. After analyzing the usage data, vendors know which (if any) remote nodes are candidates for connection on a full schedule basis. Likewise, this information allows vendors to assess the relative increase or decrease in popularity of any given program.

A subscriber interface requests connection to a proxy vendor service for its owner just as it would request any other service, using the same message protocol. The instance of proxy vendor call processing 8002 that controls the access point receives each such request and responds to it on behalf of the vendor, acting as the vendor's proxy. The received messages are handled and services are provided by proxy vendor call processing 8002 in much the same way as messages are handled and services are provided by point-to-point call processing 8001, the exception being that a single process within a remote module processor 203-204 handles all proxy vendor messages from, and proxy vendor service provision for, all subscribers served by that processor, i.e., handles the vendors' end of calls on behalf of all vendors serving those subscribers.

PROXY VENDOR PROCESS (FIGS. 17 AND 18)

Figure 17:
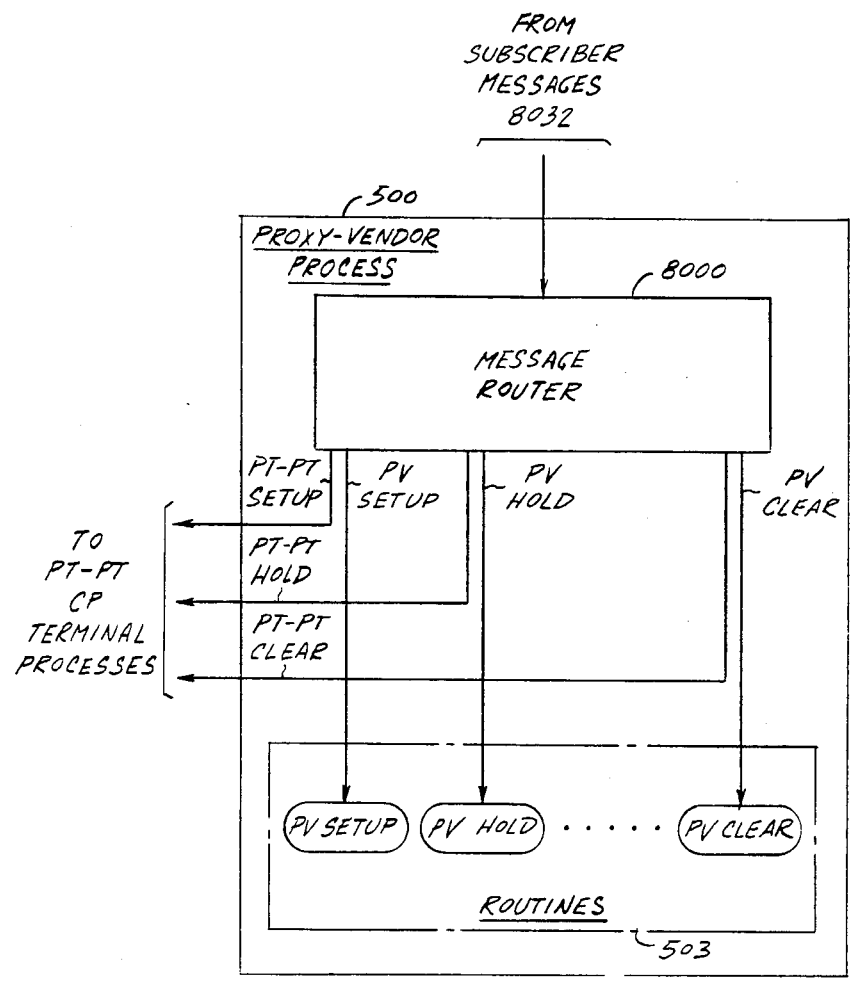
FIG. 17 is a block diagram of a process that executes functions of proxy vendor call processing of FIG. 5.

A process 500 in which proxy vendor functions are executed is illustrated in FIG. 17. For ease of reference, this process is referred to as the proxy vendor process. (This is the same process used by the message router, and parts of the Resource Manager.) The proxy vendor process 500 includes the collection of routines 503 of proxy vendor call processing 8002, which routines 503 are called directly (i.e., without messages or context switches) by message router 8000 and resource management subsystem 803. When a message is received from a subscriber interface, message router 8000 checks the message parameters against the proxy vendor services table to determine if a proxy vendor service is being requested. Such a message might be, for example, a request to set up a call to a service vendor, or to perform some control operation on an already existing proxy vendor call. If the message is a request for a proxy vendor service, a proxy vendor call processing routine of the routines 503 that corresponds with the message is invoked, which routine then executes as a subroutine within the same process as message router 8000. Context switches are thus avoided. If the message is not a request for a proxy vendor service, it is forwarded by message router 8000 to the appropriate point-to-point terminal process.

Figure 18:
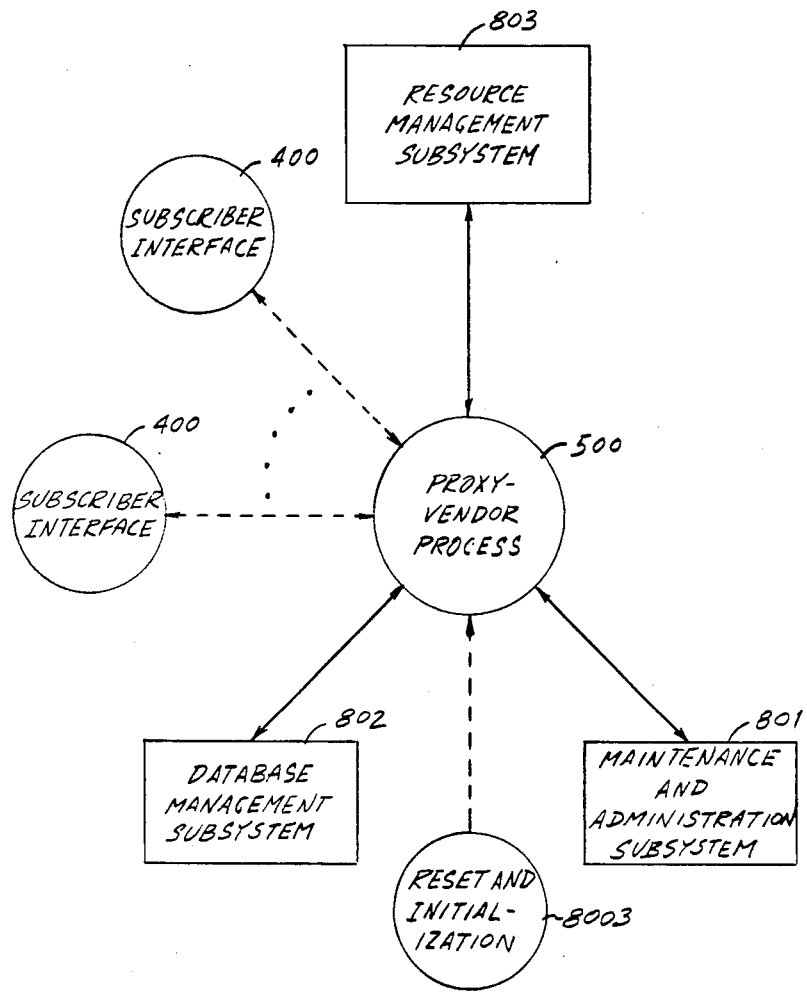
FIG. 18 is a logical diagram of interactions of proxy vendor functions of the process of FIG. 17 with other network entities.

Interactions of proxy vendor process 500 with other entities of the network is illustrated in FIG. 18. Events serving as input stimuli to proxy vendor process 500 are messages from subscriber interfaces 400, subroutine returns from systems 801-803, and messages from reset and initialization 8003 triggering subscriber reset. In performing its functions, proxy vendor process 500 calls on subsystems 801-803, and returns messages to subscriber interfaces 400.

The following types of messages from a subscriber interface potentially apply to a proxy vendor service:

SETUP—First service request of a new subscriber session. This is analogous to turning on a television and tuning it to some first channel.

REORIG—Request a new service when already receiving a service. This is a "channel-change".

CLEAR—Terminate a subscriber session. This is analogous to turning off a television set.

HOLD—Put the service on hold, without terminating the session or deallocating any resources. This might be a side effect of changing the subscriber channel with which the service is associated—for example, the service might be redirected from the subscriber's family room to a bedroom.

DISASSOCIATE—Put the service on hold, deallocating the resources for the connection from the subscriber premises to the remote node.

ACCEPT—Restore a held service to active use. This might also be used to change the subscriber channel on which the service is received.

Proxy vendor calls cannot be transferred, nor can they be associated with point-to-point conferences.

If, in order to perform the requested operation, switch operations must be performed, proxy vendor process 500 calls on resource management subsystem 803 to perform the switch operation. When a previously requested switch operation pertaining to a proxy vendor call is completed, resource management subsystem 803 so signals proxy vendor process 500 by calling one of two proxy vendor call processing functions:

CREPLY—Signals completion of a CONNECT operation. Possible contexts include completion of a new call and completion of an ACCEPT operation reactivating a call previously put on hold or disassociated.

DREPLY—Signals completion of a DISCONNECT operation. Possible contexts include termination of a call; putting a call on hold or disassociating it; the first step of a disconnect-connect sequence, for the purpose of moving the call to a different subscriber channel; and subscriber reset.

When a SETUP message is received from a subscriber interface and message router 8000 determines that a proxy vendor service is being requested, the proxy vendor call processing SETUP routine invoked by message router 8000 accesses the service's PVST entry to determine whether the subscriber has access rights to the requested service, and whether usage information is to be collected. If the subscriber does have access, proxy vendor call processing requests that database management subsystem 802 store an identifier for the requested service. (This identifier is the index of the service's PVST entry, known as a Proxy Vendor Service Identifier or a PVSID). Subsystem 802 is also requested to store an identifier for the subscriber channel on which the service will be viewed (a SETUP message parameter). Both identifiers are stored under a key composed of the subscriber's identifier (CUSTID) and the CALLID specified in the SETUP message. Resource management subsystem 803 is then called to make the connection, and, if the PVST entry calls for usage information collection, a log entry is posted via maintenance and administration subsystem 801. When done, resource management subsystem 803 calls a reply routine that results in proxy vendor call processing sending a STATUS message to the subscriber interface to announce that the connection has been made.

When a REORIG message is received from a subscriber interface, database management subsystem 802 is queried for data stored under the key composed of the subscriber's CUSTID and the CALLID parameter of the REORIG message. It is an error if that entry does not exist. If the data indicates that a proxy vendor service is being viewed, a proxy vendor call processing REORIGINATE routine is invoked. If the data indicates that a point-to-point call is in progress, the REORIG message is simply passed to the appropriate terminal processes—an existing one and a newly created one. Proxy vendor call processing posts an end-of-proxy vendor-call log entry, if appropriate, and continues as for SETUP.

When message router 8000 receives a CLEAR message from a subscriber interface, the data for the CUSTID and CALLID is retrieved from the database management subsystem, and the proxy vendor versus point-to-point decision is made just as for REORIG. Again, if the data indicates that the CLEAR message refers to a point-to-point call, the message is forwarded to the appropriate call terminal process. If the message refers to a proxy vendor call, an end-of-proxy-vendor-call log entry is posted, resource management subsystem 803 is called on to break the connection, and database management subsystem 802 entry for the call is deleted. A STATUS message is sent to the subscriber interface indicating that the call has terminated.

If a HOLD or DISASSOCIATE message is received, resource management subsystem 803 is called to disconnect the service, if it is currently connected, and database management subsystem 802 entry is updated to reflect the state change.

If an ACCEPT message is received, resource management subsystem 803 is called to reconnect the service. If the service is already connected to some channel other than the one named or implied by the ACCEPT message, it must first be disconnected. Database management subsystem entry 802 is updated accordingly.

PROCESS STATE (FIGS. 19–21

Figure 19:
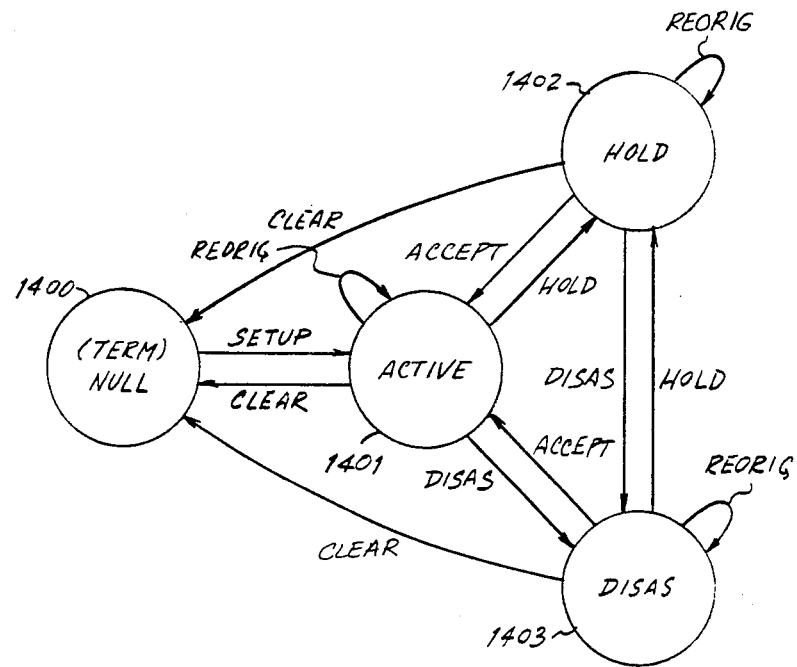
FIG. 19 is a state diagram of call status of the proxy vendor functions of the process of FIG. 17.
Figure 20:
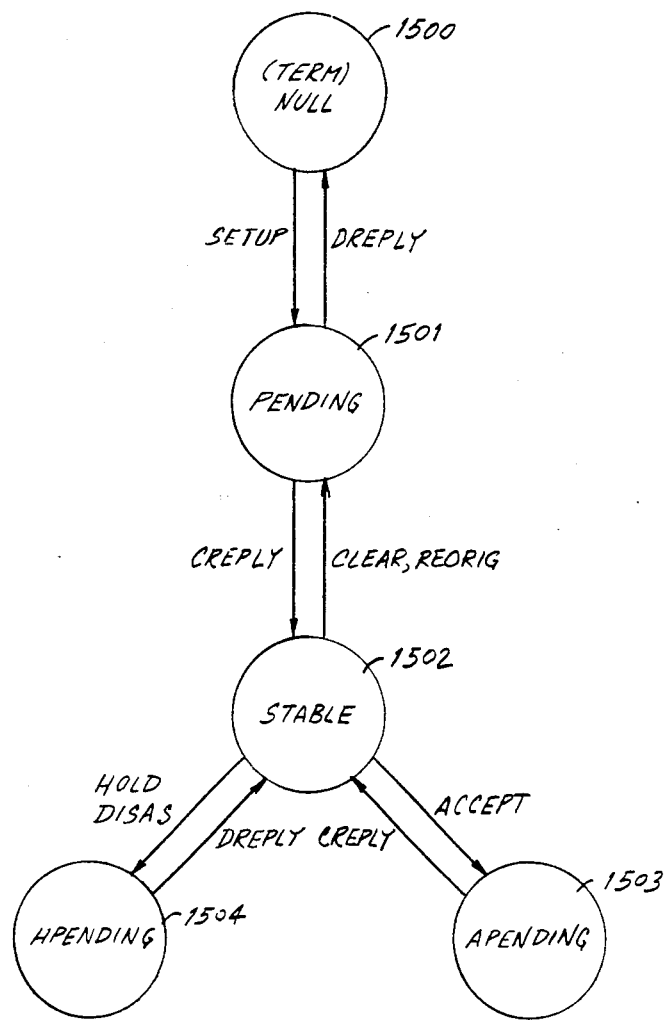
FIG. 20 is a state diagram of stability status of the proxy vendor functions of the process of FIG. 17.

The state of a proxy vendor call is composed of two components—the proxy vendor call state (PVCS) and the proxy vendor stability state (PVSS). The variables are stored in the call's call register (see FIG. 21). The register is allocated to the call as part of its initialization. State transition diagrams for the two state component variables are shown in FIGS. 19 and 20 respectively. A call's PVSS indicates whether the call is STABLE or PENDING, and distinguishes several varieties of PENDING. A proxy vendor call is STABLE if there are no switch operations currently in progress for the call; otherwise, the proxy vendor call is PENDING. A STABLE proxy vendor call's PVCS is the call's current state as presented to the subscriber interface. A PENDING proxy vendor call's PVCS indicates what the call's state, as presented to the subscriber interface, will be upon completion of the switch operation.

The PVCS states as shown in FIG. 19 are:

NULL state 1400—The "state" of a nonexistent call; one that has not been created (NULL) or one that has been terminated (TERM). A SETUP message requests a state transition from NULL state 1400 to ACTIVE state 1401. A CLEAR message requests a state transition from any current state to NULL state 1400.

ACTIVE state 1401—The call is currently fully connected and capable of passing information. An ACCEPT message requests a state transition to ACTIVE state 1401.

HOLD state 1402—The call is on hold. At least one switch point along the call's path is open, so that no information can be passed. All resources required by the call remain allocated. A HOLD message requests a state transition to HOLD state 1402.

DISASSOCIATED state 1403—The call is on hold. At least one switch point along the call's path is open, so that no information can be passed. The network is free to deallocate some or all of the call's resources. A DISASSOCIATE message requests a state transition to DISASSOCIATED state 1403.

A REORIGinate message causes no transition from current state.

The PVSS states as shown in FIG. 20 are:

NULL state 1500—The "state" of a nonexistent call; one that has not been created (NULL) or one that has been terminated (TERM). A SETUP message causes a transition from state 1500 to PENDING state 1501. A DREPLY call from subsystem 803 causes a state transition from PENDING state 1501 to NULL state 1500.

PENDING state 1501—The call is awaiting completion of a switch operation in either the call setup or call termination sequence. PVCS can be inspected to distinguish these two cases. A CREPLY call from subsystem 803 causes a state transition from state 1501 to STABLE state 1502. A CLEAR or REORIGINATE message causes a transition from STABLE state 1502 to PENDING state 1501.

STABLE state 1502—The call is stable; no switch operations are in progress for this call. A HOLD or DISASSOCIATE message causes a transition from state 1502 to HPENDING state 1504, and an ACCEPT message causes a state transition from state 1502 to APENDING state 1503.

HPENDING state 1504—The call is awaiting completion of a switch disconnect operation. When the operation is complete, the call will be on hold or disassociated, according to the state of variable PVCS. A DREPLY call from subsystem 803 causes a state transition from state 1504 to STABLE state 1502.

APENDING state 1503—The call is awaiting completion of a switch operation associated with a subscriber ACCEPT request. A CREPLY call from subsystem 803 causes a state transition from state 1503 to STABLE state 1502.

Proxy vendor call processing indirectly requests a switch connect operation as part of a call setup sequence (SETUP message from a subscriber interface). While awaiting completion of this switch connect, the call has PVSS=PENDING. Proxy vendor call processing also requests a switch connect operation when a call on hold (or disassociated) is to be reactivated (ACCEPT message from a subscriber interface). While awaiting completion of this switch connect, the call has PVSS=APENDING.

Proxy vendor call processing requests a switch disconnect operation as part of a call termination sequence (CLEAR message from a subscriber interface) (PVSS=PENDING); or to put an ACTIVE call on hold or into disassociated state (HOLD or DISASSOCIATE message) (PVSS=HPENDING).

A subscriber might request that an ACTIVE call be moved to a different subscriber channel, remaining ACTIVE (ACCEPT message). This requires a disconnect-connect sequence. Until the connect operation is complete, the call's PVSS is APENDING.

A "channel change" is requested by the subscriber interface using the REORIG message. If applied to an ACTIVE call, this requires a connect operation, and the PVSS is PENDING until the connect operation is complete.

When a switch connect operation requested by proxy vendor call processing is complete, the function CREPLY is called. CREPLY changes the call's PVSS to STABLE, and notifies the subscriber interface that the connection is complete.

Similarly, when a switch disconnect operation requested by proxy vendor call processing is complete, the function DREPLY is called. If the disconnect operation is part of a disconnect-connect sequence (to move the call to a different subscriber channel), DREPLY passes a connect request to the resource management subsystem, and leaves the PVSS unchanged (as APENDING). Otherwise, the PVSS is set to STABLE.

When a subscriber reset is triggered, all of that subscriber's calls, including proxy vendor calls, must be cleared. A clear sequence is initiated for all stable proxy vendor calls. If one or more proxy vendor calls are pending when the subscriber is reset, clear sequences for those calls are initiated from CREPLY or DREPLY when the current switch operation completes.

Figure 21:
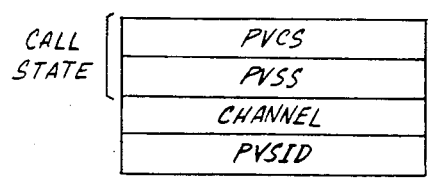
FIG. 21 is a block diagram of a call register of the proxy vendor f,unctions of the process of FIG. 17.

In addition to the PVCS and PVSS state variables, each proxy vendor call has a current subscriber channel (CHANNEL) and a proxy vendor service identifier (PVSID) associated therewith. The channel indicates which subscriber resources are associated with the call; it is non-null only in PVCP states ACTIVE and HOLD, and can be changed by an ACCEPT or HOLD message. The PVSID indicates which proxy vendor service is being accessed via the call; it can be changed by a REORIG message. These four values, the PVCS, PVSS, CHANNEL and PVSID, are all stored in the proxy vendor call register in the database, as shown in FIG. 21.

RESET AND INITIALIZATION

Referring again to FIG. 5, all conferences, point-to-point calls, and proxy vendor calls of a subscriber are reset (cleared) by a subscriber reset and initialization process 8003. Process 8003 is another call processing component that interacts with both forms 8001 and 8002 of call processing. Reset and initialization process 8003 has the function of interacting with subscriber interfaces, via the RESET NET and RESET CUST messages described previously, to clear all of a subscriber's calls and conferences, including any proxy vendor calls. This is appropriate when there is reason to believe that the state of the subscriber interface is inconsistent with the state of the network.

In response to the first RESET NET or RESET CUST message generated, the message router 8000 calls a database management subsystem routine to mark the subscriber's profile "reset in progress". All messages except RESET CUST from the subscriber interface are ignored while the profile is so marked. Next, message router 8000 creates a reset and initialization terminal process 8003, and sends it a "reset" message (coM_RESET, see Appendix B) to clear the subscriber's proxy vendor calls and point-to-point calls and conferences.

Reset and initialization terminal process 8003 obtains a list of the subscriber's calls and conferences from the database management subsystem. For each stable (i.e., no switch operation is in progress) connected proxy vendor call, a request is made to resource management subsystem 803 to disconnect the call. For each stable proxy vendor call on hold, the call is cleared. Nonstable proxy vendor calls are handled by the proxy vendor call processing routine that fields the resource management subsystem's completion notice (CREPLY or DREPLY). Reset and initialization terminal process 8003 sends a "reset clear" message (cOR·RCLEAR, see Appendix B) to every point-to-point call and conference terminal process. Reset and initialization terminal process 8003 then waits for a "reset acknowledgement" message (cOC_RACK, see Appendix B) from each terminal process, and from proxy vendor call processing for each proxy vendor call that wasn't initially stable-disconnected. Upon receipt of the last acknowledgement, it calls database management subsystem 802 to clear the "reset in progress" mark in the subscriber's profile. Finally, reset and initialization terminal process 8003 sends RESET NET to the subscriber interface, waits for an acknowledgement, if appropriate, and exits.

RESOURCE MANAGEMENT ARCHITECTURE—OVERVIEW (FIG. 5; APPENDIX B)

Resource management subsystem 803 hides details of the physical network architecture from call processing subsystem 800, allowing multiple media to be treated identically (as far as call processing is concerned), and even allowing the underlying network to be modified without impacting call processing. The division of labor is that call processing subsystem 800 decides what to do, and the resource management subsystem 803 decides how to do it.

A major portion of the job of resource management subsystem 803 involves the allocation of switch ports and channels of specific types or with specific transmission capabilities. In order to provide multimedia connectivity, resource management subsystem 803 manages tables of information relating to the physical switching equipment and the state of that equipment. Some of this information, such as the network configuration, is fairly static. This portion is stored in the data base subsystem 802. Some of the information is very dynamic, such as the status of an individual call. This portion is stored in processor memory, and managed by the resource manager.

Resource management subsystem 803 provides a "logical network" for call processing to operate on. Call processing connects, disconnects, and controls calls in the logical network. The resource manager maps request involving this "logical network" into physical requests. This mapping is network-dependent.

Resource management subsystem 803 talks to call processing subsystem 800 about logical paths which interconnect logical subscriber channels. When call processing subsystem 800 requests a path of a particular call type or format to be established between the originating and destination subscribers, resource management subsystem 803 allocates the physical switch ports and physical channels that are required to establish the path between the logical channels. The particular type of switching equipment that is needed to provide the service and other information is determined by resource management subsystem 803 from call type parameters specified by the subscriber in the call request message.

The following parameters are passed between the call processing subsystem 800 and the resource management subsystem 803:

1. Subscriber identifier—used by call processing to refer to a particular subscriber.

2. Channel—a set of characteristics (subscriber identifier, medium, direction[in/out], and subscriber distribution channel number) that uniquely identify a logical channel. Resource management maps this channel into a "lower path" structure, explained below.

3. Proxy-vendor—this is a "proxy-vendor service number" used by both call processing and resource management. Call processing asks resource management to connect/disconnect a subscriber channel to/from a proxy vendor service. Resource management maps these operations into the lower path and into a resource management proxy vendor structure (described below), and performs the network-dependent operations required to carry the operations out.

4. Path identifier—each active point-to-point call has a resource management "path identifier", which resource management maps directly into an "upper path" structure, explained below. The "path identifier" is the reference used by call processing to control switch operations for this particular call, as well as to send messages to the terminal process at the other end of the call.

Physically, the network resource management subsystem 803 is partitioned into a collection of resource managers each of which resides on one of the processors 202–204 (FIG. 2) and controls the fixed set of resources "owned" by that processor. This ownership is relatively static, but can be changed through a "recent change" mechanism or through reinitialization. Resource managers are classified as being either local resource managers or external resource managers. Local resource managers reside in the remote module processors 203–204 and manage local network resources (ports, channels, and switch crosspoints). External resource managers reside in the external interface processor 202 and manage resources (ports and trunks) for establishing connections to other central nodes, and resources (ports and interfaces) for establishing connections to other communication systems.

As FIG. 5 shows, the subsystem 803 is functionally subdivided into a plurality of functions 8030–8035. Subscriber message handler 8032, switch controller interface 8035, and resource manager internal messages 8034 are functions dedicated to carrying on communications with various components of the network.

Subscriber message handler 8032 receives messages sent by subscriber interfaces and forwards them to message router 8000 of call processing subsystem 800. Subscriber message handler 8032 also receives from point-to-point call processing 8001 and from proxy vendor call processing 8002 messages for subscribers and sends these messages to subscriber interfaces. Subscriber message handler 8032 thus makes call processing independent of the mechanism by which messages are sent between the network and the subscribers, and independent of the form that these messages take. This allows the network hardware to change without any effect on call processing. It also allows multiple types of signaling channels to coexist within the network without call processing being aware of them and of their differences.

In essence, subscriber message handler 8032 is a protocol converter. Messages from call processing are placed in packets and passed on to the subscriber signaling interfaces. Messages in packet form that are incoming from the subscriber signaling interfaces are stripped of their packet header and are passed to message router 8000. Message router 8000 makes further routing decisions about the messages based on their contents.

Switch controller interface 8035 communicates over fast bus 116 with the controllers of the various switches both inside the central node and inside the remote nodes. Switch controller interface 8035 maintains a request queue for each switch controller used by the processor on which that interface 8035 is implemented. When a switch operation is to be performed, a sequence number and a data block are allocated thereto. The sequence number and the identity of the requester are stored in the data block, and the data block is queued on the queue for the appropriate switch. A switch message containing the same sequence number, port identifiers, and command information is sent to the switch controller. On receiving a reply from the switch controller, the queue for the switch is searched for the sequence number, so the reply can be sent to the original requester. Messages exchanged by the interface 8035 with switch controllers are listed and explained in Appendix D.

An audit routine periodically checks the queues to see if there have been switch requests waiting too long. If so, it sends failure messages to the requesters, and removes the requests from the queues.

Resource manager internal messages 8034 are used to pass resource manager data and call processing messages between the two ends of a call. These communications may be either intraprocessor, or interprocessor via the fast bus 116.

In a point-to-point call, there are typically two resource management "upper path" structures involved in a call (one for each call end). They may or may not be on the same physical processor. Resource manager internal messages 8034 has the job of sending messages to resource management 803 at the other end of the call, as well as receiving messages from the other end, and locating the upper path structure that corresponds to the other end of the call.

Resource management 803 also carries call processing messages in its internal messages. When the resource management message is received by the other end's resource management, the call processing portion of the message is transparently passed to the terminal process without being interpreted by resource management.

Just as there are two types of call processing—point-to-point and proxy vendor—, there are correspondingly two types of resource management. Proxy vendor resource management 8031 serves proxy vendor call processing 8002, while point-to-point resource management 8030 serves point-to-point call processing 8001.

Each type of resource management views the communication path at a call end as comprising two parts. The lower part of the path, closest to the subscriber, is referred to as the lower path. It includes the subscriber's distribution channel. The remainder of the path makes up the second part, which is referred to as the upper path in point-to-point resource management, and as the proxy vendor in proxy vendor resource management.

For a point-to-point terminal process, a resource manager controls only that process' end of a call or calls, and to that extent is concerned only with resources that make up the communication path at the "near" end of the call. A point-to-point call processing process at each end of a call has its own resource manager serving it.

POINT-TO-POINT RESOURCE MANAGEMENT (FIGS. 22 AND 23)

Figure 22:
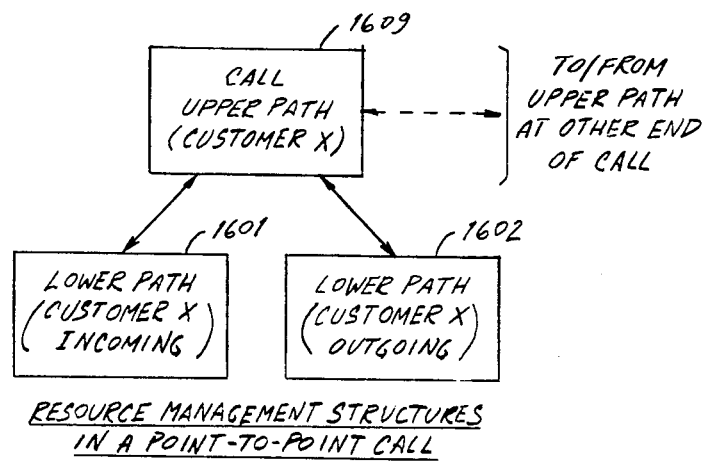
FIG. 22 is a block diagram of structures of point-to-point resource management of FIG. 5 involved in a point-to-point call.
Figure 23:
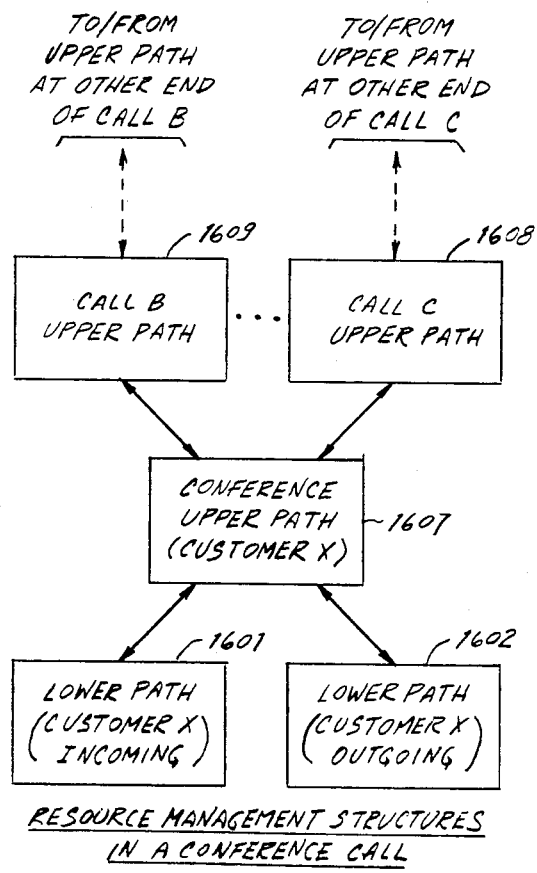
FIG. 23 is a block diagram of structures of point-to-point resource management of FIG. 5 involved in a conference.

Resource management 803 maintains a data structure for each part of a call. Resource management 803 stores in each data structure information that it must have in order to establish that portion of the communication path that represents the call part, to control that call part, and to communicate about that call part with other system entities. FIGS. 22 and 23 show the resource management structures for a point-to-point duplex call and for a conference duplex call, respectively. These figures show resource management to maintain structures for upper paths and lower paths.

FIG. 22 shows one end of a point-to-point duplex call to involve a call upper path 1609 and a pair of lower paths 1601 and 1602, one for the downstream and one for the upstream direction of communication. A simplex communication would have only one lower path. The lower paths 1601 and 1602 connect to the call upper path 1609, which in turn connects to the upper path of the other end of the call.

FIG. 23 shows one end of a duplex conference to involve a conference upper path 1607, a pair of lower paths 1601 and 1602, one for each direction of communication, and a plurality of call upper paths 1608 and 1609, one for each call involved in the conference. A simplex conference would have only one lower path. The lower paths 1601 and 1602 connect to the conference upper path 1609, which in turn connects to the upper paths 1608 and 1609 of the near ends of the calls involved in the conference.

LOWER PATH STRUCTURE (FIG. 24)

Figure 24:
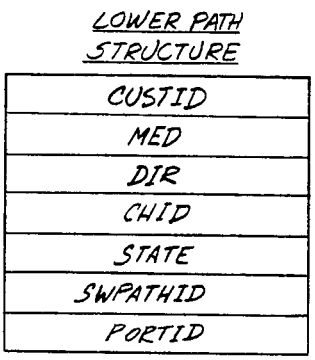
FIG. 24 is a block diagram of a lower path structure of FIGS. 22 and 23.

Illustrated in FIG. 24, the "lower path" is a resource management data structure representing a subscriber logical channel. Physically, the lower path comprises a subscriber distribution channel and any other physical resources required to connect the channel to the proxy vendor structure (in the case of proxy vendor calls), or to a central node switch (in the case of point-to-point calls).

In the illustrative hardware architecture, the connection of a narrowband subscriber channel to the central node narrowband switch through the remote node is predetermined, by the remote node narrowband multiplexer and demultiplexer 506 (FIG. 2). But in the case of a wideband channel, the channel is connected to a wideband switch 505 at the remote node. A feeder channel from the remote node switch to the central node switch must be allocated, and a path in the remote node must be connected in order to connect the subscriber wideband channel to the central node switch. All of these physical resources are collectively grouped into the point-to-point resource management structure known as the "lower path".

Call processing implicitly refers to a lower path whenever it specifies a subscriber channel number. All of the details involving which physical resources are included, and what their current state is, are hidden from call processing by resource management.

In both types 8030 and 8031 of resource management, the lower path has the following attributes:
1. subscriber identifier
2. medium—this may be voice, data, or video, for example.
3. direction—this may be either in or out; in the case of a proxy vendor call, the direction is always in.
4. channel—this is the subscriber's "channel number".
5. state—is the state of the channel: unused, associated with or connected to a proxy vendor call, or associated with or connected to a point-to-point call.
6. information regarding which physical resources are now in use due to this lower path.

Attributes 1–4 uniquely identify a particular distribution channel. Attribute 6 illustratively identifies a remote node switchport (PORTID) on a feeder channel side of the switch, and a switchpath (SWPATHID) through the switch connecting the switchport to the distribution channel. The distribution channel is fixedly connected to a particular switchport on the distribution channel side of the switch; hence the distribution channel uniquely identifies the other switchport to which the switchpath connects.

UPPER PATH STRUCTURE (FIGS. 25-28)

Call and conference upper path structures have a one-to-one correspondence with a "call" and a "conference" in call processing. The call and conference upper path provides call processing with a message interface to the call terminal process at the other end of the call, and between call and conference terminal processes, as well as means to make switch connections without requiring call processing to know the details of the network architecture.

Figure 25:
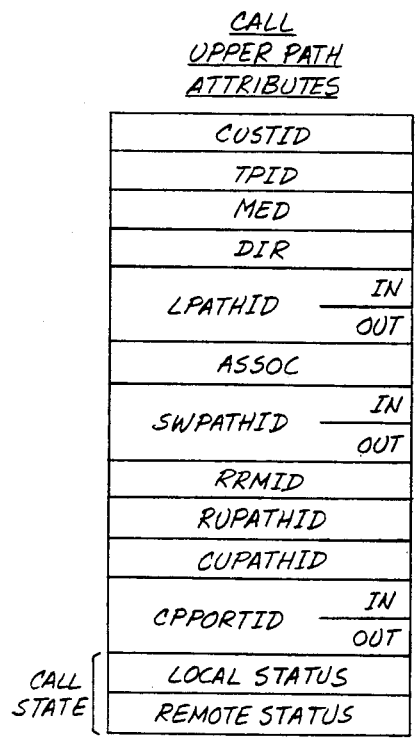
FIG. 25 is a block diagram of a call upper path structure of FIGS. 22 and 23.

Illustrated in FIG. 25, a call upper path has the following attributes:
1. CUSTID—subscriber identifier.
2. TPID—terminal process identifier of the call processing terminal process handling the call path end of which this upper path is a part.
3. MED—medium; this may be voice, data, or video.
4. DIR—direction; this may be either duplex, simplex-in or simplex-out.
5. LPATHID—lower path identifier(s) of the one or two lower paths involved in the same call as this upper path. This attribute is meaningful only if the upper path local status is ASSOCIATED or CONNECTED. Furthermore, this attribute exists only for a call that is not associated with a conference.
6. ASSOC—tells whether the call end is associated with a lower path or a conference port.
7. SWPATHID—switchpath identifier(s) of the central node switchpath(s) interconnecting the switchport(s) of the lower path(s) at this end of the call with the switchport(s) of the lower path(s) at the other end of the call.
8. Other end resource manager information—whether the other end resource manager is known and who it is (remote resource manager identifier RRMID and remote upper path identifier RUPATHID).
9. call state—representing the relationship that exists between the call's upper paths and lower paths, as well as the relationship between this upper path and the remote upper path.

A simple call upper path may become a conference member upper path by being moved from a channel to a conference port, and vice versa. A conference member upper path is a variant of a simple call upper path, except that it is associated with a conference port instead of a lower path. If the call at this end is associated with a conference, the call upper path has the following attributes instead of the lower path identifier(s):
10. CUPATHID—upper path identifier of the conference.
11. CPORTID—port identifier(s) of the central node switchport(s) at which the call upper path connects to the conference upper path.

The upper path structure allows references to the processor number and upper path structure of the other end of the call. This information is used to send resource management control messages via the resource manager internal messages mechanism. Call processing messages are transported within resource manager internal messages. Resource management 803 at the other call end delivers the call processing portion of a message to the terminal process associated with the call's other end.

The upper path also contains information regarding which central switch port(s), and which switch path id.(s) are used in handling the call. In the case of a duplex call, there are switch ports and switch path id.'s for each direction. The resources it handles start where the lower path leaves off. In point-to-point calls, this excludes the feeder to the central node switch, which is included in the lower path.

Figure 26:
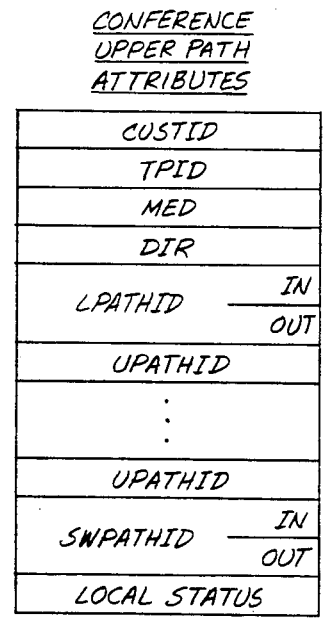
FIG. 26 is a block diagram of a conference upper path structure of FIG. 23.

Illustrated in FIG. 26, a conference upper path is similar to a call upper path. It has the following attributes:

1. CUSTID
2. TPID—terminal process identifier of the call processing terminal process handling the conference of which this upper path is a part.
3. MED
4. DIR
5. LPATHID—lower path identifier(s) of the one or two lower paths involved in the same call as this upper path.
6. UPATHID—a list of upper path identifier(s) of the upper paths of all calls that are associated with the conference.
7. SWPATHID—switchpath identifier(s) of the central node switchport(s) interconnecting the switchport(s) of the lower path(s) at this end of the call with the conference switchport(s).
8. LOCAL STATUS—conference state.

The conference may or may not have its own switch path identifier. If it is a call requiring a separate conference bridge (such as a duplex voice conference call), it will have its own switch path connecting the conference bridge to the lower path. The switchport of the lower path is the one manipulated when the conference is associated, connected, disassociated, and disconnected. If the conference does not require a bridge (such as a video broadcast), the conference upper path does not have its own switch path. Instead, any operations that would otherwise be performed on its switch path are performed on all of the conference member call switch paths.

Because a conference is local, there is no far end resource manager, and locate and send message operations are invalid on a conference upper path.

Associating a call with a conference is the method by which a conference member upper path is created from a standard call upper path. The member is added to the conference upper path list of members, and the member switch port is obtained from the conference bridge, if one exists, or from the conference upper path channel, in the case of a broadcast.

A call upper path represents the state of a call in two upper path state variables. One corresponds to the state of the subscriber's local, or near, end of the call, and one corresponds to the state of the other, remote, end of the call. There are interactions between the two state variables, involving allocation and deallocation of resources. Because a conference is local, a conference upper path represents the conference state in only the one local variable.

Figure 27:
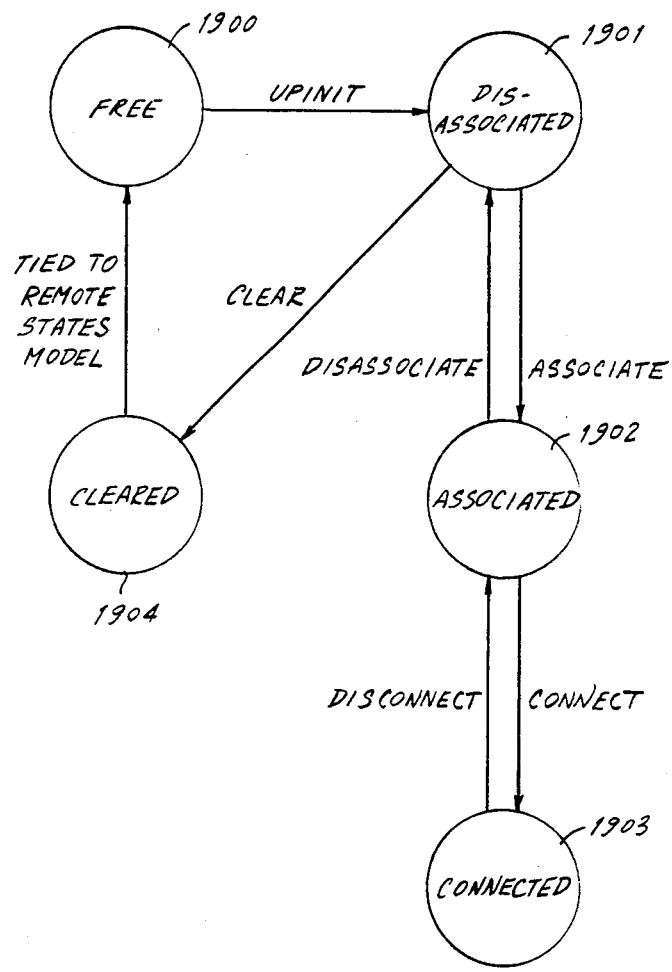
FIG. 27 is a state diagram of local status of an upper path structure of FIGS. 25 and 26.

FIG. 27 shows a finite-state model for the status of the conference or the local call end portion of the resource management call path structure. The following states are possible:
1. FREE state 1900—Currently no channel is allocated to the lower path, and there is no upper path.
2. DISASSOCIATED state 1901—An upper path structure is allocated, but there are currently no other physical resources allocated. There is no lower path associated with the upper path. Transition to state 1901 from FREE state 1900 is made in response to a call by call processing at this call end on a resource management "initialize" upper path (UPINIT) primitive.
3. ASSOCIATED state 1902—A channel is allocated to the lower path, and there is a physical path allocated from the central node switch down to the subscriber channel, although the channel may currently be used in another call. There are one or two lower paths associated with the call or conference upper path, depending on whether the call is simplex or duplex. Transition to state 1902 from DISASSOCIATED state 1901 is made in response to a call by call processing at this call end and on a resource management "associate" path primitive. Transition from ASSOCIATE state 1902 to DISASSOCIATED state 1901 is made in response to a call by call processing at this call end on a resource management "disassociate" path primitive.

4. CONNECTED state 1903—A physical path is connected from the central node switch down to the subscriber channel. Transition to state 1903 from ASSOCIATED state 1902 is made in response to a call by call processing at this call end on a resource management "connect" path primitive.

Transition from CONNECTED state 1903 to ASSOCIATED state 1902 is made in response to a call by call processing at this call end on a resource management "disconnect" path primitive.

5. CLEARED state 1904—The subscriber has cleared the call, and notification is being awaited from the other end of the call. This notification is received via the remote end status model as part of receipt by call processing at this call end of an FSTATUS [TERMINATED] message from call processing at the other end of the call. The notification causes transition from state 1904 to the FREE state 1900. Transition to state 1904 from DISASSOCIATED state 1901 is made in response to a call by call processing at this call end on a resource management "clear" path primitive.

The case of a conference requiring no conference bridge complicates the handling of switch paths somewhat. Each conference member upper path has a switch path, but there is no switch path which belongs to the conference itself. Each member upper path therefore maintains a composite switch status which is a composite of its local status and the conference upper path local status. The composite status is determined from the following table:

TABLE 1

| Member Status ↓ | Composite Status | | |
|---|---|---|---|
| | Conference Status | | |
| | Disassoc | Assoc | Connect |
| Disassoc | Disassoc | Disassoc | Disassoc |
| Assoc | Disassoc | Assoc | Assoc |
| Connect | Disassoc | Assoc | Connect |

If a "disconnect", "disassociate", "associate", or "connect" operation is performed on the conference, all of the member composite statuses are updated, and those that are changed require that the corresponding switch operations be performed. If a "disconnect", "disassociate", "associate", or "connect" operation is performed on a member, the composite status is updated, and if there is a change, the corresponding switch operation is performed.

Figure 28:
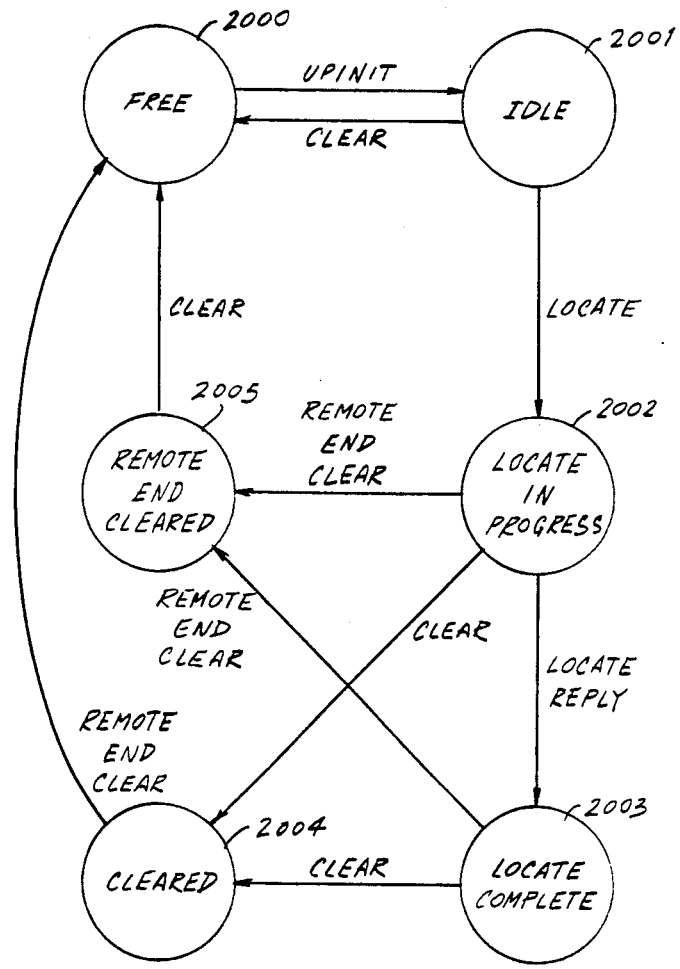
FIG. 28 is a state diagram of remote status of an upper path structure of FIG. 25.

FIG. 28 shows a finite-state model for the status of the remote call end portion of the resource management call path structure. The following states are possible:

1. FREE state 2000—Currently, the far end path has no resources allocated (this is identical to the corresponding local end status). Call by call processing at this end on the UPINIT primitive causes transition from state 2000 to IDLE state 2001.

2. IDLE state 2001—The far end path resources are allocated, but no request has been made to establish a call to the other end. Call by call processing at this call end on the "clear" primitive causes transition from state 2001 to FREE state 2000. Call by call processing at this call end on a resource management "locate" destination party primitive causes transition from state 2001 to LOCATE IN PROGRESS state 2002.

3. LOCATE IN PROGRESS state 2002—A "locate" operation has been performed, but no reply has yet been received. Call by call processing at this call end on the "clear" primitive causes transition from state 2002 to CLEARED state 2004. Receipt from the other end of the call of a reply message to the "locate" operation causes transition from state 2002 to LOCATE COMPLETE state 2003. Receipt from the other end of the call of notification that the other end of the call has been cleared (as part of receipt by call processing at this end of an FSTATUS [TERMINATED] message from call processing at the other end of the call) causes transition from state 2002 to REMOTE END CLEARED state 2005.

4. LOCATE COMPLETE state 2003—A reply to the "locate" operation has been received, and the control path is now two-way. Call by call processing at this call end on the "clear" primitive causes transition from state 2003 to CLEARED state 2004. Receipt from the other end of the call of notification that the other call end has been cleared causes transition from state 2003 to REMOTE END CLEARED state 2005.

5. CLEARED state 2004—The subscriber has cleared the call, and notification is awaited from the other end of the call that the other call end has been cleared as well. Receipt of the notification causes transition from state 2004 to FREE state 2000.

6. REMOTE END CLEARED state 2005—The remote end has cleared the call, and a clear request from the subscriber interface at this call end is awaited. Receipt of the request, signaled to resource management by a call by call processing on the "clear" primitive causes transition from state 2005 to FREE state 2000.

The resource management primitives are discussed further below.

INTERFACE TO CALL PROCESSING (APPENDIX C)

In point-to-point resource management, the upper path is referenced using a PATHID, which is an identifier returned to call processing upon creation of the path. There is a one-to-one correspondence between a PATHID and a terminal process. A channel (lower path) may have any number of upper paths associated with it, but at most one may be connected. If the call is put on hold, the association between the upper and lower paths remains but the physical connection is broken. Putting a call on hold breaks the connection at the central node but not at the remote node. If the call is disassociated from any channels, the upper path has no lower path association.

There is a correspondence between a call upper path and a conference upper path. The view of the lower and upper paths that is presented to a terminal process handling a conference has the same scope as in a call. Each has a PATHID and similar operations involving the object below it. A conference upper path is similar to a call upper path in that it has a PATHID, and the AC- CEPT, CLEAR, HOLD, DISASSOCIATE, TRANSFER, and possibly REORIG operations affect call upper path-lower path, call upper path-conference upper path, and conference upper path-lower path relationships in the same manner. A few examples may help to clarify this.

Putting a call on hold means physically disconnecting the call upper path from the lower path, but maintaining the association. Putting a party of a conference on hold means physically disconnecting the call upper path from the conference upper path, but maintaining the association. Putting the entire conference on hold means physically disconnecting the conference upper path from the lower path. All three of these operations require similar manipulations of the objects pointed to by the PATHID—physically disconnecting the object from the object "below" it, but maintaining a logical connection.

Disassociating a call means that the logical connection between the call upper path and lower path has been broken. Any physical path must have been removed first. Disassociating a party from a conference call means that the logical connection between the call upper path and the conference upper path has been broken. At this point, the call upper path is logically and physically equivalent to a call upper path disassociated from a channel.

Because of the similarity between call and conference upper paths, there are similarities between the data structures for each, as was indicated above. The following primitive operations can be performed on both call and conference upper paths:

1. ASSOCIATE with a channel—The upper path is "associated" with the specified channel or channels (duplex call). The path is reserved, but no connections have taken place. One or both of the channels may be connected to another call. The path must be in the "disassociated" state when this operation is made. Arguments: upper path identifier, channel(s).
2. CONNECT—Physically connect the object (upper path or conference) with the object below it (conference or lower path). The call is "connected" with the specified channel(s). If the other end of the call is also in a "connected" state, a complete path is now established. If the channel(s) are connected to another call, the "connect" fails. The path must be in the "disconnected" state when this operation is made. Arguments: upper path identifier.
3. HOLD—Physically disconnect the object with the object below it, but retain logical connections. Arguments: upper path identifier.
4. DISASSOCIATE—Logically disconnect the object with the object below it; physical disconnections must already have been performed. The upper path is "disassociated" from all channels. At this point, no path resources are reserved up to the central node. The call must be in the "associated" state when this operation is made. Arguments: upper path identifier.
5. DISCONNECT—Upper path is "disconnected" from its channel, but remains associated (unless disassociate is also specified). The call must be in the "connected" state when this operation is made. Arguments: upper path identifier.

The following primitive operations are unique to call upper paths.

1. INITIALIZE upper path—Reserve and initialize a call upper path structure. No other resources are allocated at this point. Arguments include: subscriber, type (voice, data, video), and direction (duplex, simplex in, simplex out), and the reply is an identifier used to refer to the "upper path" in future calls.
2. LOCATE (originate) destination party— Establish a control connection with the resource manager handling the specified directory number. This call has the effect of locating the "other end", and creating a terminal process to handle the other end of the call. When this process sends its first message back, the "locate reply" event occurs. The remote state must be "idle". Arguments: upper path identifier, directory number.
3. CLEAR path—Clear the current call. The clear notification is sent to the other end, and the resource manager goes into a "Clear" state until the "Remote End Cleared" indication is received. Note: the "Remote End Cleared" indication may occur before the "clear" request. Arguments: upper path identifier.
4. ASSOCIATE with a conference.
5. SEND MESSAGE—Send a call processing message to the terminal process at the remote end of the call. This operation may be used in the "Idle", "Locate in Progress" or "Locate Complete" states. Arguments: upper path identifier, message pointer, message length.

The following primitive operations are unique to conference upper paths:

1. INITIALIZE conference upper path.
2. CONNECT call upper path to conference upper path (executed as part of a call upper path operation).
3. REMOVE call upper path from conference upper path (executed as part of a call upper path operation).

In a normal point-to-point call, the following operations occur within the resource manager:

Setting up a call:
1. Subscriber1: Subscriber originates call—initialize, associate, connect, locate, send message
2. Subscriber2: Remote end receives message—associate, send message (subscriber is notified)
3. Subscriber2: When subscriber accepts—connect, send message Tearing down a call:
1. Subscriber1: When subscriber clears—disconnect, disassociate, clear (other end gets "Remote End Cleared" notification).
2. Subscriber2: Remote end (responding to "Remote End Cleared")—disconnect, disassociate, clear (other end gets "Remote End Cleared" notification, and this end may deallocate. The other end deallocates when the "Remote End Cleared" is received.) The clear sequence is identical, regardless of which subscriber first initiates the clear.

Appendix C further expounds upon resource management activities in response to call processing requests.

PROXY VENDOR RESOURCE MANAGEMENT (FIG. 29)

Figure 29:
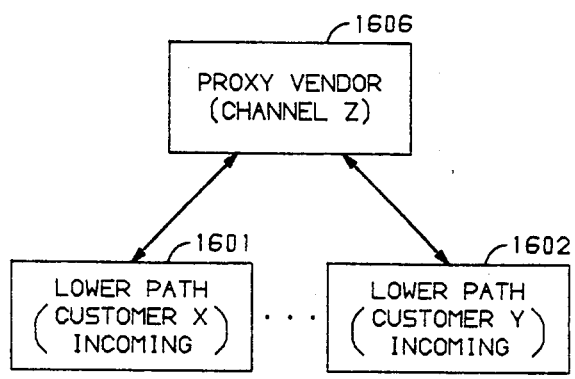
FIG. 29 is a block diagram of structures of proxy vendor resource management of FIG. 5 involved in a proxy vendor call.

FIG. 29 shows the resource management structures involved in a proxy vendor (simplex) call. There is only one call "end" to a proxy vendor call. It involves a proxy vendor structure 1606 connected to a plurality of lower paths 1601 and 1602, one for each subscriber accessing the proxy vendor service (program channel). Each proxy vendor service/program channel has its own proxy vendor structure.

LOWER PATH STRUCTURE (FIG. 24)

As was mentioned above, the lower path structure of proxy vendor call processing is that portion of the path that connects the subscriber to the proxy vendor access point. The structure and attributes of the proxy vendor lower path are the same as those shown in FIG. 24 and described above for the point-to-point lower path.

PROXY VENDOR STRUCTURE (FIG. 30)

A proxy vendor structure includes the resources necessary to bring a proxy vendor service down to the lower path, i.e., down to the access point. In the hardware architecture of the illustrative network, this access point is at the remote node. Call processing implicitly references this structure using a "proxy-vendor number". The details of which physical resources are required are hidden from call processing.

Inclusion in the proxy-vendor structure of the path down to the remote node, and inclusion in the lower path of only the subscriber channel up to the remote node (at least, in proxy vendor calls) allows all subscribers using a single proxy vendor service to share a feeder from the central node switch down to the remote node.

Proxy vendor call processing does not require as many operations as other types of call processing. For example, there is no need to distinguish between putting a call on hold, changing its association, or clearing the call. Hence, proxy vendor resource management need not provide as many functions as point-to-point resource management. For this reason, a simplified variation on the upper path is used by proxy vendor resource management, referred to as the proxy vendor structure. This simplification makes it impossible for the subscriber's terminal process to transfer the broadcast. Because of the above simplification, and because there is no "other end" of a call for the proxy vendor structure to relate to, the proxy vendor structure does not need to keep track of any call states.

Figure 30:
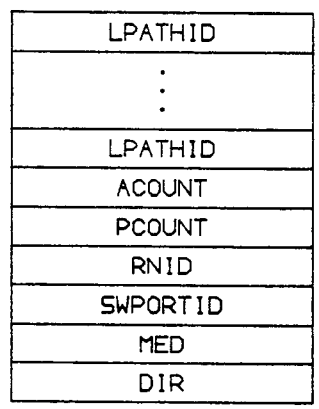
FIG. 30 is a block diagram of a proxy vendor structure of FIG. 29.

Illustrated in FIG. 30, a proxy vendor structure has the following attributes:
1. LPATHID—a list of lower paths, one for each call connected to this proxy vendor; these include paths connected, and as well as paths pending.
2. ACOUNT—a count of the number of connections currently active.
3. PCOUNT—a count of the number of connections pending, i.e., wherein the switch request has been made, but the response has not yet been received.
4. RNID—remote node number of the remote node served by this proxy vendor.
5. SWPORT—the switch port number on the remote node video switch.
6. MED—medium; voice, data, or video.
7. DIR—direction; simplex-in, simplex-out, duplex.

INTERFACE TO CALL PROCESSING

In proxy vendor resource management, the resource manager maintains a structure for each proxy vendor service (i.e., each program channel), which includes information regarding which physical resources are now in use, as well as a list of the lower paths currently connected thereto. Call processing performs all proxy-vendor operations through two interfaces: "connect", and "disconnect".

Connect is invoked when a subscriber wishes to connect to the specified proxy vendor. If a previous proxy vendor was connected, the channel is switched from the old proxy vendor to the new. If no previous proxy vendor is specified, the channel (lower path) must be free. Arguments include the following: subscriber; channel; and proxy vendor i.d.—this is an index referring to the requested service. This function performs the initial call as well as "channel change" functions.

Disconnect is invoked when the subscriber's lower path is to be disconnected form the proxy vendor. Arguments include the following: subscriber; and channel.

SWITCH CONTROL INTERFACE (APPENDIX D)

The resource management subsystem 803 relies upon switch controllers 507, 610, and 611 (FIG. 2) to physically establish upper paths and proxy vendor structures.

Resource management 8030 and 8031 use the switch controller interface 8035 to connect the desired path. Whenever a switch operation is required, the request is passed by resource management to switch controller interface 8035, which composes and sends an appropriate request to the appropriate switch controller, and then takes a real time break while awaitin9 a response. Upon receiving a response from the switch controller, switch controller interface 8035 notifies the resource manager. The resource manager may, in turn, notify call processing, and call processing may, in turn, respond by calling on subscriber message handler 8032 to notify the subscriber.

As was mentioned above and shown in FIG. 2, each switch 505, 606, 607 in the network, be it in a central node or a remote node, is controlled by its own controller 507, 610, 611, respectively. Each controller accepts requests from its clients—primarily the resource managers of resource management subsystem 803, but also maintenance and administration subsystem 801—for the creation and control of paths through its switch.

The interface between a switch controller and its clients is independent of the switch fabric. Each controller presents its clients with a view of the switch as a logical rectangular array, capable of providing a path from any switch input port to any one or more switch output ports.

Each switch port is "owned" by some client of the switch controller, usually by a resource manager. The switch controller accepts requests referencing a port only from the owner, and from maintenance and administration subsystem 801.

Ordinarily, the input end of a path is associated with an input port, and the output end of a path is associated with an output port. Switch resources are allocated for the path exactly when both ends are associated with ports; the path is then allocated. A resource manager can control the association of its end of a path independently of the actions of the resource manager controlling the other end of the path.

An allocated path may be connected or not connected. For example, when a call is on hold, its path is allocated but not connected. The resource manager at each end of the path may independently control whether its end of the path is connected: a path as a whole is connected when both ends so request, and is disconnected when at least one end so requests.

Any number of paths may be simultaneously allocated from a given input port, and, if the switch fabric allows, any number of those allocated paths (including zero) may be simultaneously connected. A collection of simultaneously connected paths sharing a common input port is a broadcast.

Any number of paths may be simultaneously allocated to a given output port, but at most one of these may be connected at any moment.

Details of the switch control interface are found in Appendix D.

This completes the description of an illustrative embodiment of the invention. It should be understood that various changes and modifications to the illustrative embodiment described above will be apparent to those skilled in the art. For example, instead of viewing calls to involve logical channels that include physical, distribution, channels and logical call paths extending between logical channels, call processing may view calls to involve physical channels and logical call paths of two parts extending between the physical channels. Such changes and modifications can be made without departing from the spirit and the scope of the invention, and without diminishing its attendant advantages. It is therefore intended that such changes and modifications be covered by the following claims.

APPENDIX A

SUBSCRIBER-CENTRAL NODE MESSAGES

Most message parameters apply to both calls and conferences. Parameters that apply only to conferences are underlined in the parameters list. Optional parameters are enclosed in brackets.

1. Basic Call Operations

SETUP(CALLID, DN1 OPI, [SUB1, DN2, SUB2, BILLING, USERINFO, MED, CARRIER, DIR, CHAN COUNT, CONFID])

A subscriber terminal uses this message to request the creation of a (medium MED) call CALLID to DN1(SUB1). If more than one directory number is associated with the originator, DN2(SUB2) may be used to specify one of these directory numbers. If a call is originated from a PBX, for example, DN2 may be used to specify one of the PBX's directory numbers as the originator.

BILLING may be specified if some billing feature other than the default (originator pays) is desired (e.g., collect, credit card). USERINFO may be used to pass end-to-end information to the destination.

If a VOICE call is desired, MED may be omitted. Similarly, each subscriber will have a default carrier used when CARRIER is omitted. If DIR is not specified, a direction of DUPLEX is assumed. If CHAN is omitted, the default value for this subscriber, and the (explicit or defaulted) values of MED and DIR are assumed. Thus, if a subscriber requires a DUPLEX VOICE (POTS-like) call on his/her default narrowband channel and via his/her default carrier, all four of these parameters may be omitted.

If the subscriber plans to originate a conference, the values for COUNT and CONFID may be specified in order to preallocate network resources for conference CONFID. COUNT may be used to specify an estimated maximum number of parties (excluding the originator). The network will use COUNT to preallocate resources required for COUNT parties. If CONFID is specified without a COUNT, the COUNT defaults to 2, providing enough resources for a three-way conference.

Call CALLID will initially belong to conference CONFID Failure to specify COUNT and CONFID does not preclude the subsequent adding of parties, nor does a COUNT constitute a fixed upper bound on the number of parties. If COUNT and CONFID are not specified, however, or if an attempt is made to exceed COUNT parties, there can be no guarantee that the necessary network conferencing resources will be available when needed.

INCOMING(CALLID, DN1, TYPE, OPI, [SUB1, DN2, SUB2, BILLING, USERINFO, MED, DIR, XFERS])

The network sends this message to a subscriber interface as notification of a new (to this subscriber) incoming call. CALLID is a call identifier assigned to this new call. Parameter TYPE indicates whether the incoming call is the result of a SETUP, TRANSFER or an ADD CALL request by some other subscriber. DN1(SUB1) is the subscriber who will be at the other end of the incoming call (to whom the receiving subscriber will be connected). If more than one directory number is associated with the recipient of the INCOMING message, DN2(SUB2) specifies the intended destination.

If the call is using a billing feature that affects the destination (e.g., collect), then BILLING reports this. If USERINFO was specified in the other subscriber'request that resulted in this INCOMING, then the value is passed along in the INCOMING message.

MED specifies the medium of the call. If MED is omitted, VOICE is assumed. DIR specifies the direction of the call. If DIR is omitted, DUPLEX is assumed. Thus if neither MED nor DIR is specified, a default of a POTS-like duplex voice call is implied.

If TYPE indicates that the call was transferred to this destination, then XFERS provides an abbreviated transfer history of this end of the call.

The recipient of an INCOMING notice may accept the call via the ACCEPT or HOLD messages or reject it via the CLEAR or TRANSFER messages.

REORIG(CID, DN1, OPI, [SUB1, BILLING, USERINFO])

This message clears call CID (it must currently exist), and does a new setup. The setup information is identical to that of the previous call except for the possible optional parameters.

Its intended purpose is to allow quick "channel changes38 for broadcast-type services.

ALERTED(CALLID)

A subscriber interface sends this message to the network in response to an INCOMING message for new call CALLID, to indicate that it has begun alerting the subscriber. In the case of a PBX, this implies that an appropriate station has been selected and found to be available. If the subscriber interface can immediately determine the disposition of the call (accepted on which channel, rejected, or transferred to which directory number), then the ALERTED message need not be sent; the call can be immediately accepted, cleared, or transferred.

ACCEPT(CID, OPI, [CHAN, CONFID])

This message instructs the central node to connect call CID to its associated channel or, if CHAN is specified, to channel CHAN. Since in the multi-party case a call may be part of a conference, the message can also instruct the central node to connect call CID to its associated conference or, if CONFID is specified, to conference CONFID.

In a multi-party environment, the CID may also be a conference identifier. In this case, the message instructs the central node to connect conference CID to its associated channel or to channel CHAN. The CONFID parameter may not be specified if CID names a conference.

If CID is not associated with a channel or conference, and neither CHAN nor CONFID is specified, the default CHAN value for this subscriber and CID's medium and direction is assumed.

CLEAR(CID, OPI, [REASON])

This message instructs the central node to terminate call CID or, in the multi-party case, conference CID. The optional REASON parameter can be used to give a reason for clearing the call, such as a lack of subscriber resources to handle it.

STATUS(CID, STATUS, OPI, [REASON, CHAN, DN, CONFID, COUNT, FAILURE, ERROR])

The central node sends a STATUS message to a subscriber interface after every request concerning call CID. This message tells the requesting subscriber the current state of the call.

The status field may be divided into three independent states: the CONNECT status, the FAR END status, and the FAR END CONFIGURATION status.

1. The CONNECT status describes the receiving subscriber's end of a call or conference.

ACTIVE—This status informs the subscriber that call (or conference) CID is connected to some channel(s) or conference.

HOLDING—This status informs the subscriber that call (or conference) CID is associated with, but not connected to, some channel(s) or conference.

DISASSOCIATED—This status informs the subscriber that call (or conference) CID is not associated with any channel or conference.

INCOMING—This status informs the subscriber that call CID is an incoming call that has not yet been completed. The call is associated with the default channel(s), but not connected. This status carries no information concerning whether the subscriber has been alerted yet. (The subscriber interface receiving this message already knows whether the subscriber has been alerted.)

TERMINATED—This status informs the subscriber that call (or conference) CID has been terminated. The optional parameter REASON may be present to indicate why the call (or conference) has been cleared.

2. The FAR END status describes the far end of a call.

ALERTED—This status informs the subscriber that the far party associated with call CID has been notified concerning the call.

CONNECTED—This status informs the subscriber that the far party associated with call CID is connected to the call and can receive information sent over it.

HELD—This status informs the subscriber that the far party associated with call CID has answered the call but is not connected to it. The party cannot receive any information sent over the call.

PENDING—This status informs the subscriber that there is currently no far party associated with call CID. A call will have this far end state when a call is being set up and the far party has not yet been alerted. The optional REASON parameter specifies why a call is PENDING, such as because the previous far party has transferred the call to a new party. When the REASON code denotes a transfer, the directory number DN gives the address of the new party.

TERMINATED—This status informs the subscriber that call (or conference) CID has been terminated. The CONNECT and FAR statuses must agree when CID is being terminated-there should never be a case when one of these parameters marks CID as terminated, while the other does not.

3. The FAR END CONFIGURATION status describes how the party at the far end of a call has changed the call.

CONFERENCE—This status informs the subscriber that call CID is part of a conference constructed by the far party associated with the call. The far end has at least one call other than this one associated with the conference.

SIMPLE—This status informs the subscriber that call CID is connected solely to the far party associated with the call at that party's end. This includes the case that the other end of call CID is the only call associated with a conference.

Parameter CHAN appears when CID becomes newly associated (and possibly connected) with the specified channel(s). Similarly, CONFID appears when CID becomes newly associated with the specified conference.

DN appears when the identity of the subscriber at the other end of the call has changed. This happens after SETUP, REORIG and ADD CALL, and when the other end TRANSFERs.

The COUNT parameter appears in the multi-party case when CID is a conference identifier, and the allocated size of the conference has just changed. It specifies the number of parties apart from the subscriber who are guaranteed a slot in the conference.

REASON may appear when CID is being transferred or terminated.

FAILURE appears when a valid subscriber request concerning CID could not be honored. The containing STATUS message describes the new state of CID, which is usually, but not always, identical to its state prior to the failed request.

ERROR appears when an invalid subscriber request concerning CID is detected. When an invalid subscriber request is detected that cannot be tied to a particular CID, an ERROR message (rather than a STATUS message) is sent to the subscriber interface.

2. Hold and Disassociate

HOLD(CID, OPI, [CHAN, CONFID])

This message requests that the central node break the connection between the call CID and the channel of the subscriber making the request. The network maintains information about the channel association. Unless one of the optional parameters CHAN or CONFID is specified (see below), the subscriber's path to the central node is not altered, i.e. any paths allocated through a remote node to the central node switch remain allocated to the subscriber.

In the multi-party case, CID may be either a conference identifier or a call identifier. Again, if CHAN is not specified, only the connection between the conference or call CID and the requesting subscriber's channel is broken. All calls remain associated with the conference unless otherwise requested (see DISASSOCIATE). Information about the association between the conference and the subscriber's channel is maintained.

If CID is a conference identifier, the other members on the conference can continue to communicate with each other. Only the requesting subscriber is temporarily removed.

If CHAN or CONFID is specified, then CID's previous association (if any) with a channel or conference is dissolved, and CID is associated with the named channel or conference. CHAN and CONFID cannot both be specified. CONFID cannot be specified if CID names a conference.

HOLD can also be used to accept a call or conference CID. The call or conference would be accepted in the HOLD state, associated with CHAN or CONFID (if specified).

If CID currently has connect status DISASSOCIATED, HOLD has the effect of moving CID to HOLDing state, and associating CID with CHAN or CONFID, whichever appears. If neither appears, the default CHAN value for this subscriber and CID's medium and direction is assumed.

DISASSOCIATE(CID)

In a two-party call, identified by CID, the call will no longer be associated with the subscriber's channel. This message allows the subscriber to change channel association via the network.

In a conference call, this message allows the subscriber to DISASSOCIATE a particular call from a conference and terminate the conference without losing that call. Any of the other operations performed on the conference will not affect the call.

If the subscriber disassociates the conference, all calls in the conference remain associated with it. The conference is not associated with any of the subscriber's channels. In order to resume transmission, the conference CID has to be accepted with a CHANNEL parameter specified.

3. Transfer

TRANSFER(CID, DN1, OPI, [SUB1, BILLING, USERINFO, CARRIER])

Transfer call CID to DN1. If the network is too busy to handle this request, the requesting subscriber will receive a STATUS message including a FAILURE parameter, and the call will resume. Once the network has accepted the request, the requesting party no longer has any control over the call.

If CID names a conference, each individual call associated with the conference is transferred to DN1. The conference is cleared if all these individual transfers are accepted by the network.

BILLING and/or CARRIER may be optionally specified to select a new billing basis and/or a new carrier for the transferred call. USERINFO will be passed to the new destination via the INCOMING message.

4. Conferences

CREATE CONF(CALLID, CONFID, COUNT)

This message will create a conference with the identifier CONFID. The conference will initially have one member, the call CALLID (which must exist).

Resources for a total of COUNT parties will be allocated. For example, if COUNT is two, enough resources will be allocated to add one other party to the conference (see ADD CALL). More parties may be added, but the conference/broadcast circuits are not guaranteed to be available. A COUNT of 0 is illegal.

The initial state of conference CONFID will be derived from the previous state of call CALLID. If the call was connected or on hold and associated with a channel, the conference will be in the same state. If the call was associated with another conference, the initial state of the conference is DISASSOCIATED (not associated with any channel). The call on the conference will be in the "active" state. (Note: if the direction of call CALLID is SIMPLEX-OUT, a "conference" is a broadcast.)

MODIFY CONF(CONFID, COUNT)

This message changes the resource allocation for conference call CONFID to COUNT. It allows the user to increase or decrease the amount of resources allocated. It is illegal to have COUNT be less than the number of parties currently participating in the conference.

ADD CALL(CONFID, CALLID, DN, OPI, [SUB, BILLING, USERINFO, CARRIER])

This message is similar to SETUP, except that it performs an origination from a conference instead of a channel. The medium and direction are the same as that of the conference. CONFID is the conference identifier (which must exist), CALLID is the identifier for the new call, and DN is the destination. SUB is an optional subaddress, and the definitions for BILLING, USERINFO, and CARRIER are the same as for the SETUP message.

5. Initialization Messages

RESET CUST(RESET)

This message is sent by the subscriber interface to the network to request that all of the subscriber's calls be cleared. RESET CUST is used if the subscriber interface detects a condition that could indicate that the subscriber interface's state is inconsistent with the network's state. When RESET CUST is used in this way, parameter RESET has value REQ, indicating that this message is a request to reset the subscriber.

The network acknowledges RESET CUST with a RESET NET message with RESET=ACK.

A non-acknowledgment RESET NET message is acknowledged with a RESET CUST(ACK) message.

RESET NET(RESET)

This message is sent by the network to the subscriber interface to announce that all of the subscriber's calls have been cleared. It is a direct command to the subscriber's interface to reset its internal state and clear all calls. RESET NET is used if the network detects a condition that could indicate that the subscriber interface's state is inconsistent with the network's. When used in this way, RESET has value REQ, indicating that this message is not an acknowledgement of a previous request from the subscriber.

RESET NET (with RESET=ACK) is also used to acknowledge a RESET CUST message from the subscriber interface. This type of response implies that the network accepts the subscriber's request and has taken steps to clear all calls for that subscriber.

When the subscriber interface's state as understood by the network gets out of synchronization with the subscriber interface's idea of its state, it is possible (and perhaps likely) that both ends will detect the problem at about the same time, and so REQ reset messages may "cross in the mail". For this reason, when either end is expecting an acknowledgement, the RESET parameter is ignored, and the message is interpreted as an acknowledgement. The RESET parameter is examined only when an acknowledgement is not expected, to verify that this message is not (erroneously) meant as an acknowledgement. An erroneous RESET CUST(ACK) is ignored by the network.

6. Errors

ERROR(MESSAGE, ERROR)

The central node sends this message to the subscriber in response to a message that has made an illegal request or a request which the network cannot interpret, and which cannot be associated with some call or conference identifier. (If the request can be tied to some call or conference identifier, a STATUS message is used instead.) MESSAGE is the entire offending message as received by the network from the subscriber interface. ERROR is a code specifying the problem. Possible ERRORs include (but are not limited to):

- Incorrect message format
- Unknown message type
- Invalid call or conference identifier
- Duplicate assignment of a call or conference identifier
- Undefined call identifier
- Request illegal in context

APPENDIX B

INTER-PROCESS MESSAGES

These messages are categorized as follows:

1. Messages sent between call terminal processes at opposite ends of a call.
2. Messages sent from a call terminal process to a conference terminal process.
3. Messages sent from a conference terminal process to an associated call terminal process.
4. Messages sent from the message router to terminal processes on the same remote module processor.
5. Other messages between terminal processes serving a single subscriber.

1. Between Call Terminal Processes at Opposite Ends of a Call

Messages between the terminal processes at opposite ends of a call are sent via a "send message" primitive of the resource management subsystem 803. This resource management-provided function allows the terminal processes to address each other by the PATHIDS for their respective ends of the call, rather than by TPID, so that there is no need for a call terminal process to know the TPID of its counterpart at the other end of the call. Messages passed across a call from one terminal process to another terminal process are embedded in messages passed between the resource managers residing on the processor or processors involved. Interprocessor message traffic is thus reduced through the combination of intra-resource management and intra-call processing messages crossing processor boundaries. Except for cORC_INCOMING messages (see below), the destination resource manager uses operating system message primitives to deliver messages passed across a call.

cORC_INCOMING(FARDN,FS_STATUS,FC_STATUS,OWNER,INCTYPE,OPI, USERINFO,XFERS,FARSUB,DN,SUB)

Pass new call description to destination terminal process. This message is passed to call processing at the destination end via a call on subroutine CP_INCOMING by the resource management subsystem. Additional information about the new call (MEDIUM, DIRECTION, PATHID and the destination customer's CUSTID) are passed to call processing by the resource management subsystem in this same CP_INCOMING call.

The FARDN, FS_STATUS, FC_STATUS and OWNER slots of the destination's call register are initialized with the values provided in the cORC_INCOMING message. The first three of these describe the originator to the destination; OWNER tells the destination which end owns the call, and is encoded from the destination's point of view.

INCTYPE describes the operation performed by the originator (or a possible third party) that resulted in this call to the destination. Values include codes for ordinary call setup and for call transfer.

OPI controls the appearance of the optional parameters (those parameters following OPI). The optional parameters are:

USERINFO—End-to-end user information to be passed to the destination subscriber interface.
XFERS—Transfer history of this end of this call.
FARSUB—Subaddress of originator.
DN—Directory number of destination. Appears only if CUSTID has more than one directory number.
SUB—Subaddress of destination.

cORC_FSTATUS(FS_STATUS,FC_STATUS,REASON)

Pass status between ends of a call. cORC_FSTATUS is sent when a status change (including call termination) occurs at one end of a call. Parameters FS_STATUS and FC_STATUS encode the status of the SENDING end of the call in a manner that allows the values to be simply copied into the receiving end's call register slots of the same names.

If FS_STATUS indicates that the call is being terminated, a return cORC_FSTATUS message indicating termination is expected as an acknowledgement (except, that a termination acknowledgement is not itself acknowledged). If both ends simultaneously and independently terminate the call, each end treats the other's termination message as an acknowledgement—thus "glare" on termination is not a problem.

The parameter REASON is meaningful only when the call is being terminated, and (if it does not have a null value) indicates a reason for termination of the call.

cORC_XFER(DN,BILLING,USERINFO)

Request that the terminal process receiving the cORC_XFER clear the call's current path, and request a new one to the given DN.

2. From a Call terminal Process to Conference Terminal Process

These messages are sent to a conference terminal process by an associated call terminal process. Both terminal processes serve the same subscriber, and reside in the same remote node processor.

Except for cOC_JOIN and cOC_NEWCONF, all messages between a conference terminal process and associated call terminal processes contain a PORTID parameter. The PORTID is a logical identifier assigned by the conference terminal process to a call associated with the conference. The call terminal process is advised of its PORTID when the conference terminal process acknowledges that the call is associated with the conference.

cOC_NEWCONF(CONFREG)

When, as a result of a CREATE CONF message or a SETUP message with CONFID appearing, a call terminal process spawns a new conference terminal process, the call terminal process sends a cOC_NEWCONF message to the conference terminal process to help it initialize. The parameter CONFREG points to the conference register obtained and initialized by the call terminal process on behalf of the conference terminal process. No acknowledgement is expected.

cOC_JOIN(PATHID,TPID,RMMASK)

Request association with a conference port. PATHID names the call's path, as obtained from the resource management subsystem 803. TPID identifies the call's terminal process. RMMASK advises the conference terminal process of the resource management subsystem operations needed to disassociate the call from its current channel or channels or conference port. The conference terminal process calls on the resource management subsystem to associate the call with a conference port, and responds to the call terminal process with cOC_CNFSTAT.

cOC_UNJOIN(PORTID)

Notify of disassociation from a conference port. The call terminal process sends this message after calling on the resource management subsystem to disassociate its call from the conference port. The call terminal process' entry in the conference table is marked free.

cOC_CLEARACK(PORTID)

Acknowledge a cOC_CNFCLEAR message from a conference terminal process, where the call is associated with the conference.

3. From a Conference Terminal Process to an Associated Call Terminal Process cOC_CNFSTAT(ASCLASS,PORTID)

This message is used to acknowledge messages from a call terminal process, and to advise call terminal processes of the conference's status. ASCLASS is related to the call status variable of the same name, and can take one of the following values:

cP_CONF—Used to acknowledge a successful cOC_JOIN when at least two conference ports are in use after the new association is made (this one and at least one other). cOC_CNFSTAT(cP_CONF, ... ) is also sent to the first call in a conference whenever the number of ports in use increases from one to two.

cP_DCONF—(Degenerate Conference). Used to acknowledge a successful cOC_JOIN request when the call has joined a previously empty conference. cOC_CNFSTAT(cP_DCONF, ... ) is also sent to the one remaining call in a conference whenever the number of ports in use decreases from two to one.

cP_DISAS—Used to acknowledge a successful cOC_UJOIN.

cP_JOINFAIL—Used to negatively acknowledge a cOC_JOIN.

cOC_CNFSTAT(cP_JOINFAIL, ... ) is sent to a call terminal process that has requested association with a conference that has no free ports and cannot grow. (Presumably, the conference terminal process made an unsuccessful request of the RM for a larger conference COUNT.) The value of PORTID is not meaningful.

cOC_CNFCLEAR(REASON,PORTID)

A conference terminal process sends cOC_CNFCLEAR to all associated call terminal processes when the conference is cleared by the subscriber. REASON is the subscriber interface-supplied reason code. The call terminal processes acknowledge cOC_CNFCLEAR by sending a cOC_CLEARACK message.

4. From the Message Router to Terminal Processes On the Same Remote Module Processor All messages sent by a subscriber interface to the network are first received by the message router 8000. Upon receipt of most messages from a subscriber interface, the message router 8000 extracts the CID (call or conference identifier) from the message, calls on the database management subsystem 802 to translate the (CUSTID,CID) pair to a TPID, and then relays the message unchanged except for its message type field, which is translated to the corresponding internal call processing message type.

Receipt of a SETUP message from a subscriber interface requires creation of a call terminal process by the message router 8000. The message router 8000 then calls on the database management subsystem 802 to store the CALLID-TPID correspondence. The message router 8000 calls a memory allocation function of the operating system 804 to allocate a call register, and uses the contents of the message to initialize the register fields. The appropriate CUSTID value is also stored in the call register. A cOM_SETUP message is then sent to the new terminal process giving the address of the call register. If the message from the subscriber interface included a USERINFO field, this is passed via a second allocated storage block, whose pointer is passed to the new call terminal process in the same message.

5. Between Terminal Processes Serving a Single Subscriber

There are several message types that do not fit into any of the above categories.

cOC_REORIG is used to pass data between a call terminal process and its successor during a point-to-point reorigination. The remaining messages described below are used during a subscriber reset sequence.

cOC_REORIG(MED,CARRIER,DIR,ASCLASS,CS_STATUS, [CHAN,CONF])

When a point-to-point REORIG request is received from the subscriber interface, the old terminal process sends a cOC_REORIG message to the new terminal process to pass it call state components not included in the REORIG message from the subscriber interface. If ASCLASS is cP_CHAN, optional parameter CHAN appears. If ASCLASS is cP_CONF or cP_DCONF, optional parameter CONF appears. If ASCLASS is cP_DISAS, neither of the optional parameters appears.

cOM_RESET(RTYPE,CUSTID)

When a subscriber's communications are to be reset (because either the subscriber interface or some network component believes that the subscriber interface's state and that of the network are inconsistent), a special reset and initialization terminal process is created for the subscriber to administer the reset operation. The cOM_RESET is used to advise the reset and initialization terminal process of the subscriber to be reset.

This message is also used to advise the reset and initialization terminal process of the arrival of a reset acknowledgement from the subscriber interface. Parameter RTYPE indicates whether a reset message from the subscriber interface was intended as a request or acknowledgement.

The reset and initialization terminal process sends cOR_RCLEAR to each of the subscriber's terminal processes, and takes appropriate action to clear any proxy vendor calls that the subscriber might have in progress.

cOR_RCLEAR(RESET-TPID)

The reset and initialization terminal process sends cOR_RCLEAR to each of the subscriber's call and conference terminal processes. The receiving terminal process interprets this message as a request to clear, and acknowledges it by sending cOC_RACK back to the reset and initialization terminal process (whose TPID is given by the parameter).

cOC_RACK

Upon receipt of cOR_RCLEAR, a call or conference terminal process interacts with the resource management subsystem to deallocate its resources, and then sends cOC_RACK to the reset and initialization terminal process.

APPENDIX C

Resource Management Allocations and Operations Invoked in Response to Call Processing Requests

Resource Allocation

Each resource manager sees several pools of resources for which it is either completely or partially responsible. These resources fall into the following categories:

1. Single-user resources, which have been determined by another party—these include switch points directly connected to subscriber channels. When allocating these resources, the resource manager verifies that the resource is unused, and that the other party has "permission" to use the resource, and then marks it busy.
2. Single-user resources which are completely owned by the resource manager—these include feeders between the remote node wideband switch and the central node wideband switch, and conference circuits. Allocation consists of finding the correct pool of resources, possibly using a key (such as medium and trunk group), and selecting a resource from that pool. An ordered (linked) list of resources is kept, and the top item from the list is selected. Resources are returned to the bottom of the list, so that all resources will be used. This helps ensure that a hardware failure will not go undetected for extended periods of time.
3. Single-user resources which are owned by more than one resource manager—these include trunks between central nodes. Each resource manager keeps its own "share" of the pool. Each "share" may be treated as though it were completely owned by a resource manager. When one of the resource managers detects that its "share" is below a minimum threshold, it requests a number of resources from the other. The reply is a list of resources (anywhere from 0 to the requested number of resources). The advantages of this implementation include the fact that there are no conditions of two managers requesting the same resource simultaneously, and that resource negotiations are fairly rare. This results in a savings in elapsed and real time.
4. Multiple-user resources which are completely owned by a resource manager—these include broadcast feeders (and switch points), for both remote node and central node wideband switches. For these resources, a resource manager verifies that the requester has "permission" to use the resource, and increments a usage count by one.

For a standard point-to-point narrowband call, the following resources must be allocated:
1. Originating subscriber channels—single-user, selected by the subscriber
2. Destination subscriber channels—single-user, selected by the destination subscriber. At this point, the entire path has been determined.

For a standard point-to-point wideband call, the following resources must be allocated:
1. Originating subscriber channels—single-user, selected by the subscriber.
2. Feeder from the remote node to the central node—selected by the resource manager.
3. Feeder from the central node switch down to the destination remote node—selected by the destination resource manager.
4. Destination subscriber channels—single-user, selected by the destination subscriber.

For an external outgoing point-to-point narrowband call, the following resources must be allocated:
1. Originating subscriber channels—single-user, selected by the subscriber.
2. Trunk group to the other central node—selected by the inter-node resource manager. The remainder of the path is determined by the other central node.

For an external outgoing point-to-point wideband call, the following resources must be allocated:
1. Originating subscriber channels—single-user, selected by the subscriber.
2. Feeder from the remote node to the central node switch—selected by the resource manager.
3. Trunk from the central node switch to the other central node—selected by the inter-node resource manager. The remainder of the path is determined by the other central node.

For an external incoming point-to-point narrowband call, the following resources must be allocated:
1. Trunk group from the other central node to the central node switch—selected by the other central node.
2. Destination subscriber channels—single-user, selected by the destination subscriber.

For an external incoming point-to-point wideband call, the following resources must be allocated:
1. Trunk group from the other central node to the central node switch—selected by the other central node.
2. Feeder from the central node switch down to the destination remote node selected by the destination resource manager.
3. Destination subscriber channels—single-user, selected by the destination subscriber.

Resource Manager Operations

1. Originating a Call

The resource manager portion of a point-to-point call origination scenario is as follows:

1. After the terminal process is created and the subscriber data has been fetched, call processing calls a resource manager "initialize" upper path (UPINIT) primitive to initialize the upper path, passing it information which includes:

Subscriber line number;
Medium—voice, video, data, and any modifiers or options (these may be medium-dependent); and
Direction—duplex, simplex-in, simplex-out.
A PATHID identifying a specific instance of the upper path structure is returned to call processing.

2. The path down to the subscriber is generated by calling an "associate" path primitive, and passing it the PATHID, and the subscriber's channel numbers. A "connect" primitive is then called to connect the path. At this point, the path up to the central node switch has been allocated and connected.

3. The path to the destination subscriber is triggered by calling a "locate" destination party primitive and passing it the following:

Destination directory number;
A terminal process SUBPID so that a single process may handle multiple calls; and Data block containing call processing information (to be delivered to the other terminal process).

4. If the directory number is local, the destination resource manager is determined by doing a table look-up. This look-up returns a value which either indicates the directory number is non-existent, or returns a value indicating the identity of the resource manager responsible for the next step in the call (it may be the destination, if this is a local call). If the directory number is not local, the medium and directory number are used to determine which external resource manager should be used (the search is similar to picking a trunk group in telephony).

In either case, the directory number either is local and does not exist (a failure condition), or is mapped into some type of a resource manager process (local or inter-node). If the directory number is local and does not exist, a return condition of "failure" is given to call processing. If the destination directory number of an inter-node call does not exist, a failure message is sent from the terminating node to the terminal process (via the external interface).

5. At this point, a message is sent via a "send message" primitive to the resource manager responsible for handling the next step. This may be the current resource manager if the originator and destination reside on the same processor. The following is contained within the message:
Destination directory number;
Medium—voice, video, data, and any modifiers or options (these may be medium dependent);
Direction—duplex, simplex-in, simplex-out;
A value indicating the originating resource manager;
The switch path identifier in the central node switch;
The terminal process identifier (PID);
The terminal process SUBPID; and
Data block containing call processing information (to be delivered to the other terminal process)

6. At this point, it is up to the resource manager at the other end to perform the next step, and a return condition of "pending" is given to call processing.

7. At the far end, the resource manager receives the message and starts by creating an upper path structure, and initializing it. This end of the path is responsible for making and breaking the connection at the central node switch, in response to CLEAR, HOLD, and ACCEPT requests at either end.

8. At this point, a call processing procedure is called to create a destination terminal process. It is passed the following information:
Destination directory number;
Medium—voice, video, data, and any modifiers or options (these may be medium dependent);
Direction—duplex, simplex-in, simplex-out;
The path identifier (PATHID) to be used when making requests to the resource manager;
The originator's terminal process identifier (PID);
The originator's terminal process SUBPID; and
Data block containing call processing information (sent by the other terminal process).
An upper path currently exists for this call, but no lower path exists on this end.

2. Accepting a Call

If the subscriber accepts the call, the following occurs:

1. Call processing calls the "associate" path primitive, passing it the following information:
The PATHID used by the resource manager; and
The subscriber's channel number(s).
This is followed by a call to the "connect" path primitive.

2. The resource manager tells the switch controller to make the final connection, and returns "success" or "failure" to call processing.

As far as the resource manager is concerned, the call has been completed.

At this point, the resource manager is out of the picture until call processing requests that the path be completed, or torn down.

3. Hanging Up a Call

If the subscriber clears the call, the following occurs:

1. Terminal process calls a "clear" primitive, passing it the PATHID and a data block to be passed to the other end's terminal process.

2. The resource manager starts a disconnect operation on this side of the call.

3. The "clear" primitive sends an internal hangup request to the resource manager at the other end, passing it the following information:
PATHID; and
Call processing data block.

4. The process now waits for a reply from the switch. When the reply is received, the subroutine returns, and the terminal process waits for a reply from the other terminal process.

5. The other end's resource manager process (not the terminal process) receives the clear request, and notifies the terminal process.

6. The terminal process replies by calling the resource manager "clear" primitive.

7. The resource manager starts a disconnect operation on this side of the call.

8. Hangup procedure sends internal hangup request to the other end's resource manager, passing it the PATHID and call processing data block.

9. The process now waits for a reply from the switch.

10. Call processing calls a primitive to deallocate the upper path structures (this occurs on both sides).

The reason automatic deallocation is not performed upon hanging up is because there is a potential race condition. If both ends hang up at approximately the same time, it is possible that the upper path structure at the destination end is disconnected and deallocated before the hangup request is received from the origination end. The protocol may be stated as follows: each side must call the "clear" primitive, and each side must have received a "clear" message from the other side. When both of these conditions have been satisfied, all communication with the other end has been severed.

4. Transferring a Call

The transfer sequence is basically an origination sequence followed by a termination sequence. The following steps occur:

1. The terminal process requesting the transfer sends the directory number, along with any other relevant information, to the terminal process at the other end.

2. The terminal process at the far end is responsible for performing the "locate destination party" operation on the upper path.

The issue of when to terminate the call requesting the transfer has no effect on the interface between call processing and the resource manager.

5. Creating a Conference

The following steps are involved:

1. Call processing requests that a conference be initialized. This operation must be performed by the process that is to be responsible for the conference.
2. The conference is associated with the same lower path as the call (if any) that is being moved to the conference.
3. The call that is to be moved to the conference is disconnected (if necessary), and disassociated from the channel (or conference) it was previously associated with (if any).
4. The lower path of the conference is set to be in the same state as that of the original call (either "connected", "37 hold", or "disassociated").
5. The call is connected to the conference.

Joining to or adding to this conference involves associating an already existing upper path to the conference, or creating a new upper path and associating it with the conference.

APPENDIX D

Switch Control Interface

A switch controller sees each port as being in one of the following sWPT states:

sWPTNCON—No paths using this port are connected.

sWPTCONN—For an input port, at least one path using this port is connected. For an output port, exactly one path using this port is connected.

sWPTMNT—The port is out of service for maintenance. There may be several maintenance states, but, other than maintenance and administration, switch controller clients (resource managers) need not distinguish among maintenance states.

Additionally, each port has a list of associated paths; testing this list for "empty" quickly determines whether this port is currently associated with any paths.

A switch controller sees each end of a path as having one of the following sWE states:

sWEFREE—(Path end free.) The resource manager at this end has freed the path, and will perform no more operations on the path. No switching resources are allocated for the path. The switch controller is awaiting a free request from the other resource manager; when this second free request arrives, the path data structure will be released. There may be an audit-enforced time limit separating the two free requests. A consistent path data structure will have at most one of its ends in this state.

sWEFAIL—(Path failure.) The path has been deallocated due to a failure, or due to a request from maintenance to unconditionally take a port out of service. When a path failure occurs, both ends are put in state sWEFAIL, and the concerned resource manager(s) are notified. The resource manager(s) owning the two ends are expected to acknowledge by issuing free requests. When the failure has been acknowledged at one end (but not the other), the acknowledged path end is put in state sWEFREE; when both ends have been acknowledged, the path data structure is released.

sWENAS—(Path end not associated.) There is currently no port associated with this end of the path. No switching resources are allocated for the path.

sWEAS—(Path end associated but not connected.) There is currently a port associated with this end of the path. If there is also a port associated with the other end of the path (i.e., the other end is in state sWEAS or sWECON), then the required switching resources for the path are allocated. The path is not connected.

sWECON—(Path end connected.) There is currently a port associated with this end of the path. If there is also a port associated with the other end of the path (i.e., the other end is in state sWEAS or sWECON), then the required switching resources for the path are allocated. If both ends of the path are in this state, then the path is physically connected.

The switch controller maintains state and relationship information about ports and paths in three tables:

1. An Input Port Table, which contains one entry per input port, indexed by input port identifier. For each input port, this table contains an entry specifying the port's sWPT state, the resource manager which "owns" this port, the number of paths associated with the port, the identities of the associated paths, and the number of the associated paths that are connected to the port.

2. An Output Port Table, which contains one entry per output port, indexed by output port identifier. (A given port identifier may name both an input and an output port. To uniquely specify a port, a port identifier must be modified by context or by explicit specification of port direction.) For each output port, this table contains an entry specifying the port's sWPT state, the resource manager which "owns" this port, the number of paths associated with the port, the identities of the associated paths, and the identity of the path, if any, that is connected to the port.

3. A Path Table, which contains one entry per allocated or pending path, indexed by switch path identifier. Each path entry contains the following information for each end of the path: the sWE state of the path end, the identity of the resource manager that "owns" the path end, and the identity of the port associated with the path end.

Each port entry is the head of a triple linked list of path entries for paths using the port. Each member of a triple linked list contains pointers to the next list item, the previous list item, and the head item. Each path entry for an allocated path is on two linked lists, one for its input port, and one for its output port.

Switch Controller—Client Messages

Network components outside a switch controller interact with the switch controller via a message set, described below.

Each message type takes one or more of the following parameters:

FROM—The identifier of the entity (usually a resource manager) that sent a switch control request.

INMASK—In a control request, a mask indicating which operations are to be performed on the input end of the path. In a status message, a mask indicating the status of the input path end. (See MASK symbols below, for the operation code definitions.)

INPORT—A (logical) port identifier in a context where an input port is required. (See PORT, below.)

MASK—In a control request, a one byte mask indicating operations to be performed on a specified path end. In a status or response message, a one byte mask indicating the state of the path end. INMASK is a MASK for the input end of the path, and OUTMASK is a MASK for the output end. (See MASK symbols, below.)

NPATHS—The number of paths associated with a named PORT.

OUTMASK—In a control request, a mask indicating which operations are to be performed on the output end of the path. In a status message, a mask indicating the current status of the output path end. (See MASK symbols, below.)

OUTPORT—A (logical) port identifier in a context where an output port is required. See PORT.

PATH—A switch path identifier. Switch path identifiers are chosen by the switch controller. Note that these are not the same as the PATHIDS managed by resource managers. SWNPATH may be used as a null or undefined switch path identifier.

PORT—A port identifier. Identifies a single port in a direction (input or output) implied by context. The same identifier may name both an input port and an output port: context is necessary to distinguish an input port from an output port with a common identifier. A special constant SWNPORT may be used as a null port identifier.

PSTATE—Port state. (See port state definitions.)

REASON—A code indicating the reason some action was taken. In SW_STIN, SW_STOUT and SW_STIO messages reporting that a path has been freed, REASON indicates why. In SW_INITRQ and SW_INIT, REASON indicates the reason for an initialization, or specifies that this message is an acknowledgement to a previous initialization request or notice. In SW_ERROR, REASON specifies why the switch controller rejected the request.

RM—The identifier of a resource manager, distinct from FROM or TO.

SEQ—In a request, a sequence number specified by the sending resource manager. The response will contain the same sequence number. Certain messages from the switch controller to the resource managers are sometimes sent as responses, and are sent as unsolicited notices in other situations. The special SEQ value SWNOSEQ is used in a message from the switch controller when there is no matching resource manager request.

SUCCESS—A code in a response indicating whether the corresponding request was successfully honored. If the request was not honored, SUCCESS encodes a reason for failure.

TO—The identifier of the entity (usually a resource manager) to which a response is addressed.

Mask Symbols

Each of the following symbols specifies one bit in a MASK parameter. In control requests, within the restrictions given below, bit symbols may be ORed together to form sequences of operations that will be performed in the order listed below. For the purpose of the path end state restrictions given below, the path end state is recomputed after each operation in a sequence. A zero mask is explicitly allowed in a request, yielding a request that does not change the path end's state, but does evoke a response reporting the state. A zero state mask should not occur.

SWMAS—In a control request, associate the path end and the port named by the PORT parameter corresponding to this mask. If the path end is already associated with a port, the old association is broken, and replaced by the new one. PORT must be owned by the requesting resource manager FROM. In a status message, the path end is associated with the named port.

SWMCN—In a control request, connect the path at this path end. SWMCN requires that the path end be in state sWEAS. SWMAS and SWMCN may be combined (ORed) in order to associate and connect a path end in a single control request. In a status or response message, the path end is connected to the named port.

SWMDC—In a control request, disconnect the path at this path end. It is an error to specify this operation in combination with SWMCN, or to apply it to a path end in any state other than sWECON. In a status or response message, the path end is not connected.

SWMDA—In a control request, disassociate the path end from its current port. It is an error to specify this operation in combination with SWMAS. The path end's state must be sWEAS. SWMDC and SWMDA may be combined (ORed) in order to disconnect and disassociate a path end in a single control request. In a status or response message, the path end is not associated with any port.

SWMAU—In a control request, authorize a resource manager RM to use the path end; ownership of the path end is passed to the resource manager RM. A resource manager must own both path ends in order to give one away. The path end's state must be sWENAS. SWMAU may be combined (ORed) with SWMDA to give away a path end that was initially in state sWEAS; the three bits SWMDC, SWMDA, and SWMAU may be ORed to give away a path end that was initially in state sWECON. In a response message, the path end is given to the resource manager RM in the corresponding control request.

SWMFR—In a control request, free the path at this end. No further control requests will be honored at this end. SWMFR ordinarily requires that the path end be in state sWENAS; it may be combined with SWMDA if the path end is in state sWEAS, or with both SWMDC and SWMDA if the path end is in state sWECON. SWMFR should not be combined with any operations other than SWMDC and SWMDA. In a status or response message, the path end was just freed, for a reason given by REASON. A path failure notification is acknowledged by making a SWMFR request; in this case, the path end is in state sWEFAIL, and any other mask bits combined with SMFR are ignored.

Note that in STATUS messages, MASK is actually an alternative encoding of a path end state.

Messages

The messages through which a switch controller interacts with other network components are grouped according to the following categories:

1. Path Allocation and Control Messages

These messages are used primarily for communication between the resource managers and the switch controllers for the creation and control of paths between pairs of ports.

1.1.1 Path Allocation and Control Requests

SW_CTLIN(FROM,SEQ,PATH INPORT INMASK RM)

Perform control operations on the input end of a path. FROM identifies the issuer of the request. When action on the request is complete, a SW_STIN response will be sent to FROM containing the same sequence number SEQ. If PATH is SWNPATH, a new path is created with both ends disassociated (i.e., in state sWENAS). Then, control operations specified by INMASK are performed on the input end of the named or newly created path. If the SWMAS bit of INMASK is set, the path end is associated with INPORT; otherwise INPORT is ignored. If the SWMAU bit of INMASK is set, control of the path end is passed to RM (which must be distinct from FROM); otherwise RM is ignored.

SW_CTLOUT(FROM,SEQ,PATH,OUTPORT,OUTMASK,RM)

Perform control operations on the output end of a path. Except for the affected path end, this command behaves just as SW_CTLIN does. A SW_STOUT response is sent to FROM.

SW_CTLIO(FROM,SEQ,PATH,INPORT,OUTPORT,INMASK,OUTMASK,RM)

Perform control operations on both ends of a path. This command is an abbreviation for a SW_CTLIN, SW_CTLOUT sequence referencing the two ends of a single path. The following restrictions must be observed:

1. SWMAU can be applied to at most one of the two path ends.
2. If SWMFR is applied to one of the two path ends, it must be applied to both.

1.1.2 Path Allocation and Control Responses

SW_STIN(TO,SEQ,PATH,INPORT,INMASK,RM,REASON,SUCCESS)

The switch controller uses a SW_STIN message to report the status of the input end of PATH to TO. Ordinarily, SW_STIN is sent in response to SW_CTLIN, in which case the value of SEQ is taken from the matching SW_CTLIN message. (An unsolicited SW_STIN message is sent when the path is torn down due to path failure, including an unconditional request from maintenance to take a port out of service. See below.)

INMASK encodes the current state of the input end of PATH. INPORT gives the port associated with the path end, if any; the value of INPORT is undefined if the path end is not associated with a port. When SW_STIN is a response to a control request that passed control of the path end to another resource manager, RM names the new owning resource manager; otherwise, RM is undefined. If the path end has just been freed, REASON tells why.

When both ends of a path are freed due to a failure or fault, and the path is shared by two resource managers, SW_STIN is sent unsolicited to the resource manager controlling the input end to report the problem. In this case, SEQ will contain the value SWNOSEQ. The resource manager is expected to respond with a SW_CTLIN request freeing the path end. This SW_CTLIN message will not be acknowledged.

SUCCESS indicates whether the requested operations were successfully completed. An illegal request will be reflected in SUCCESS.

SW_STOUT(TO,SEQ,PATH,OUTPORT,OUTMASK,RM,REASON,SUCCESS)

The switch controller uses a SW_STOUT message to report the status of the output end of PATH to TO. Except that it deals with an output path end, SW_STOUT is used just as is SW_STIN.

SW_STIO(TO,SEQ,PATH,INPORT,OUTPORT,INMASK,OUTMASK, RM,REASON,SUCCESS)

The switch controller uses a SW_STIO message to report the status of both ends of a path to TO. Ordinarily, SW_is used to respond to SW_when a single resource manager controls both ends of a path, however, it may also be used to report that both ends of a path have been freed due to a failure or fault. SW_STIO's uses are analogous to SW_STIN and SW_OUT.

2. Port Maintenance and Assignment Messages

These messages are used by the maintenance and administration subsystems to perform administrative control operations on ports:

1. Remove a port from service for maintenance (either conditionally or unconditionally).
2. Restore a port to service from a maintenance state.
3. Update the port's assignment to a resource manager.
4. Obtain the port's complete state, except for the list of associated paths.

The request messages for these functions have a common format, and the switch controller uses the same response message types to acknowledge them. For each control operation there are two message types, one for input ports and one for output ports. There are also two response messages, one for input ports and one for output ports.

1.2.1 Port Maintenance and Assignment Requests

SW_CMPI(FROM,SEQ,INPORT)
SW_CMPO(FROM,SEQ,OUTPORT)

Conditionally put the named port (INPORT or OUTPORT) in a maintenance state (sWPTMNT), making it unavailable for ordinary use. SW_CMPI is used for input ports, and SW_CMPO is used for output ports. SEQ will be returned in the corresponding SW_PSTI or SW_PSTO message.

These requests fail if the port is currently associated with one or more paths. Only maintenance is allowed to request transitions to and from maintenance state.

SW_UMPI(FROM,SEQ,INPORT)
SW_UMPO(FROM,SEQ,OUTPORT)

Unconditionally put the named port into a maintenance state (sWPTMNT), making it unavailable for ordinary use. SW_UMPI is used for input ports, and SW_UMPO is used for output ports. SEQ will be returned in the corresponding SW$_{13}$ PSTI or SW_PSTO message.

Only maintenance is permitted to use these requests.

SW_RMPI(FROM,SEQ,INPORT)
SW_RMPO(FROM,SEQ,OUTPORT)

Restore the named port to service, changing its state from sWPTMNT to sWPTNCON. These requests will be rejected if the port is in a state other than sWPTMNT, or if the request is made by any entity other than maintenance.

SEQ will be returned in the SW_PSTI or SW_PSTO response message.

SW_ASPI(FROM,SEQ,INPORT,RM)
SW_ASPO(FROM,SEQ,OUTPORT,RM)

Assign the named port to RM. This request is honored only if issued by the entity in charge of port assignments, and only if the port is currently in sWPTMNT state. The requirement that a port be in maintenance state prevents a port from being transferred from one resource manager to another while it is in use.

SEQ is returned in the corresponding SW_PSTI or SW_PSTO response.

SW_GSPI(FROM,SEQ,INPORT)

SW_GSPO(FROM,SEQ,OUTPORT)

Request the state of the named port. A SW_PSTI or SW_PSTO message is sent to FROM reporting the current state of INPORT or OUTPORT.

2.2 Port Maintenance and Assignment Responses

SW_PSTI(TO,SEQ,INPORT,PSTATE,RM,-
NPATHS,SUCCESS)
SW_PSTO(TO,SEQ,OUTPORT,PSTATE,RM,-
NPATHS,SUCCESS)

The switch controller uses SW_PSTI to respond to port maintenance and assignment requests addressing input ports, and SW_PSTO to respond to such requests for output ports. TO is the identifier of the component that made the request being acknowledged. SEQ is copied from the corresponding request. INPORT or OUTPORT is the port addressed in the corresponding request, and PSTATE is the port's state after processing the request. After processing the request, the port is assigned to RM, and has NPATHS associated paths. SUCCESS indicates whether the request was successful; if the request failed, SUCCESS indicates a reason for the failure.

3. Initialization

SW_INITRQ(FROM,SEQ,REASON)

Resource manager FROM sends this message to request that the switch controller clear all paths associated with FROM's ports. REASON specifies the reason for the initialization request.

The switch controller acknowledges with an SW_INIT message containing the same SEQ value and sWRIACK (acknowledge) as the REASON (see below).

SW_INIT(TO,SEQ,REASON)

The switch controller uses this message to notify a resource manager TO that all paths in which TO is currently participating have been cleared. If the entire switch was reset, messages of this type are sent to all client resource managers. Except when SW_INIT is used to acknowledge SW_INITRQ, SEQ will have the value SWNOSEQ.

The resource manager is expected to acknowledge with a SW_INITRQ message containing SEQ=SW-NOSEQ and REASON=sWRIACK.

4. Error Response

SW_ERROR(TO,SEQ,REASON,MESSAGE)

This message is sent in response to any erroneous request when there is no applicable specific response message. In particular, SW_ERROR is used to respond to an undecipherable message. MESSAGE is the offending message.

What is claimed is:

1. A control arrangement for a communication switching system having first and second communication networks configurable independently from each other separately to provide first and second communications, respectively, for terminal logical channels of the system, the system further including first and second network control means for configuring the first and the second networks, respectively, in response to receipt of requirements signals, the control arrangement comprising:

first program controlled means cooperative with both the first and the second network control means and operable in response to receipt of requirements signals and associated signals indicating the first communications for generating requirements signals for controlling the operation of the first network control means to configure the first network into at least one of (a) physical communication channels corresponding to the logical channels, and (b) physical communication paths between the physical channels and corresponding to logical communication paths, and being further operable in response to receipt of requirements signals and associated signals indicating the second communications for generating requirements signals for controlling the operation of the second network control means to configure the second network into at least one of (a) physical communication channels corresponding to the logical channels, and (b) physical communication paths between the physical channels and corresponding to logical communication paths; and second program controlled means independent in program from the first program controlled means and operable in response to receipt of call signals and associated signals indicating either one of the first and the second communications for any one of the logical channels for processing call information to generate, both independently of and for association with the first or the second communication indicating signals, the requirements signals for controlling the operation of the first program controlled means to establish the logical communication paths between the one logical channel and another at least one logical channel, independently of both the first and the second networks and the first and the second network control means.

2. A control arrangement for a communication switching system having first and second physical resources configurable independently from each other separately to provide first and second communications, respectively, for terminal logical channels of the system, the first physical resources including a first switch having a plurality of ports connected to physical channels for corresponding to terminal logical channels, and the second physical resources including a second switch having a plurality of ports and a third switch having a plurality of ports some connected to ports of the second switch and others connected to portions of physical channels corresponding to terminal logical channels, the system further including a first controller responsive to receipt of requirements signals for configuring the first switch into switch paths between selected first switch ports, and a second and a third controller each responsive to receipt of requirements signals for configuring the second and the third switch, respectively, into switch paths between selected ports of the second and the third switch, respectively, the control arrangement comprising:

first program controlled means cooperative with the first, the second, and the third controllers and operable in response to receipt of requirements signals and associated signals indicating the first communications for (a) selecting ports of the first switch for physical communication paths corresponding to logical communication paths and (b) generating independently of the first switch requirements signals for controlling the operation of the first controller to establish switch paths through the first switch between the selected ports of the first switch, and further operable in response to receipt of requirements signals and associated signals indicating the second communications for (a) selecting ports of the second switch and of the third switch for physical communications paths corresponding to logical communication paths and for physical communication channels corresponding to the logical channels, respectively, and (b) generating independently of the second and the third switches first and second requirements signals for controlling the operation of the second and the third controller, respectively, to establish switch paths through the second and the third switch, respectively, between the selected ports of the second switch and of the third switch, respectively; and second program controlled means independent in program from the first program controlled means and operable in response to receipt of call signals and associated signals indicating either one of the first and the second communications for any one of the logical channels for processing call information to generate, both independently of and for association with the first or the second communication indicating signals, the requirements signals for controlling the operation of the first program controlled means to establish the logical communication paths between the one logical channel and another at least one logical channel, independently of both the first and the second physical resources and the first, the second, and the third controllers.

3. A control arrangement for a communication switching system having first and second physical resources configurable independently from each other separately to provide first and second communications, respectively, for terminal logical channels of the system, the system further including first and second resource control means for configuring the first and the second resources, respectively, in response to receipt of requirement signals, the control arrangement comprising:

first program controlled means cooperative with both the first and the second resource control means and operable in response to receipt of requirements signals and associated signals indicating the first communications for both (a) allocating the first resources for at least one of (i) physical communication channels corresponding to the logical channels, and (ii) physical communication paths between the physical channels corresponding to logical communication paths, and (b) generating requirements signals for controlling the operation of the first resource control means to establish logical and physical connections between the allocated first physical resources, and further operable in response to receipt of requirements signals and associated signals indicating the second communications for both (a) allocating the second physical resources for at least one of (i) physical communication channels corresponding to the logical channels, and (ii) physical communication paths between the physical channels corresponding to logical commuciation paths, and (b) generating requirements signals for controlling the operation of the second resource control means to establish logical and physical connections between the allocated second physical resources; and second program controlled means independent in program from the first program controlled means and operable in response to receipt of call signals and associated signals indicating either one of the first and the second communications for any one of the logical channels for processing call information to generate, both independently of and for association with the first or the second communication indicating signals, the requirements signals for controlling the operation of the first program controlled means to both establish and control the logical commuciation paths between the one logical channel and another at least one logical channel, independently of both the first and the second physical resources and the first and the second resource control means.

4. The arrangement of claim 3 for a system having first physical resources including a first switch having a plurality of ports connected to physical channels corresponding to terminal logical channels, and further having second physical resources including a second switch having a plurality of ports and a third switch having a plurality of ports some connected to ports of the second switch and others connected to portions of physical channels corresponding to terminal logical channels, the system further including a first controller for configuring the first switch into switch paths between selected first switch ports, and a second and a third controller for configuring the second and the third switch, respectively, into switch paths between selected ports of the second and the third switch, respectively, wherein the first means are operable in response to receipt from the second program controlled means of the requirements signals and the associated signals indicating the first communications for both (a) allocating first switch ports to the logical paths and (b) generating independently of the first switch requirements signals for controlling the operation of the first resource control means to establish connections between the allocated first switch ports, and are further operable in response to receipt from the second program controlled means of the requirements signals and the associated signals indicating the second communications for both (a) allocating third switch ports for the physical channels corresponding to the logical channels and allocating second switch ports for the physical paths corresponding to the logical paths and (b) generating independently of the second and the third switch requirements signals for controlling the operation of the second and the third resource control means to establish logical and physical connections between the allocated second switch ports and between the allocated third switch ports, respectively.

5. A control arrangement for a communication switching system having narrowband and wideband physical resources configurable independently from each other each separately to provide narrowband and wideband communications, respectively, for terminal logical channels of the system, the system further including narrowband and wideband resource control means for configuring the narrowband and the wideband resources, respectively, in response to receipt of requirements signals, the control arrangement comprising program controlled resource management means cooperative with both the narrowband and the wideband resource control means and operable in response to receipt of requirements signals and associated signals indicating narrowband communications for processing narrowband resource information both (a) to allocate narrowband physical resources for at least one of (i) physical communication channels corresponding to the logical channels and (ii) physical communication paths between the physical channels and corresponding to logical call paths, to establish the logical channels and call paths, and (b) to generate requirements signals for controlling the operation of the narrowband resource control means to establish connections between allocated narrowband physical resources for control of the logical call paths, and further operable in response to receipt of requirements signals and associated signals indicating wideband communications for processing wideband resource information both (a) to allocate wideband physical resources for at least one of (i) physical communication channels corresponding to the logical channels and (ii) physical communication paths between the physical channels and corresponding to logical call paths, to establish the logical channels and call paths, and to (b) generate requirements signals for controlling the generation of the wideband resource control means to establish connections between allocated wideband physical resources for control of the logical call paths; and program controlled call processing means independent in program from the resource management means and operable in response to receipt of call signals and associated signals indicating either one of the narrowband and the wideband communications for any one of the logical channels for processing call information to generate, both independently of and for association with the narrowband or the wideband indicating signals, the requirements signals for controlling the operation of the resource management means to both establish and control the logical call paths between the one logical channel and another at least one logical channel, independently of both the narrowband and the wideband physical resources and the narrowband and the wideband resource control means.

6. The arrangement of claim 5 wherein the call processing means generate, both independently of and for association with the band-indicating signals, requirements signals for controlling the operation of the resource management means to both (a) establish the logical call paths, and (b) establish logical and physical connections between the logical call paths and the logical channels for controlling the logical call paths; and wherein the resource management means are operable in response to receipt from the call processing means of the requirements signals and the associated narrowband or wideband indicating signals for processing narrowband or wideband resource information, respectively, (a) to establish resource management logical structures for the logical channels and the logical call paths to establish the logical channels and call paths, (b) to allocate narrowband or wideband physical resources, respectively, to the logical channel structures for physical channels and to the logical call path structures for physical call paths between the physical channels, to establish the logical connections, and (c) to generate requirements signals for controlling the operation of the narrowband or the wideband resource control means, respectively, to establish connections between the resources allocated to the structures for establishment of the physical connections.

7. The arrangement of claim 6 for a system having narrowband resources including a narrowband switch having a plurality of ports for interconnection by switch paths internal to the narrowband switch, a plurality of physical channels connected to ports of the narrowband switch, and further having wideband resources including a first wideband switch having a plurality of ports for interconnection by switch paths internal to the first wideband switch and a second wideband switch having a plurality of ports for interconnection by switch paths internal to the second wideband switch, some second switch ports connected to ports of the first wideband switch and others connected to portions of physical channels, the system further including a narrowband switch controller for configuring the narrowband switch into switch paths between selected narrowband switch ports, and a first and a second wideband switch controller for configuring the first and the second wideband switch, respectively, into switch paths between selected ports of the first and the second wideband switch, respectively, wherein the resource management means are operable in response to receipt from the call processing means of the requirements signals and associated signals indicating narrowband communications for processing narrowband resource information (a) to establish the logical channel and logical path structures, (b) to allocate the physical channels to the logical channel structures and to allocate the first switch ports to the logical path structures, and (c) to generate requirements signals for controlling the operation of the narrowband switch controller to establish switch paths to the first switch ports allocated to the established structures for establishment of physical connections, and are further operable in response to receipt from the call processing means of the requirements signals and associated signals indicating wideband communications for processing wideband resource information (a) to establish the logical channel and logical path structures, (b) to allocate the second wideband switch ports to the logical channel structures and to allocate the first wideband switch ports to the logical path structures, and (c) to generate requirements signals for controlling the operation of the first and the second wideband controller to establish switch paths to the first and the second wideband switch ports, respectively, allocated to the established structures for establishment of physical connections.

8. The arrangement of claim 6 for a system having pre-established physical paths corresponding to logical paths leading to certain ones of the logical channels, wherein the resource management means are operable in response to receipt from the call processing means of the requirements signals and associated signals indicating narrowband or wideband communications between one of the certain logical channels and another at least one logical channel for processing narrowband or wideband resource information, respectively, (a) to establish the logical channel structures for establishment of the logical channels, (b) to allocate narrowband or wideband physical resources for physical channels connecting to the pre-established physical call paths for establishment of logical connections, and (c) to generate requirements signals for controlling the operation of the narrowband or the wideband resource control means, respectively, to establish connections between the resources allocated to the channel structures and the pre-established paths for establishment of physical connections, and are further operable in response to receipt from the call processing means of requirements signals and associated signals indicating the narrowband or the wideband communications, respectively, between channels other than the certain logical channels for processing narrowband or wideband resource information, respectively, (a) to establish the logical structures for the logical channels and the logical call paths for establishment of the logical channels and call paths, (b) to allocate the narrowband or the wideband physical resources, respectively, to the logical channel structures for physical channels and to the logical call path structures for physical call paths between the physical channels, for establishment of the logical connections, and (c) to generate requirements signals for controlling the operation of the narrowband or the wideband resource control means, respectively, to establish connections between the resources allocated to the structures for establishment of the physical connections.

9. The arrangement of claim 5 wherein
the call processing means comprise
first and second process means for controlling a calling and a called end of a call, respectively, each process means operable in response to receipt of call signals and associated signals indicating either one of narrowband and wideband communications, for processing call information to generate, both independently of and for association with the narrowband and the wideband indicative signals, requirements signals for controlling the operation of the resource management means to both establish and control a logical call path to the logical channel at its end of the call, and
means responsive to receipt of the call signals for creating the first and the second process means for the call; and wherein
the resource management means are operable in response to receipt from the first and the second process means of the requirements signals and associated signals indicating the narrowband or the wideband communications, for processing narrowband or wideband resource respectively, both (a) to allocate the narrowband or wideband physical resources, respectively, for at least one of (i) physical channels corresponding to the logical channels and (ii) physical call paths leading to the physical channels and corresponding to the logical call paths, for establishment thereof and (b) to generate requirements signals for controlling the operation of the narrowband or the wideband resource control means, respectively, to establish connections between the physical resources allocated to the logical call paths for control of the logical call paths.

10. The arrangement of claim 9 wherein
the call processing means further comprise third process means for controlling a logical conference by coupling logical call paths of a plurality of call ends to a logical channel, the third process means operable in response to receipt of call signals and associated signals indicating narrowband or wideband communications for processing call information to generate, both independently of and for association with the narrowband or the wideband indicating signals, respectively, requirements signals for controlling the operation of the resource management means to both establish and control logical conference paths between the logical channel and the coupled logical call paths; wherein
the process creating means are further responsive to receipt of the call signals for creating the third process means for the conference; and wherein
the resource management means are further operable in response to receipt from the third process means of the requirements signals and associated signals indicating the narrowband or the wideband communications for processing narrowband or wideband resource information, respectively, both (a) to allocate the narrowband or the wideband physical resources, respectively, for physical conference paths between the physical call paths and the physical channel and corresponding to the logical conference paths for establishment thereof and (b) to generate requirements signals for controlling the operation of the narrowband or the wideband resource control means, respectively, to establish connections between the physical resources allocated to the logical conference paths for control of the conference paths.

11. The arrangement of claim 10 wherein
the first, second, and third process means of the call processing means each generate requirements signals for controlling the operation of the resource management means both (a) to establish logical paths, and (b) to establish logical and physical connections between the logical paths and the logical channels for controlling the logical paths; and wherein
the resource management means are operable in response to receipt from the first, second, and third process means of the requirements signals and associated signals indicating narrowband or wideband communications, for processing narrowband or wideband resource information, respectively, (a) to establish resource management logical structures for the logical channels and the logical call and conference paths for establishment of the logical channels and paths, (b) to allocate narrowband or wideband physical resources, respectively, to the logical channel path structures for physical channels and to the logical call and conference path structures for physical call and conference paths, respectively, for establishment of the logical connections, and (c) to generate requirements signals for controlling the operation of the narrowband or the wideband resource control means, respectively, to establish connections between the resources allocated to the respective structures for establishment of the physical connections.

12. The arrangement of claim 9 wherein
the first and the second process means of the call processing means each generate, both independently of and for association with the band-indicating signals, requirements signals for controlling the operation of the resource management means both (a) to establish logical call paths, and (b) to establish logical and physical connections between the logical call paths and the logical channels for controlling the logical call paths; and wherein the resource management means are operable in response to receipt from the first and the second process means of the requirements signals and the associated narrowband or wideband indicating signals for processing narrowband or wideband resource information, respectively, (a) to establish resource management logical structures for the logical channels and the logical call paths for establishment of the logical channels and call paths, (b) to allocate narrowband or wideband physical resources, respectively, to the logical channel structures for physical channels and to logical call path structures for physical call paths, for establishment of the logical connections, and (c) to generate requirements signals for controlling the operation of the narrowband or the wideband resource control means, respectively, to establish connections between the resources allocated to the respective structures for establishment of the physical connections.

13. The arrangement of claim 12 wherein
the call processing means further comprise
third process means for controlling a plurality of calls, operable in response to receipt of call signals and associated signals indicating narrowband or wideband communications for calls to certain ones of the logical channels for processing call information to generate, both independently of and for association with the narrowband or the wideband indicating signals, requirements signals for controlling the operation of the resource management means to control logical call paths between the one logical channel and the certain logical channels; and wherein
the first and second process means are operable in response to receipt of call signals for calls to other than the certain logical channels.

14. The arrangement of claim 13 for a system having pre-established physical paths corresponding to logical paths leading to the certain ones of the logical channels, wherein
the third process means generate, both independently of and for association with the band-indicating signals, requirements signals for controlling the operation of the resource management means to establish connections between the logical call paths and the one logical channel thereby to control the logical call paths; and wherein
the resource management means are operable in response to receipt from the third process means of the requirements signals and the associated narrowband or wideband indicating signals for processing narrowband or wideband resource information, respectively, (a) to establish the logical channel structures for establishment of the logical channels, (b) to allocate the narrowband or wideband physical resources, respectively, for physical channels connecting to the pre-established physical call paths for establishment of logical connections to control the logical call paths, and (c) to generate requirements signals for controlling the operation of the narrowband or the wideband resource control means, respectively, to establish connections of the resources allocated to the logical channel structures with the pre-established paths for establishment of physical connections to control the logical call paths.

15. A control arrangement for a communication switching system having narrowband and wideband physical resources configurable independently from each other separately to provide narrowband and wideband communications, respectively, for terminal lo9ical channels of the system and having pre-established wideband physical paths corresponding to logical paths to certain ones of the terminal logical channels, the system further including narrowband and wideband resource control means for configuring the narrowband and the wideband resources, respectively, in response to receipt of requirements signals, the control arrangement comprising:

a program controlled resource management system and a program controlled call processing system independent in program from each other;
the call processing system comprising
first process means for controlling a plurality of calls, operable in response to receipt of call signals and associated signals indicating either one of the narrowband and the wideband communications for any one of the logical channels for calls to any of the certain logical channels, for processing call information to generate, both independently of and for association with the narrowband and the wideband indicating signals, requirements signals for controlling a logical call path between the one logical channel and one of the certain logical channels independently of the wideband and the narrowband physical resources and the narrowband and the wideband resource control means,
second and third process means for controlling a calling and a called end of a call, respectively, each second and third process means operable in response to receipt of call signals and associated signals indicating either one of the narrowband and the wideband communications for any one of the logical channels for calls to any other than the certain logical channels, for processing call information to generate requirements signals for both establishing and controlling a logical call path to the logical channel at its end of the call independently of the narrowband and the wideband physical resources and the narrowband and the wideband resource control means,
fourth process means for controlling a logical conference by coupling logical call paths of a plurality of call ends to a logical channel, the fourth process means operable in response to receipt of call signals and associated signals indicating either one of the narrowband and the wideband communications for any one of the logical channels, for processing call information to generate, both independently of and for association with the narrowband or the wideband indicating signals, respectively, requirements signals for both establishing and controlling logical conference paths between the logical channel and the coupled logical call paths independently of the narrowband and the wideband physical resources and the narrowband and the wideband resource control means, and
means responsive to receipt of the call signals for creating the second, third, and fourth process means for each call to any other than the certain logical channels and for each conference, respectively; and
the resource management system comprising first management means cooperative with both the narrowband and the wideband resource control means and operable in response to receipt of the requirements signals and associated signals indicating narrowband communications from the first process means, for processing narrowband resource information (a) to establish logical channel structures for establishment of the logical channels, (b) to allocate narrowband physical resources for physical channels connecting to the pre-established physical call paths for establishment of logical connections between the logical channels and the logical call paths to control the logical call paths, and (c) to generate requirements signals for controlling the operation of the narrowband resource control means to establish connections between the narrowband resources allocated to the logical channel structures for establishment of physical connections between the logical channels and the logical call paths to control the logical call paths, and further being operable in response to receipt of the requirements signals and associated signals indicating wideband communications from the first process means, for processing wideband resource information (a) to establish logical channel structures for establishment of the logical channels, (b) to allocate wideband physical resources for physical channels connecting to the pre-established physical call paths for establishment of logical connections between the logical channels and the logical call paths to control the logical call paths, and (c) to generate requirements signals for controlling the operation of the wideband resource control means to establish connections between the wideband resources allocated to the logical channel structures for establishment of physical connections between the logical channels and the logical call paths to control the logical call paths, and second management means cooperative with both the narrowband and the wideband resource control means and operable in response to receipt of the requirements signals and associated signals indicating narrowband communications from the second, third, and fourth process means, for processing narrowband resource information (a) to establish resource management logical structures for the logical channels, logical call paths, and logical conference paths for establishment of the logical channels and call and conference call paths, (b) to allocate narrowband physical resources to the logical channel, call path, and conference path structures for physical channels, for physical call paths to the physical channels, and for physical conference paths between physical channels and call paths corresponding to coupled logical call paths, respectively, for establishment of logical connections between the logical channels and logical paths to control the logical paths, and (c) to generate requirements signals for controlling the operation of the narrowband resource control means to establish connections between the narrowband resources allocated to the logical structures for establishment of physical connections between the logical channels and logical paths to control the logical paths, and further being operable in response to receipt of the requirements signals and associated signals indicating wideband communications from the second, third, and fourth process means, for processing wideband resource information (a) to establish resource management logical structures for the logical channels, logical call paths, and logical conference paths for establishment thereof, (b) to allocate wideband physical resources to the logical channel, call path, and conference path structures for physical channels, for physical call paths to the physical channels, and for physical conference paths between physical channels and call paths corresponding to coupled logical call paths, respectively, for establishment of logical connections between the logical channels and logical paths to control the logical paths, and (c) to generate requirements signals for controlling the operation of the wideband resource control means to establish connections between the wideband resources allocated to the logical structures for establishment of physical connections between the logical channels and logical paths to control the logical paths.

16. The arrangement of claim 15 wherein
the call processing system first, second, third, and fourth process means generate requirements signals for establishing the logical and the physical connections for controlling the logical paths.

17. The arrangement of claim 15 for a system wherein narrowband resources include a narrowband switch having a plurality of ports for interconnection by switch paths internal to the narrowband switch and a plurality of physical narrowband channels corresponding to terminal logical channels and connected to ports of the narrowband switch, and wherein wideband resources include a first wideband switch having a plurality of ports for interconnection by switch paths internal to the first wideband switch and a second wideband switch having a plurality of ports for interconnection by switch paths internal to the second wideband switch, some second switch ports connected to ports of the first switch and others connected to physical wideband channels corresponding to terminal physical channels, the system further including a narrowband controller for configuring the narrowband switch into switch paths between selected narrowband switch ports, and a first and a second wideband switch controller for configuring the first and the second wideband switch, respectively, into switch paths between selected ports of the first and the second wideband switch, respectively, wherein
the first management means are operable in response to receipt of the requirements signals from the first process means and associated signals indicating wideband communications for processing wideband resource information (a) to allocate physical wideband channels and ports of the second wideband switch to the logical channel structures for establishment of the logical connections and (b) to generate requirements signals for controlling the operation of the second wideband switch controller to establish switch paths through the second wideband switch between the allocated ports and the pre-established paths for establishment of the physical connections; and wherein
the second management means are operable in response to receipt of the requirements signals from the second, third, and fourth process means and associated signals indicating of narrowband communications for processing narrowband resource information (a) to allocate physical narrowband channels to the logical channel structures and to allocate ports of the narrowband switch to the logical call path and conference path structures for establishment of the logical connections, and (b) to generate requirements signals for controlling the operation of the narrowband switch controller to establish switch paths through the narrowband switch between the allocated ports of calling and called end logical call path structures and between the allocated ports of logical conference path structures for establishment of the physical connections, and are further operable in response to receipt of the requirements signals from the second and the third process means and associated signals indicating wideband communications for processing wideband resource information (a)(i) to allocate physical wideband channels and ports of the second wideband switch to the logical channel structures and generate requirements signals for controlling the operation of the second wideband switch controller to establish switch paths through the second wideband switch between the allocated physical channels and ports and (a)(ii) to allocate ports of the first wideband switch to the logical call path structures, for establishment of the logical connections, and (b) to generate requirements signals for controlling the operation of the first wideband switch controller to establish switch paths through the first wideband switch between the allocated ports of calling and called end logical path structures for establishment of the physical connections.

* * * * *